(12) United States Patent
Fujii et al.

(10) Patent No.: US 8,599,251 B2
(45) Date of Patent: Dec. 3, 2013

(54) CAMERA

(75) Inventors: Takashi Fujii, Sayama (JP); Kazuki Sakurai, Tokyo (JP); Kensei Ito, Sagamihara (JP); Takeshi Ishino, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 1251 days.

(21) Appl. No.: 11/900,791

(22) Filed: Sep. 12, 2007

(65) Prior Publication Data

US 2008/0068456 A1 Mar. 20, 2008

(30) Foreign Application Priority Data

| Sep. 14, 2006 | (JP) | 2006-249258 |
| Oct. 31, 2006 | (JP) | 2006-295223 |
| Nov. 9, 2006 | (JP) | 2006-303882 |
| Nov. 22, 2006 | (JP) | 2006-316229 |
| Dec. 26, 2006 | (JP) | 2006-349598 |
| Jul. 9, 2007 | (JP) | 2007-180302 |

(51) Int. Cl.
*H04N 7/18* (2006.01)

(52) U.S. Cl.
USPC .......................... 348/130; 382/118

(58) Field of Classification Search
USPC .......................... 348/130; 382/118
See application file for complete search history.

(56) References Cited

U.S. PATENT DOCUMENTS

| 6,038,333 | A * | 3/2000 | Wang ........................... 382/118 |
| 6,628,271 | B1 * | 9/2003 | Matsumoto et al. .......... 345/179 |
| 7,006,714 | B2 | 2/2006 | Kasutani |
| 7,702,681 | B2 * | 4/2010 | Brewer et al. ................. 707/748 |
| 7,949,158 | B2 * | 5/2011 | Lee et al. ...................... 382/118 |
| 2002/0194197 | A1 * | 12/2002 | Flank ........................ 707/104.1 |
| 2004/0125219 | A1 * | 7/2004 | Shibata et al. ............ 348/231.99 |
| 2004/0236791 | A1 * | 11/2004 | Kinjo ......................... 707/104.1 |
| 2004/0264780 | A1 * | 12/2004 | Zhang et al. .................. 382/224 |
| 2005/0219367 | A1 * | 10/2005 | Kanda et al. ................. 348/207.2 |
| 2006/0002607 | A1 * | 1/2006 | Boncyk et al. ................ 382/165 |
| 2006/0161588 | A1 * | 7/2006 | Nomoto ..................... 707/104.1 |

(Continued)

FOREIGN PATENT DOCUMENTS

| JP | 06-12494 | 1/1994 |
| JP | 10-254901 | 9/1998 |

(Continued)

OTHER PUBLICATIONS

Chinese Office Action for Chinese Patent Application No. 2007101512308, mailed on Nov. 28, 2008 (8 pgs.) (with English Translation (11 pgs.)).

(Continued)

*Primary Examiner* — Duyen Doan
(74) *Attorney, Agent, or Firm* — John C. Pokotylo; Straub & Pokotylo

(57) ABSTRACT

A camera comprises an imaging unit for imaging an object image; a first storage unit for storing plural still pictures and plural motion pictures, as images, and information other than the images; a display unit for displaying one or plural images, or an image output from the imaging unit; a search source specification unit for specifying a search source image; a search condition specification unit for specifying a search condition; and a search unit for searching an image similar to the search source image specified by the search source specification unit and in accordance with the search condition specified by the search condition specification unit.

10 Claims, 60 Drawing Sheets

(56) References Cited

U.S. PATENT DOCUMENTS

| | | | |
|---|---|---|---|
| 2006/0165354 A1* | 7/2006 | Kim | 385/95 |
| 2008/0036871 A1* | 2/2008 | Ohmura et al. | 348/222.1 |
| 2008/0049148 A1* | 2/2008 | Hosoda | 348/739 |
| 2008/0098316 A1* | 4/2008 | Declan | 715/764 |
| 2008/0235275 A1* | 9/2008 | Tanaka et al. | 707/104.1 |
| 2009/0046954 A1* | 2/2009 | Ishii | 382/312 |
| 2009/0046991 A1* | 2/2009 | Miyajima et al. | 386/95 |
| 2009/0185786 A1* | 7/2009 | Murata | 386/83 |
| 2010/0030860 A1* | 2/2010 | Iwasawa et al. | 709/206 |
| 2010/0149345 A1* | 6/2010 | Hashimoto | 348/207.1 |

FOREIGN PATENT DOCUMENTS

| | | |
|---|---|---|
| JP | 2000-242649 | 9/2000 |
| JP | 2001-167118 | 6/2001 |
| JP | 2002-369125 | 12/2002 |
| JP | 2004-120225 | 4/2004 |
| JP | 2005 080216 | 3/2005 |
| JP | 2005-102175 | 4/2005 |
| JP | 2005-157764 | 6/2005 |
| JP | 2005-301889 | 10/2005 |
| JP | 2006-101186 | 4/2006 |
| JP | 2006-164008 | 6/2006 |

OTHER PUBLICATIONS

Chinese Second Notification of Office Action for Chinese Patent Application No. 2007101512308, mailed on May 8, 2009 (11 pgs.) (with English Translation (14 pgs.)).

Fifth Notice of Rejection Grounds for Chinese Application No. 200710151230.8, mailed Jul. 9, 2010 (5 pgs.) with translation (4 pgs.).

Decision of Rejection for Chinese Patent Application No. 200710151230.8, mailed Jan. 10, 2011 (9 pgs.) with partial translation (4 pgs.).

Notice of Rejection Ground for Japanese Patent Application No. 2007-180302, mailed Oct. 25, 2011 (4 pgs.) with translation (4 pgs.).

* cited by examiner

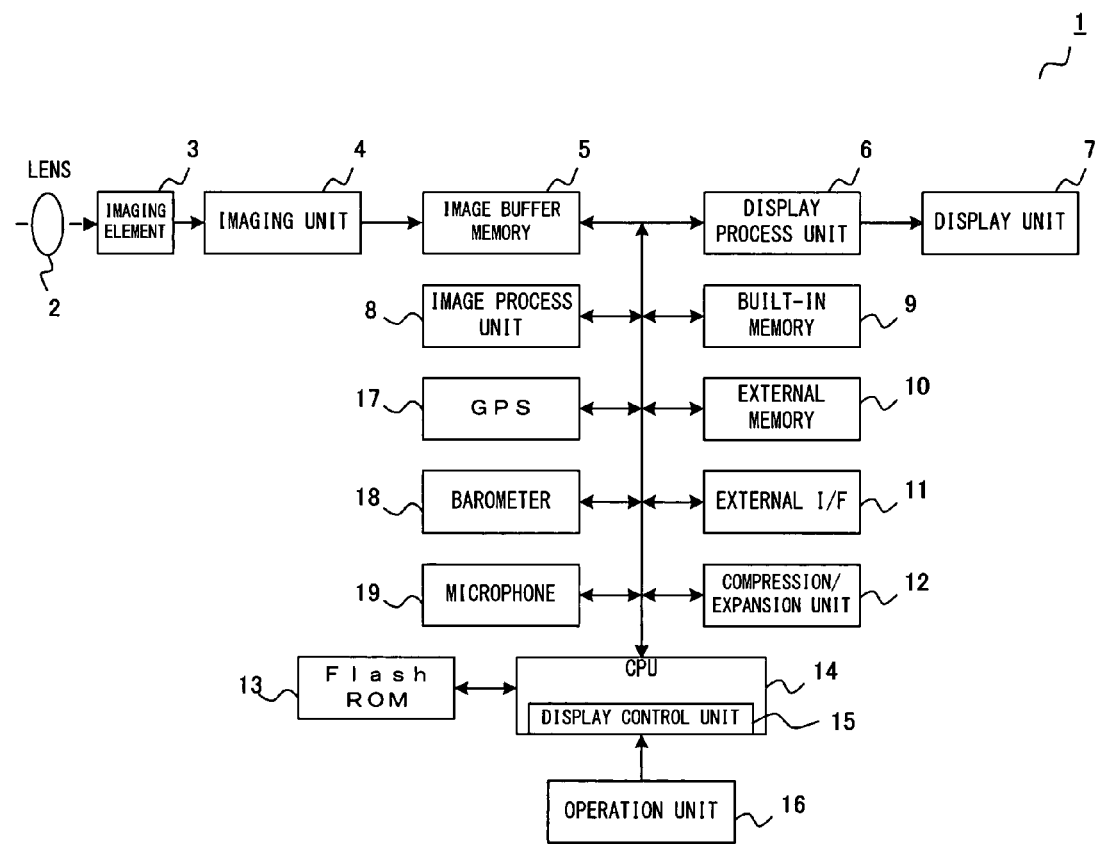
F I G. 1

SEARCHING FROM ONE OF REGISTERED IMAGES
(IN ROM)

SEARCHING FROM ONE OF PHOTOGRAPHED IMAGES
(IN EXTERNAL MEMORY)

SEARCHING FROM ONE OF PHOTOGRAPHED IMAGES
(IN BUILT-IN MEMORY)

SEARCHING FOR AN IMAGE STORED IN MEDIA OTHER THAN CAMERA FROM ONE OF
PHOTOGRAPHED IMAGES BY WAY OF A NETWORK OR RADIO TELECOM

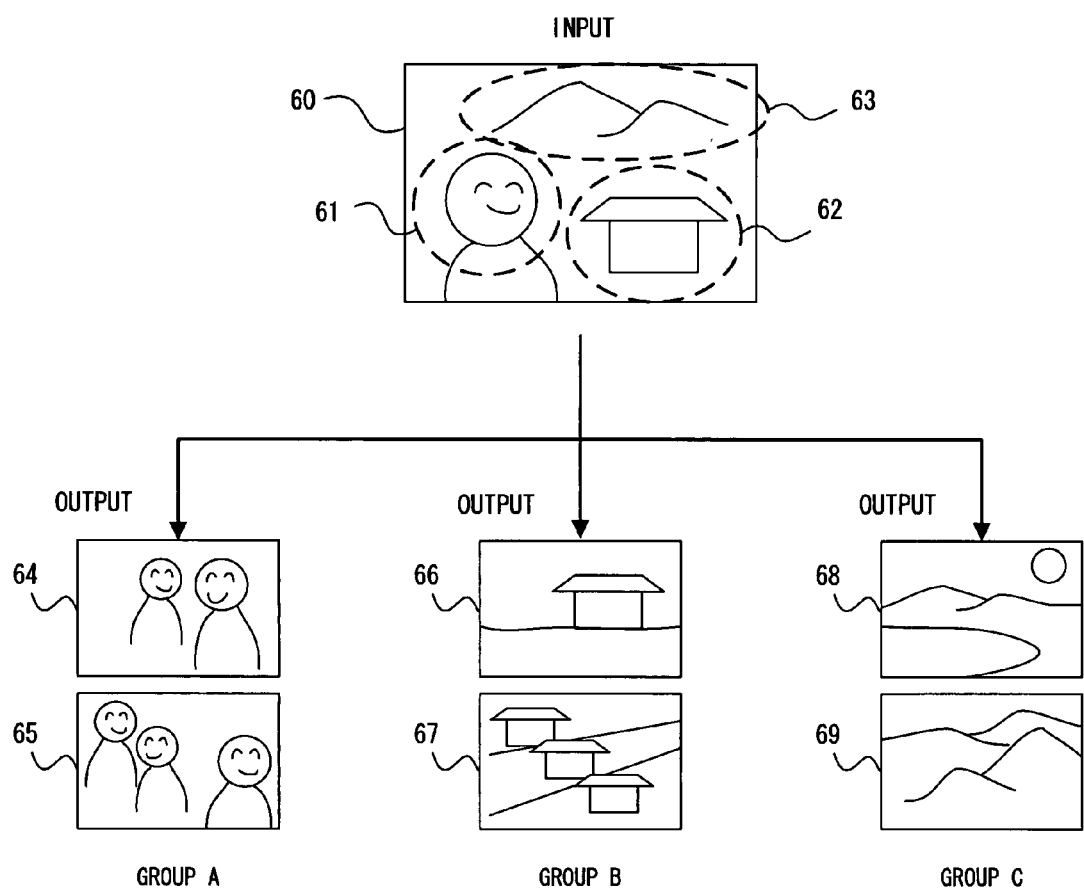
F I G. 7

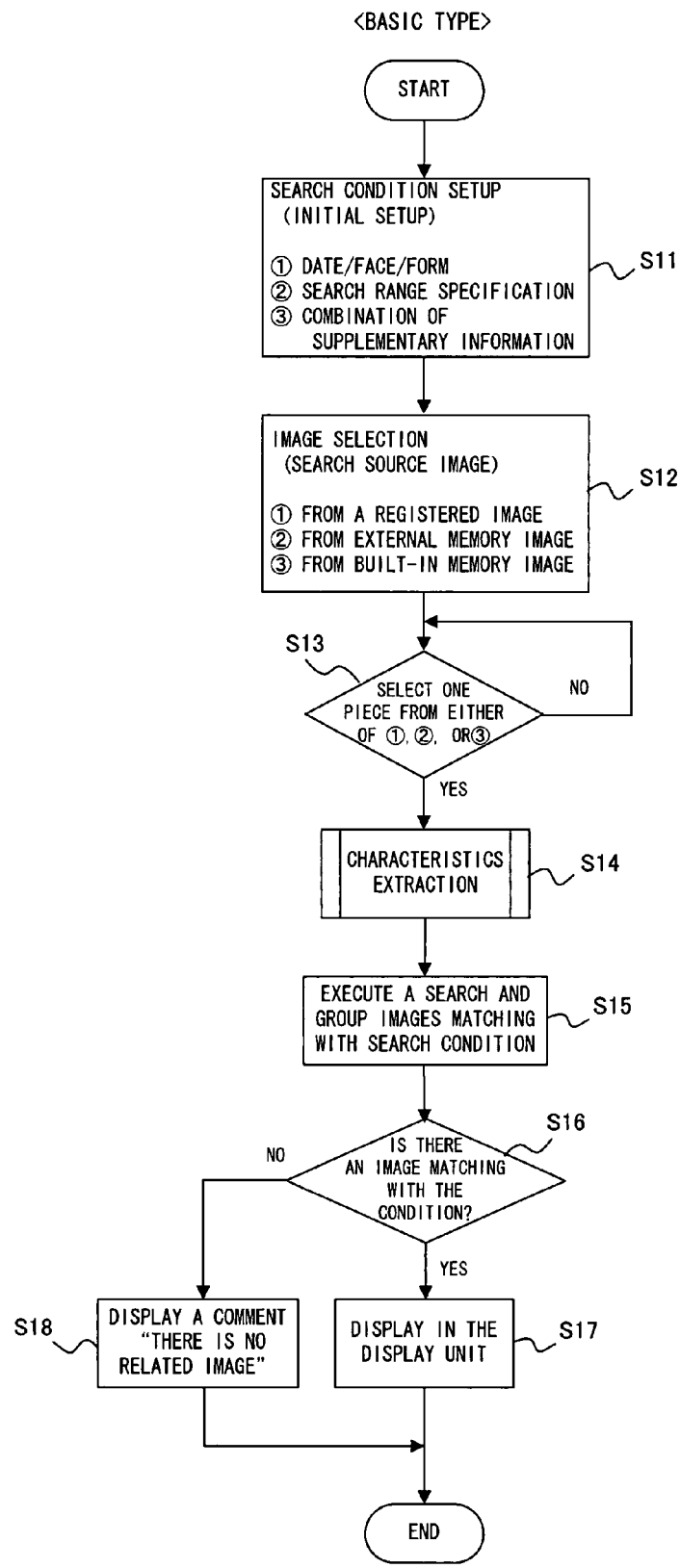
F I G. 9

◆ CAMERA JUDGES IMAGE IN ADVANCE

SELECTING FROM SELECTION CANDIDATES

ONE PIECE AS ORIGINAL IMAGE
90

TOUCH PANEL OPERATION →

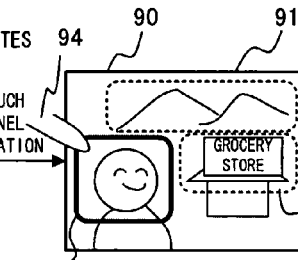
90  91
94
93  92

TOUCH PANEL OPERATION →

SEARCH RESULT IMAGES (DETECTION RESULT: A PLURALITY OF PIECES)
95

KEY OPERATION →

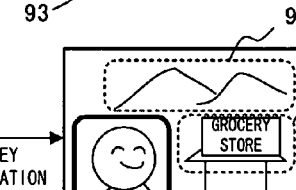
91
93  92

SELECTION/ DECISION KEY OPERATIONS

F I G. 1 5 A

FROM FORM RECOGNITION

ONE PIECE AS ORIGINAL IMAGE
90

SPECIFY RANGE BY TRACING ON IMAGE SCREEN →

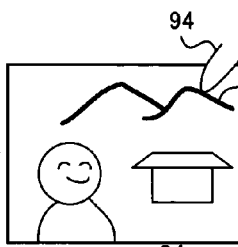
94  96
94

FORM DETECTION →

SEARCH RESULT IMAGES (DETECTION RESULT: A PLURALITY OF PIECES)
95

SPECIFY RANGE BY ENCLOSING ON IMAGE SCREEN →

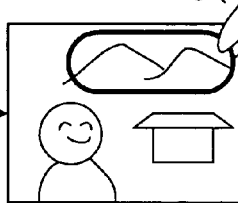
97

FORM DETECTION →

F I G. 1 5 B

REPRESENTATIVE RESULT DISPLAY METHOD FOR EACH SEARCH ITEM

ONE PIECE AS ORIGINAL IMAGE
90

KEY OPERATION →

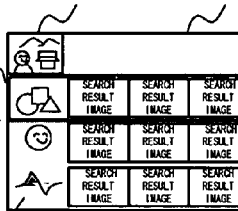
90  96
99
97  98

SELECTION/ DECISION KEY OPERATION →

SEARCH RESULT IMAGES (DETECTION RESULT: A PLURALITY OF PIECES)
95

F I G. 1 5 C

<SCREEN IMAGE SELECTION>
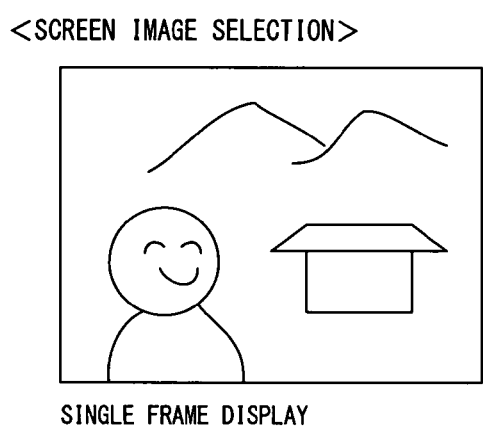
SINGLE FRAME DISPLAY
F I G. 1 6 A
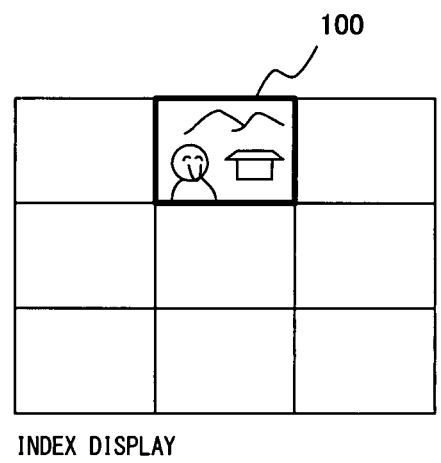
INDEX DISPLAY
F I G. 1 6 B

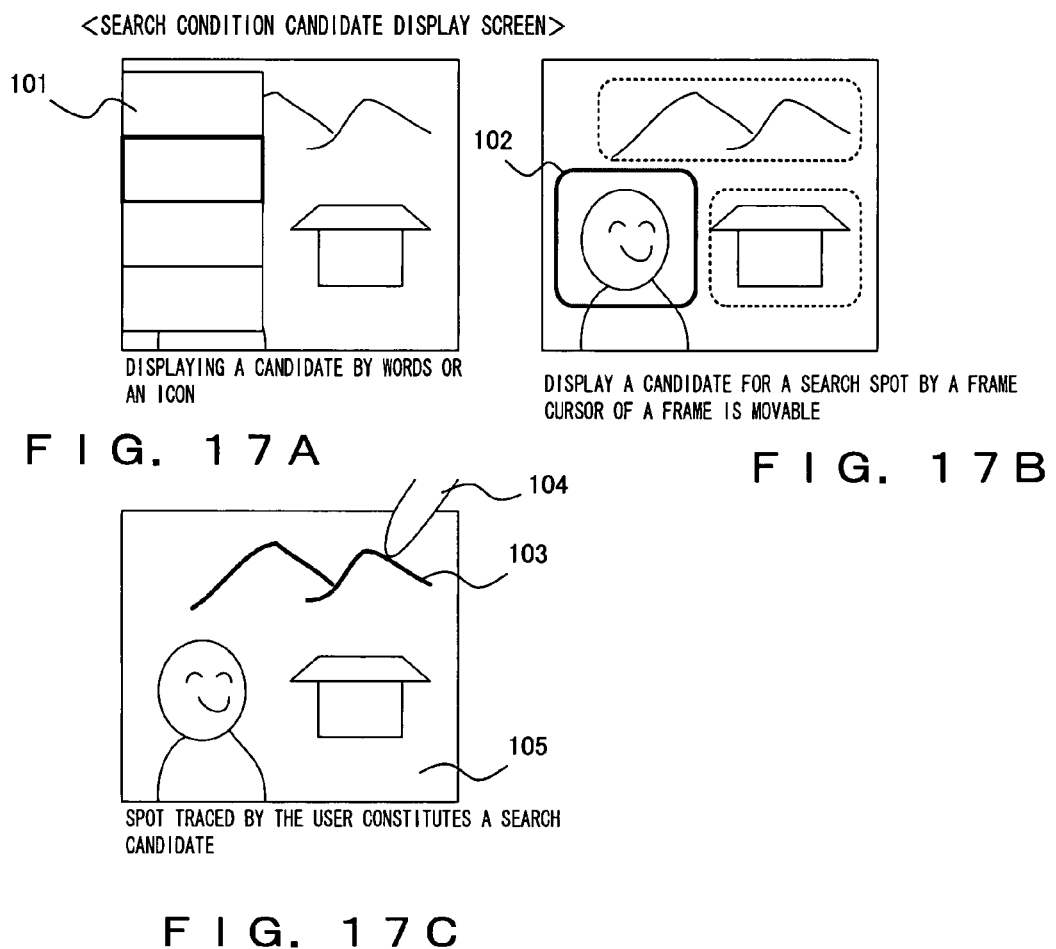

F I G. 1 8 A   F I G. 1 8 C
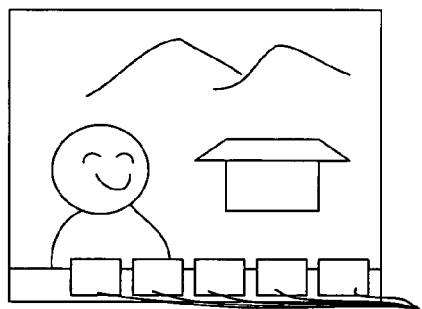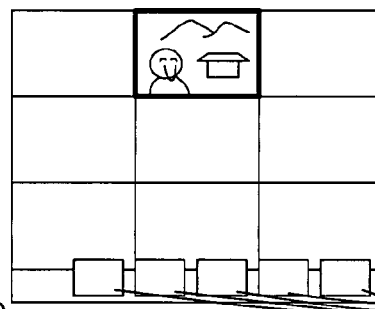
SINGLE FRAME DISPLAY
(WITH A GROUPING RESULT BEING DISPLAYED)
(PART 1)
INDEX DISPLAY
(WITH A GROUPING RESULT BEING DISPLAYED)
(PART 1)
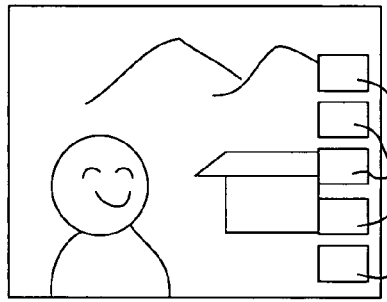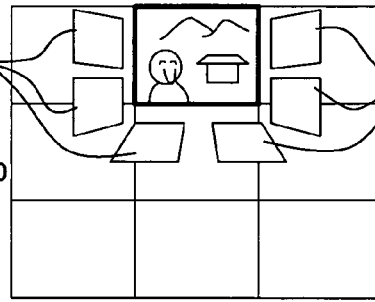
SINGLE FRAME DISPLAY
(WITH A GROUPING RESULT BEING DISPLAYED)
(PART 2)
INDEX DISPLAY
(WITH A GROUPING RESULT BEING DISPLAYED)
(PART 2)
F I G. 1 8 B   F I G. 1 8 D <GROUPING RESULT DISPLAY>

SINGLE FRAME DISPLAY
(PART 1)

SINGLE FRAME DISPLAY
(PART 2)

INDEX DISPLAY
(PART 1)

INDEX DISPLAY
(PART 2)

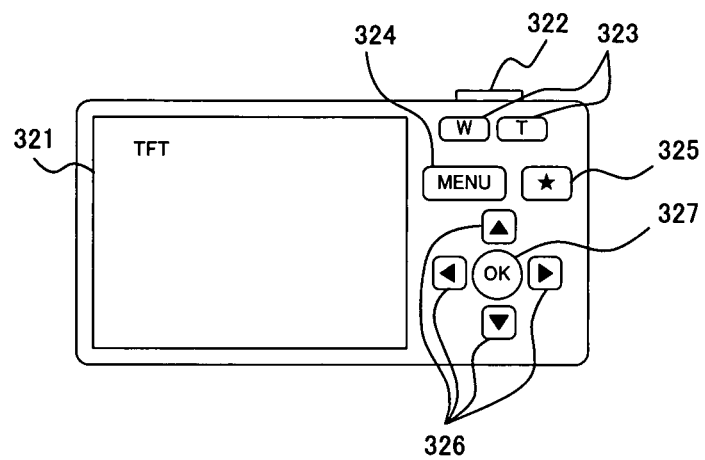
F I G. 31

FIG. 46A

|   | PARAMETER | SEARCH RANGE |
|---|---|---|
| a | DATE | ±0 |
| b | TIME | ±0:20 |
| c | PLACE | ±0 |
| d | PHOTOGRAPHY MODE | --- |
| e | EXPOSURE | ±0 |
| f | WHITE BALANCE | ±0 |

FIG. 46B

| CONDITION | SEARCH EXPRESSION |
|---|---|
| CONDITION 1 | b |
| CONDITION 2 | a*b+c |

FIG. 46C

| SEARCH EXPRESSION | b | | |
|---|---|---|---|
|   | PARAMETER | SEARCH SOURCE IMAGE | SEARCH RANGE |
| b | TIME | 13:20 | ±0:20 |

FIG. 46D

| SEARCH EXPRESSION | a+b+c+d+e+f | | |
|---|---|---|---|
|   | PARAMATER | SEARCH SOURCE IMAGE | SEARCH RANGE |
| a | DATE | 2006/08/08 | ±0 |
| b | TIME | 13:20 | ±0:20 |
| c | PLACE | N:45,E:135 | ±0 |
| d | PHOTOGRAPY MODE | LANDSCAPE | --- |
| e | EXPOSURE | -3EV | ±0 |
| f | WHITE BALANCE | 5000k | ±0 |

FIG. 46E

|   | PARAMETER | DETERMINED IMAGE | SEARCH RANGE |
|---|---|---|---|
| ADDITIONAL SEARCH | TIME | 13:50 | ±0:05 |

FIG. 46F

|   | PARAMETER | DETERMINED IMAGE | SEARCH RANGE |
|---|---|---|---|
| DELETING SEARCH RANGE | TIME | 13:00 | ±0:05 |

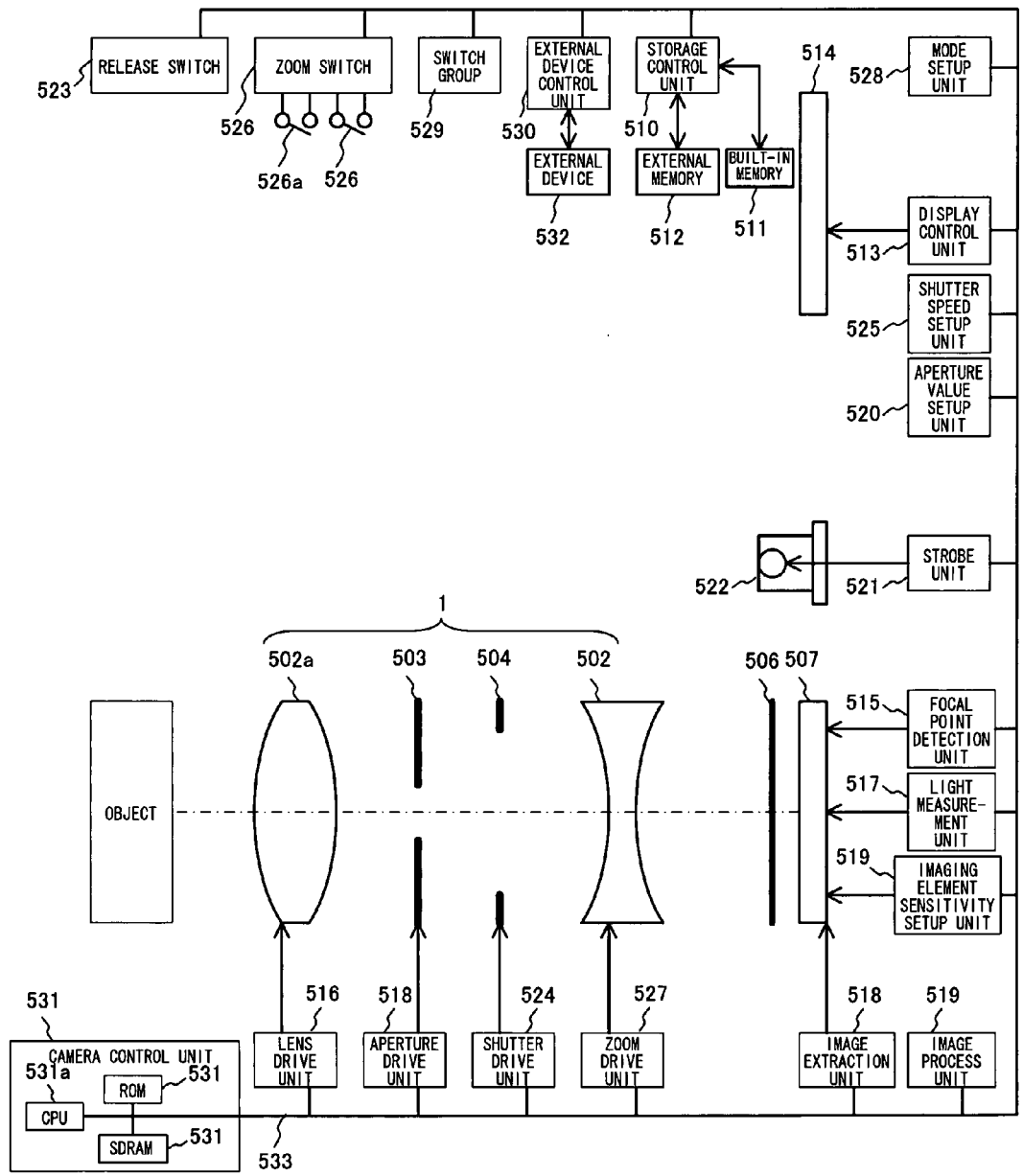
F I G. 5 0

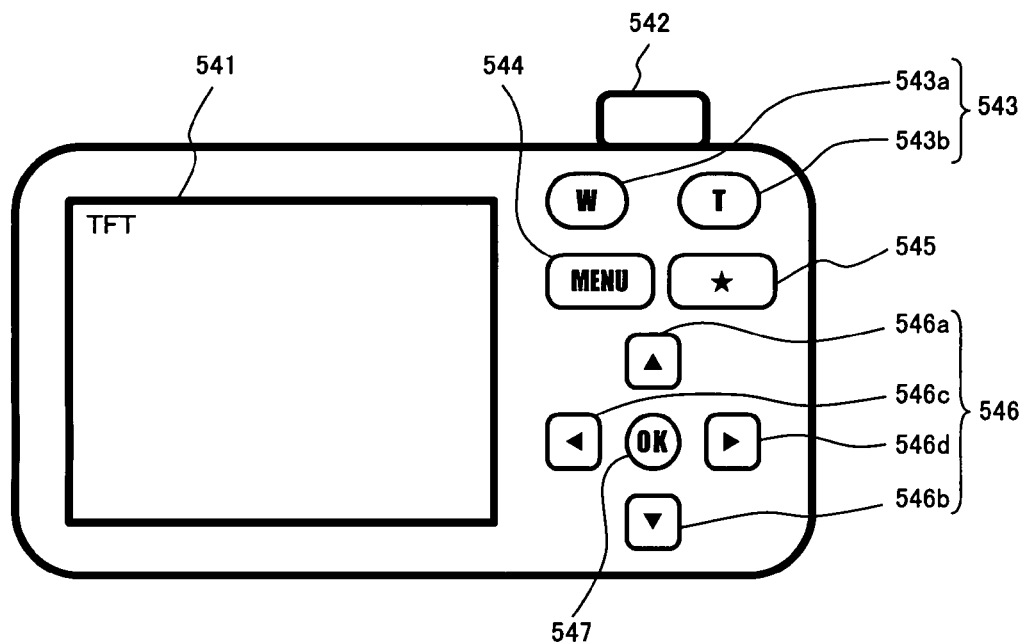
F I G. 51

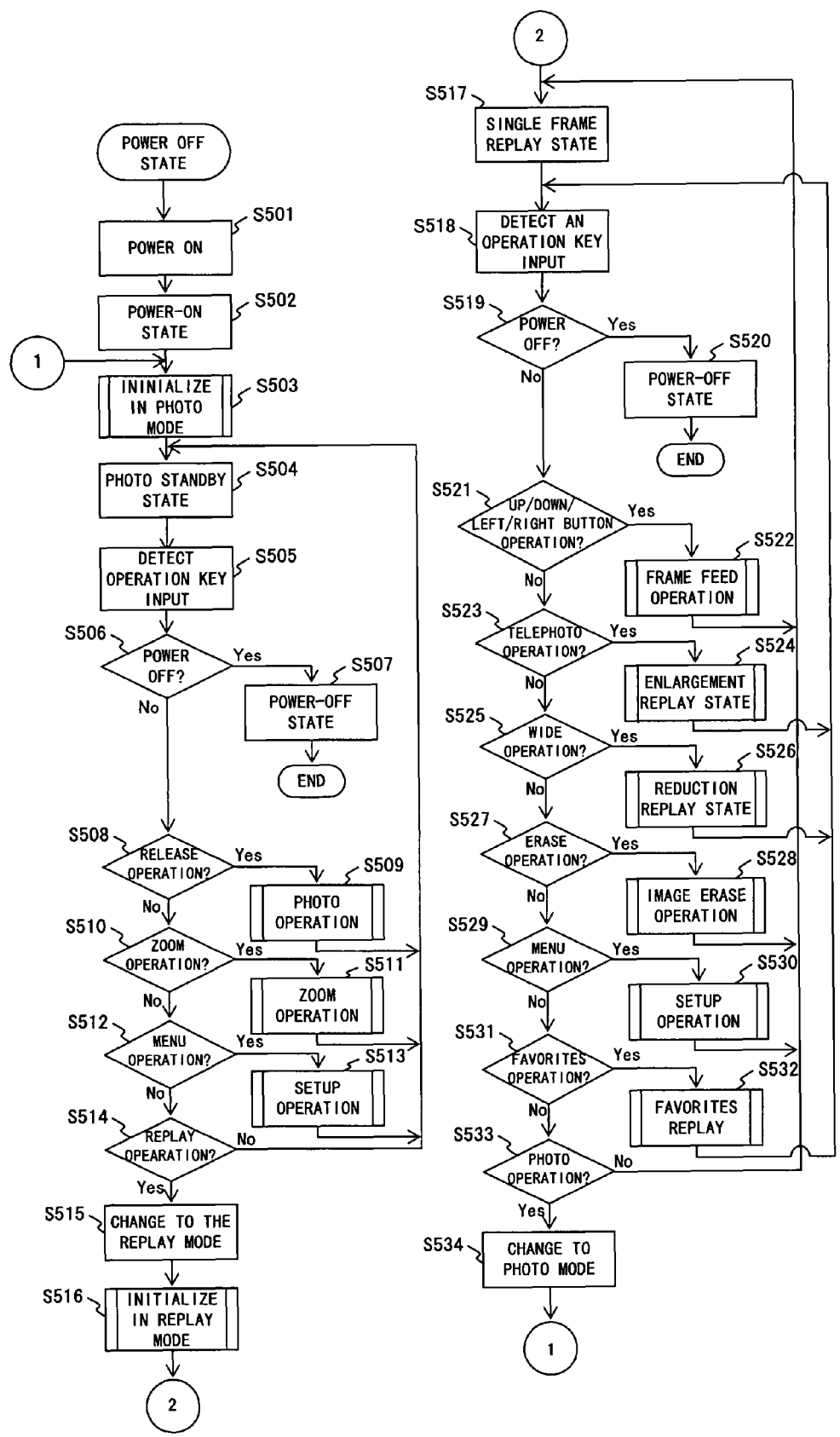
F I G. 5 2

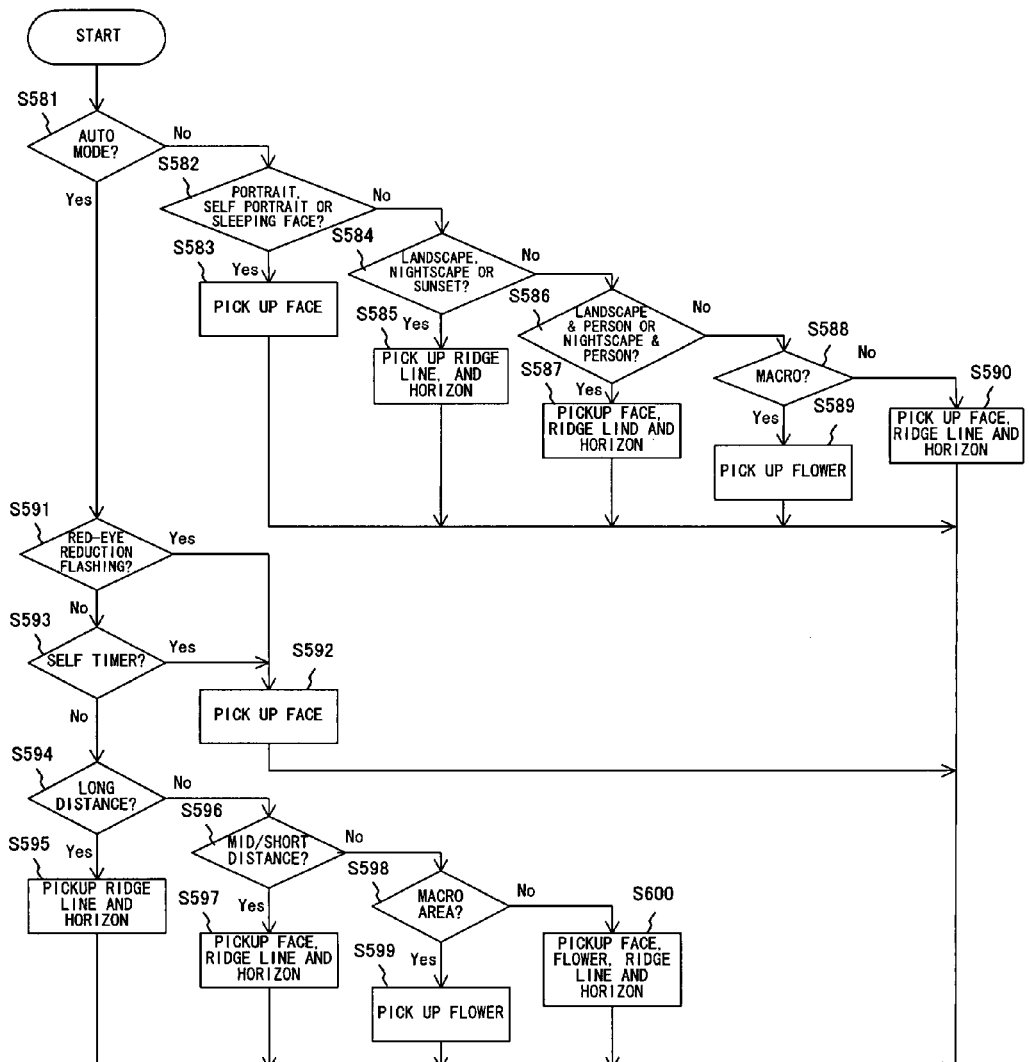

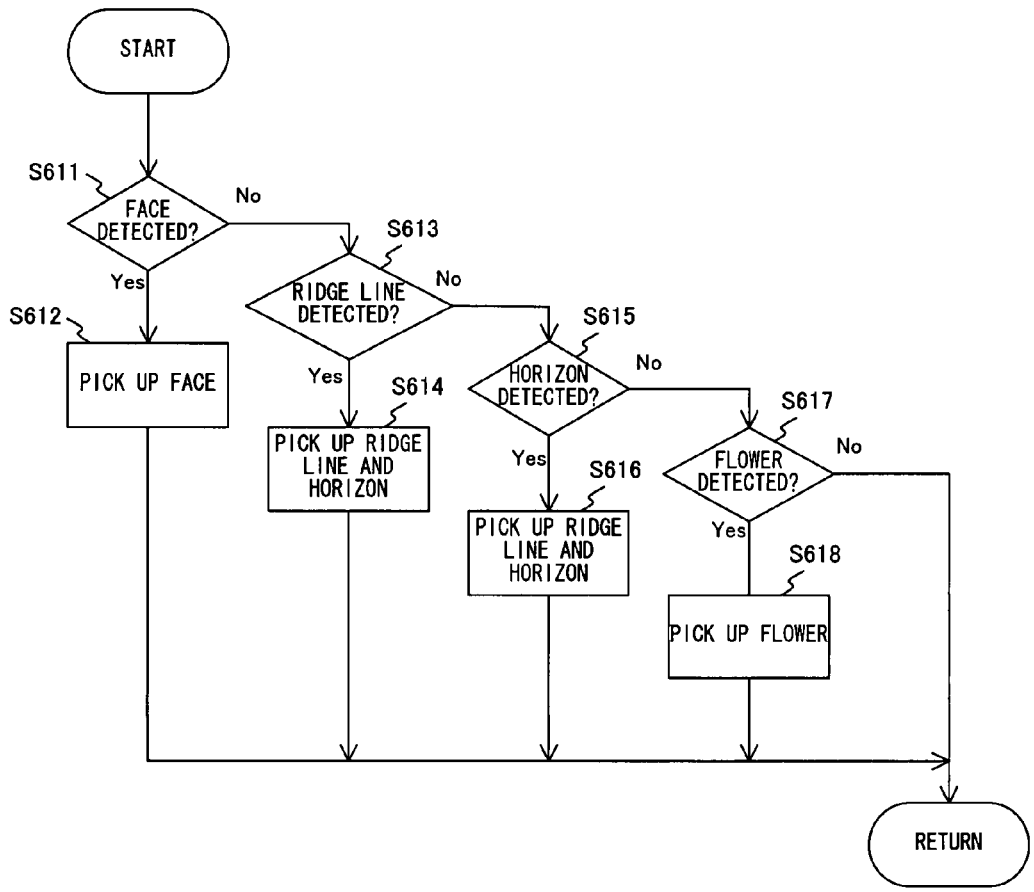
F I G. 5 7

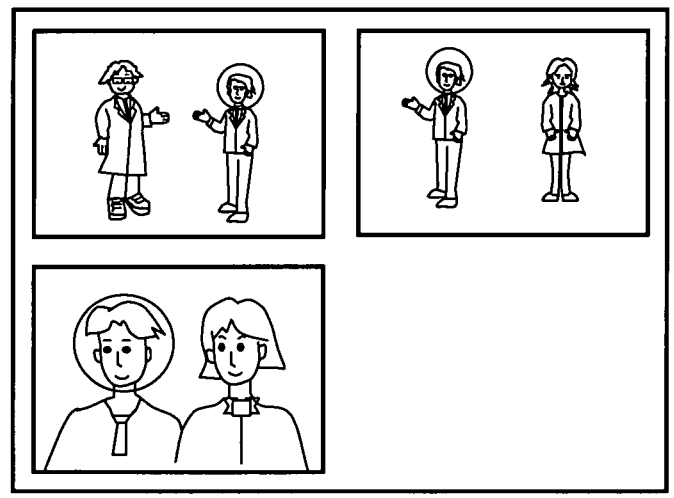
F I G. 59A
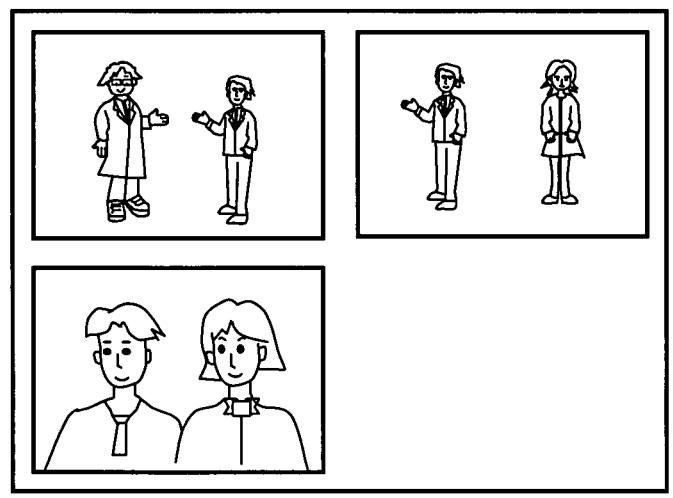
F I G. 59B

CAMERA

CROSS REFERENCE TO RELATED APPLICATIONS

This application is based upon and claims the benefit of priority from the prior Japanese Patent Applications No. 2006-249258, filed Sep. 14, 2006, 2006-295223, filed Oct. 31, 2006, 2006-303882, filed Nov. 9, 2006, 2006-316229, filed Nov. 22, 2006, 2006-349598, filed Dec. 26, 2006, and 2007-180302, filed Jul. 9, 2007, the entire contents of which are incorporated herein by reference.

BACKGROUND OF THE INVENTION

1. Field of the Invention

The present invention relates to a camera comprising an image search function.

2. Description of the Related Art

In recent years, a digital camera is equipped with various image management functions such as an album function and a calendar function which are used for sorting and searching photographed images.

The album function is one capable of sorting photo images as an album in a recording medium that is a memory card, et cetera, and the use of the function enables a user to search a desired image based on the album. As examples, a reference patent document 1 (i.e., Laid-Open Japanese Patent Application Publication No. 2000-242649), a reference patent document 2 (i.e., Laid-Open Japanese Patent Application Publication No. 2001-167118) and a reference patent document 3 (i.e., Laid-Open Japanese Patent Application Publication No. H10-254901) have disclosed techniques for effectively utilizing such an album function.

The calendar function is one capable of a sorting photo images for each photographed date, and the use of the function enables a user to search a desired image based on the photographed date.

In addition, apparatus and method for searching an image include the apparatus and method which are put forth in a reference patent document 4 (i.e., Laid-Open Japanese Patent Application Publication No. H06-12494) and a reference patent document 5 (i.e., Laid-Open Japanese Patent Application Publication No. 2004-120225).

Meanwhile, some digital camera of the recent years is also enabled to record a large number of images (i.e., of image data) associated with an increased capacity of a recording medium (e.g., a memory card) built-in in the camera. With the capability of recording a large number of images in such a recording medium, there is a case of desiring to search and display only an image(s) satisfying a discretionary condition from a large number of recorded images among the users of the digital camera. As an example, there is the case of confirming only the image photographed in a specific geographic area, or the case of confirming only the image photographed in a specific time band. Furthermore in these cases, there is the case of discretionarily enlarging or reducing the specific geographic area and then confirming only the image photographed in the area of the enlarged or reduced range of the area, or the case of widening or narrowing the specific time band and then confirming only the image photographed in the widened or narrowed range of the time band.

As an example of apparatus searching for an image satisfying a prescribed condition from among a plurality of images, proposed in a reference patent 6 (i.e., Laid-Open Japanese Patent Application Publication No. 2002-369125) is an imaging apparatus searching a candidate for an image to be deleted based on a predetermined condition and displaying the candidate, and prompting a user to delete the image so as to continue the photographing when a capacity for storing images is in short supply.

Furthermore, some digital camera of the recent years is multi-functioned so as to match with the usage of photographing and replaying. Referring to the photography function, there is for example a digital camera comprising the function of detecting the parts of the face of a person from image data obtained by an imaging unit at the time of photographing (i.e., in the photography mode), and, upon selecting one of them, displaying an enlargement of the facial image of the facial zone including the selected facial part or tracking the selected facial part within the display unit so as to easily photograph an image with a facial expression desired by the photographer (e.g., refer to a reference patent document 7 (i.e., Laid-Open Japanese Patent Application Publication No. 2005-102175)). Referring to the replay function, there is for example a digital camera comprising an album function capable of replaying a registered image for each album and a calendar function capable of replaying a registered image for each calendar month.

Furthermore, a large number of photo images can be recorded in association with the availability of low cost and large capacity recording media in recent years, enabling a continuation of photographing while being freed from conventional cumbersomeness such as the replacement of recording media and the movement of the photo image recorded in the recording medium.

SUMMARY OF THE INVENTION

A camera according to a first aspect of the present invention comprises an imaging unit for imaging an object image; a first storage unit for storing plural still pictures and plural motion pictures, as images, and information other than the images; a display unit for displaying one or plural images, or an image output from the imaging unit; a search source specification unit for specifying a search source image; a search condition specification unit for specifying a search condition; and a search unit for searching an image similar to the search source image specified by the search source specification unit and in accordance with the search condition specified by the search condition specification unit.

BRIEF DESCRIPTION OF THE DRAWINGS

FIG. 1 is a diagram showing an outline of a hardware configuration of a digital camera as one of cameras according to a first preferred embodiment;

FIG. 7 is a diagram exemplifying output images grouped together on the basis of individual characteristic of an input image according to the first embodiment;

FIG. 9 is a diagram showing a flow (i.e., a basic type) of an image search according to the first embodiment;

FIG. 15A is a first diagram showing a situation of a search instruction operation when a digital camera according to the first embodiment performs an image recognition of a search reference image in advance of the process;

FIG. 15B is a second diagram showing a situation of a search instruction operation when a digital camera according to the first embodiment performs an image recognition of a search reference image in advance of the process;

FIG. 15C is a third diagram showing a situation of a search instruction operation when a digital camera according to the first embodiment performs an image recognition of a search reference image in advance of the process;

FIG. 16A is a first diagram exemplifying a display mode at the time of selecting a search source image according to the first embodiment;

FIG. 16B is a second diagram exemplifying a display mode at the time of selecting a search source image according to the first embodiment;

FIG. 17A is a first diagram exemplifying a search condition candidate display mode according to the first embodiment;

FIG. 17B is a second diagram exemplifying a search condition candidate display mode according to the first embodiment;

FIG. 17C is a third diagram exemplifying a search condition candidate display mode according to the first embodiment;

FIG. 18A is a first diagram showing a representative result display mode according to the first embodiment;

FIG. 18B is a second diagram showing a representative result display mode according to the first embodiment;

FIG. 18C is a third diagram showing a representative result display mode according to the first embodiment;

FIG. 18D is a fourth diagram showing a representative result display mode according to the first embodiment;

FIG. 31 is a rear view diagram of a digital camera according to the third embodiment;

FIG. 46A is a first diagram for describing an example of updating search condition information during an image search operation;

FIG. 46B is a second diagram for describing an example of updating search condition information during an image search operation;

FIG. 46C is a third diagram for describing an example of updating search condition information during an image search operation;

FIG. 46D is a fourth diagram for describing an example of updating search condition information during an image search operation;

FIG. 46E is a fifth diagram for describing an example of updating search condition information during an image search operation;

FIG. 46F is a sixth diagram for describing an example of updating search condition information during an image search operation;

FIG. 50 is a diagram exemplifying a configuration of a digital camera according to a fifth preferred embodiment;

FIG. 51 is a rear view diagram of a digital camera according to the fifth embodiment;

FIG. 52 is a flow chart showing an overall operation of a digital camera according to the fifth embodiment;

FIG. 56A is a first diagram exemplifying a correlation of a photography condition with an extracted selection choice when configuring to pick up an extraction choice based on information of the photography condition;

FIG. 56B is a second diagram exemplifying a correlation of a photography condition with an extracted selection choice when configuring to pick up an extraction choice based on information of the photography condition;

FIG. 56C is a flow chart showing a configuration of the process for picking up an extraction choice based on information of the photography condition;

FIG. 57 is a flow chart showing a configuration of the process for picking up an extraction choice based on a category with a priority order;

FIG. 59A exemplifies a first screen image when displaying photographed images in an index form in accordance with the link information registered in a favorites file; and FIG. 59B exemplifies a second screen image when displaying photographed images in an index form in accordance with the link information registered in the favorites file.

DESCRIPTION OF THE PREFERRED EMBODIMENTS

Figure 2:
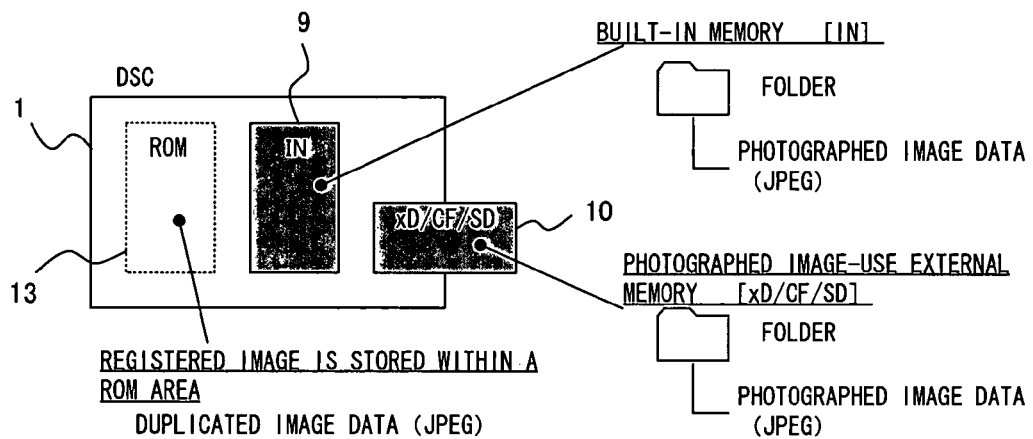
FIG. 2 is a diagram showing a management structure of an image data file stored in a digital camera according to the first embodiment.

The following is a description of the preferred embodiments of the present invention by referring to the accompanying drawings.

<First Embodiment>

A camera according to the first embodiment of the present invention is one enabling a search of a desired image simply and easily, and particularly the one enabling a browse of an image matching a requirement based on an image simply.

The present embodiment is described for a camera extracting various characteristic parts of a selected image, grouping by searching an image(s) stored in another storage medium by using the extracted characteristic parts as search condition, and presenting a user with the image(s).

The camera according to the present embodiment comprises display means, image selection means, search mode setup means, characteristics extraction means, image search means, correlation storage means and display control means. The camera comprehends a digital camera, a personal computer (PC), and a personal digital assistance (PDA) for example.

The display means, corresponding to a display unit according to the present embodiment, displays a replay of image data. The image selection means, corresponding to an operation unit according to the present embodiment, enables a selection of either piece of image data from the pieces thereof displayed in the display means.

The search mode setup means, corresponding to an operation screen (e.g., FIGS. 14 and 15) for setting an extraction of a characteristic related to a search source image according to the present embodiment, makes it possible to set a search mode for searching an image based on the image data.

The characteristics extraction means is capable of extracting a plurality of characteristic parts from search reference image data that is the image data selected as described above on the basis of the search mode. It corresponds to a central processing unit (CPU) executing a characteristics extraction process under a set condition according to the present embodiment.

The image search means is capable of searching image data matching with a searching condition from a group of image data stored in a predetermined storage medium by using the extracted characteristic part as the search condition. It corresponds to a CPU searching a group of image data stored in a predetermined storage medium based on the characteristic part of a search source image extracted by a characteristics extraction process according to the present embodiment.

The correlation storage means is a group management table storing information showing a correlation of one piece or more image data searched by the image search means with the search reference image data.

The display control means is capable of controlling the display means for displaying, in the display means, graphic data (i.e., an icon(s)), which represent individuals of the extracted plurality of characteristic parts, and image data (i.e., a representative candidate image), which has been searched on the basis of the characteristic parts, by correlating with each other based on the correlation storage means.

Such a configuration makes it possible to extract various characteristic parts of a selected image and search, and group, images stored in another storage medium by using the extracted individual characteristic parts as search conditions. This in turn enables an implementation of an album function capable of grouping images stored in a storage medium based on various characteristic parts. Also enabled is a confirmation as to what characteristic part is used as the basis of grouping the representative candidate image just by referring to an icon.

Meanwhile, the display control means is capable of displaying the search reference image data or a prescribed zone thereof, which has constituted a subject of the characteristics extraction that is extracted by the characteristic extraction means, as well as displaying the plurality of image data groups searched by the image search means.

Such a configuration makes it possible to confirm as to which characteristic part of what search source image has been used as the basis of searching.

The camera can further comprise characteristic selection means. The characteristic selection means selects at least one of a plurality of characteristic part for the search condition if a plurality of characteristic parts is extracted from the search reference image data by the characteristic extraction means. The characteristic selection means incidentally corresponds to an operation unit enabling an operation by using a cursor or touch-pen for selecting a discretionary characteristic part from among the extracted plurality thereof according to the present embodiment.

Such a configuration makes it possible to simply select a discretionary characteristic part.

Also, the image search means is configured to search by using the characteristic part selected by the characteristic selection means as the search condition, and the display control means is configured to display image data corresponding to an image zone of the searched image data group if an image zone of the search reference image data, in which the characteristic part has been extracted, is specified.

Such a configuration makes it possible to search, and display, a similar image to one specified by a zone picked up by matching a cursor or specified by a touch operation if a part of image zone of a search source image is selected as the search condition by the cursor or touch operation.

The camera can further comprise search candidate display means. The search candidate display means, corresponding to an applied image search flow according to the present embodiment, makes the display means to display, along with the selected image data, the characteristic part extracted from the image data by the characteristic extraction means as a search candidate for making it the search condition.

Such a configuration makes it possible to present the user with all search conditions enabling a grouping of images.

The camera can further comprise attribute information search condition setup means. The attribute information search condition setup means, corresponding to a search mode for adding supplementary information to a search condition according to the present embodiment, sets the attribute information of the image data as the search condition.

Such a configuration enables a search of not only a characteristic part of the image data but also a search by adding the attribute information.

Also, the display control means is capable of displaying the searched image group in a time series. Such a configuration makes it possible to display the searched images in the descending order of photographed date & time.

Now a description is on a preferred embodiment of the present invention in detail.

FIG. 1 is a diagram showing an outline of a hardware configuration of a digital camera as one of cameras according to a first preferred embodiment. The digital camera (or called a digital still camera (DSC)) 1 comprises a lens 2, an imaging element 3, an imaging unit 4, image buffer memory 5, a display process unit 6, a display unit 7, an image process unit 8, built-in memory 9, external memory 10, an external interface ("interface" is abbreviated as "I/F" hereinafter) 11, a compression/expansion unit 12, Flash ROM 13, a central processing unit (CPU) 14, an operation unit 16, a Global Positioning System (GPS) 17, a barometer 18, a microphone (mike) 19 and a bus 20.

The lens 2 forms an object image on the imaging element 3. The imaging element 3 applies a photoelectric conversion to an object image formed on the imaging element 3 by virtue of a function of the photography lens 2 (photography is also abbreviated as "photo" sometimes herein), thereby outputting an electric signal expressing an image. The imaging element 3 is a charge coupled device (CCD) for example.

The imaging unit 4 comprises a Correlated Double Sampling (CDS) for reducing a noise component, an automatic gain control (AGC) stabilizing a signal level and an analog/digital converter (A/D) for converting an analog electric signal into a digital electric signal. And the imaging unit 4 reduces a noise component of the analog electric signal output from the imaging element 3, stabilizes a signal level, converts the electric signal to a digital electric signal and outputs it.

The image buffer memory 5 is used as a temporary storage for data such as image data (i.e., image data expressing a still picture or motion picture; the same in the following) that is a digital electric signal output from the imaging unit 4, image data being processed in various image process applied by the image process unit 8 and group management data for managing a grouped images of a result of searching according to the present embodiment. The image buffer memory 5 is the dynamic random access memory (DRAM) for example.

The display process unit 6 performs the processes such as generating, and outputting to the display unit 7, a video signal displayable thereby on the basis of image data to which an image process is applied by the image process unit 8. This prompts the display unit 7 to display a screen image (such as a still picture and motion picture) based on the video signal.

The display unit 7 is a liquid crystal display (LCD) display, an organic electro luminescence (EL) display, or a touch panel, for example.

The image process unit 8 performs the various image processes such as a correction process including a gamma correction and white balance correction performed at the time of recording the image data, and an enlargement or reduction process (i.e., resize process) increasing or decreasing the number of pixels constituting an image.

The built-in memory 9 is a storage apparatus used as work area for the CPU 14 executing control processing, or as storage for storing a predetermined amount of photo image data.

The external memory 10, being a recording medium detachably attachable to the digital camera 1, is a storage-use recording medium for recording a still picture or image data expressing a motion picture photographed by the digital camera 1. As an example, the external memory 10 is a memory card such as an extreme digital (xD) card, Smart Media (Registered Trademark) and Compact Flash (CF) (Registered Trademark). The external memory 10 exchanges data with the digital camera 1 by being attached thereto.

The external I/F 11 is an interface for connecting to an external device in accordance with a prescribed communication standard. The prescribed communication standard includes a line communication standard comprehending a universal serial bus (USB) and the other standards, or a wireless communication standard comprehending Infrared Data Association (IrDA) and the other standards.

The compression/expansion unit 12 applies a compression and expansion processes (such as Joint Photographic Experts group (JPEG) system for example) to image data for recording and replaying the image data.

The Flash ROM 13, being nonvolatile memory that enables an electrical rewriting operation, stores program data, icon data, various data used during the execution of the camera control program, images (i.e., registered images) selected by carrying out a prescribed operation, icon images according to the present embodiment, in addition to the camera control program executed by the CPU 14.

The CPU 14 reads and executes a prescribed camera program stored in the ROM 13, thereby controlling the entirety of the digital camera 1. The CPU 14 executes a later described process by reading the program according to the embodiments of the present invention. Of the controls of the CPU 14, the function of control related to a display is called a display control unit 15.

The operation unit 16 is a series of buttons and such for receiving various instructions from a photographer and notifying the CPU 14 of them. The operation unit 16 includes a dial, a menu button, an XY operation button, an OK button, and a thumbnail selection button for example. Also included in the operation of the operation unit 16 are operations on a touch panel.

The menu button is for enabling an instruction for a menu display in the display unit 7. The XY button is for enabling a selection of various items, images and such displayed in the display unit 7. The OK button is for enabling a determination and instruction for the item and image being selected. The dial is for changing over the operation modes of the camera.

The GPS 17 is an apparatus for detecting the latitude and longitude. The barometer 18 is an apparatus for measuring an atmospheric pressure. The mike 19 is an apparatus for detecting a sound and converting it into an electric signal upon receiving the sound such as voice and ambient noise.

The bus 20 is one for connecting to a circuit (and mechanism) in order for the CPU 14 to control various circuits and mechanisms.

FIG. 2 shows a management structure of an image data file stored in a digital camera according to the present embodiment. In the digital camera 1, either of the Flash ROM 13, built-in memory 9 or external memory 10 stores a file as a subject of handling (e.g., image data and the data supplementary thereto).

As described above, an image picked up (i.e., imaged) by the digital camera 1 is stored in either of the built-in memory 9 or external memory 10. In this event, the stored image is managed in subordinate to an image root folder within the respective memory units. The image root folder is a root folder storing an image data file, and an image data file (e.g., in JPEG format) is stored right under the root folder.

The Flash ROM 13 registers a duplicate of an image selected in the external memory (i.e., xD, CF, SD cards and such) as described later. An image registered in the Flash ROM 13 is named as "registered image E". The data size of a registered image E is similar to that of the original image or it can be a reduction image depending on the memory capacity. The registered image E does not have a link with the original image. The registered image E is for registering in the Flash ROM 13 (i.e., flash memory) and therefore the number of registered pieces is finite for a limitation of the memory capacity allowing the registration.

Figure 3:
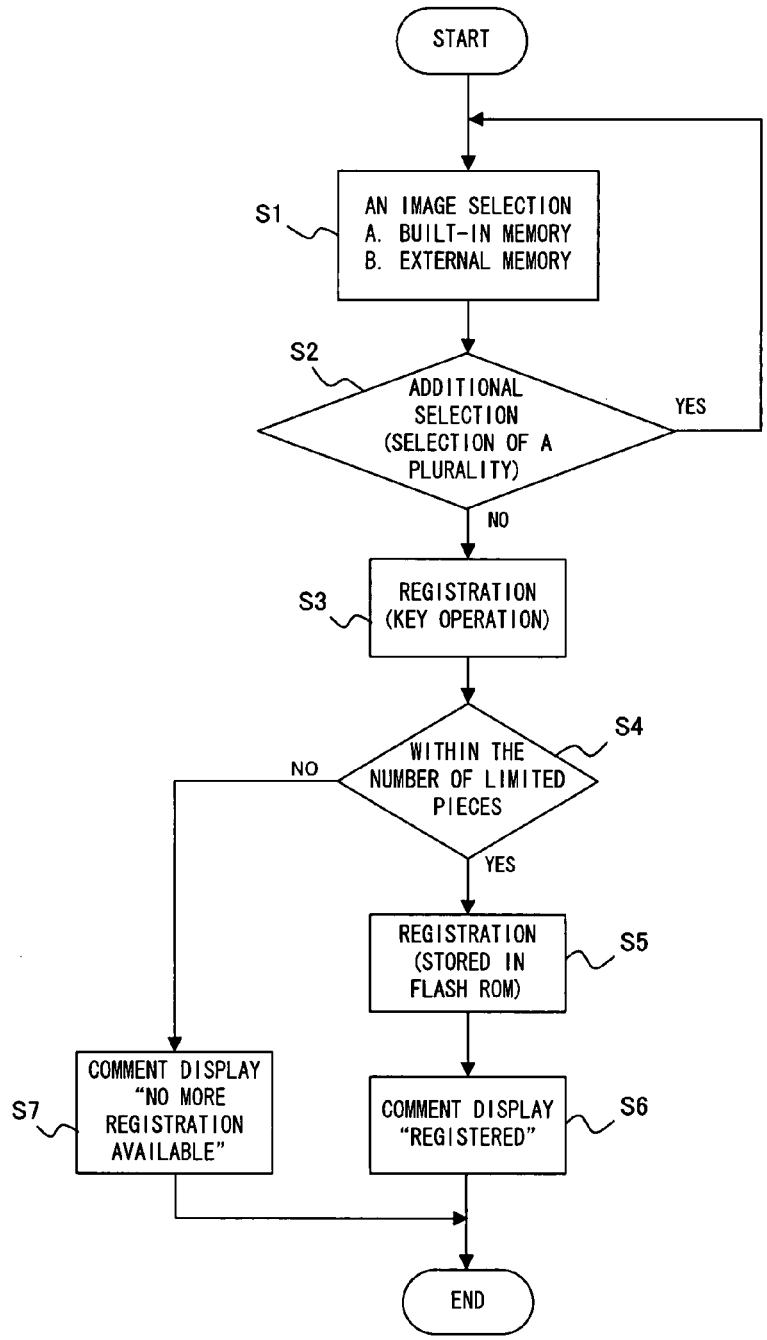
FIG. 3 is a diagram showing a flow of registering, in Flash ROM, an image stored in built-in memory or external memory.

FIG. 3 shows a flow of registering, in the Flash ROM 13, an image stored in the built-in memory 9 or external memory 10. First, the user uses the operation unit 16 to make the display unit 7 display an image(s) stored in the built-in memory 9 or external memory 10 and selects a discretionary image while referring to the displayed images (step 1; noted as "S1" hereinafter).

A plurality of images can be selected by repeating the operation of the S1 (S2). Upon completing the selection of images, the user selects "registration" from the menu by operating the operation unit 16 (S3).

The CPU 14 judges whether or not the selected images are within a predefined limited number of pieces (S4). If the judgment is that the selected images are within the predefined number of limited pieces (i.e., go to "yes" in S4), the CPU 14 stores the selected image group in the Flash ROM 13 (S5). Then the CPU 14 makes the display unit 7 display a comment "Images are now registered" (S6).

Contrarily, if the judgment is that the selected images exceeds the predefined number of limited pieces (i.e., go to "no" in S4), the CPU 14 makes the display unit 7 display a comment "no more registration is available" (S7).

FIG. 4 (i.e., FIGS. 4A, 4B, 4C and 4D) shows the relationships of a search source image with a search subject image according to the present embodiment. FIG. 4A shows a situation of selecting one image from the registered images E registered in the Flash ROM 13 and searching for an image related to the selected image by making the images stored in the built-in memory 9 and/or external memory 10 as the subjects of search.

Figure 4A:
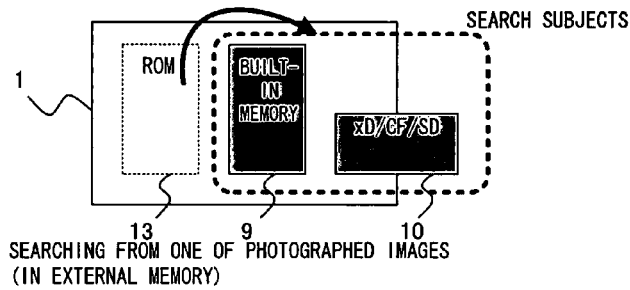
FIG. 4A is a first diagram showing a relationship of a search source image with a search subject image according to the first embodiment.
Figure 4B:
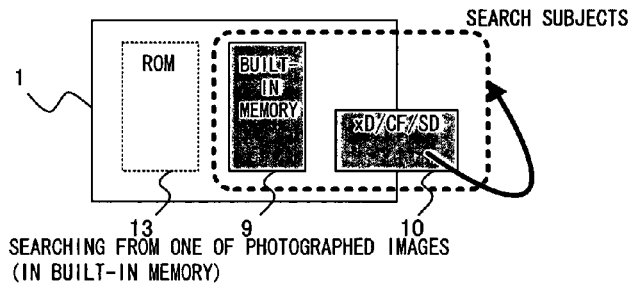
FIG. 4B is a second diagram showing a relationship of a search source image with a search subject image according to the first embodiment.

FIG. 4B shows a situation of selecting one image from them stored in the external memory 10 and searching for an image related to the selected image by making the images stored in the built-in memory 9 and/or external memory 10 as the subjects of search. Note that the configuration is such that the images searched from the built-in memory 9 and external memory 10 and grouped are displayed in the display unit 7 with the ones searched from the external memory 10 being given a higher priority.

Figure 4C:
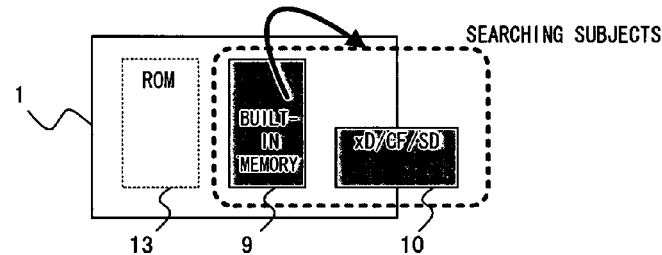
FIG. 4C is a third diagram showing a relationship of a search source image with a search subject image according to the first embodiment.

FIG. 4C shows a situation of selecting one image from them stored in the built-in memory 9 and searching for an image related to the selected image by making the images stored in the built-in memory 9 and/or external memory 10 as the subjects of search.

Figure 4D:
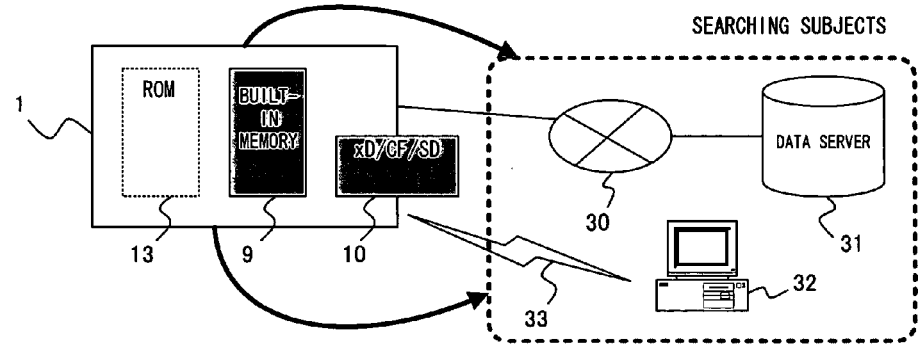
FIG. 4D is a fourth diagram showing a relationship of a search source image with a search subject image according to the first embodiment.

FIG. 4D shows a situation of selecting one image from among the photographed images (i.e., images stored in the Flash ROM 13, built-in memory 9 or external memory 10; sometimes abbreviated as "photo image(s)" hereinafter) and searching for an image related to the selected image by making images stored in media (e.g., a data server 33 or such), other than the digital camera, by way of a network 30 (e.g., Internet, local area network (LAN), wide area network (WAN)) and media (e.g., a personal computer (PC) 32 or such), other than the digital camera, by way of a radio telecom (abbreviated as "telecom" 33, as the subjects of search.

Figure 5:
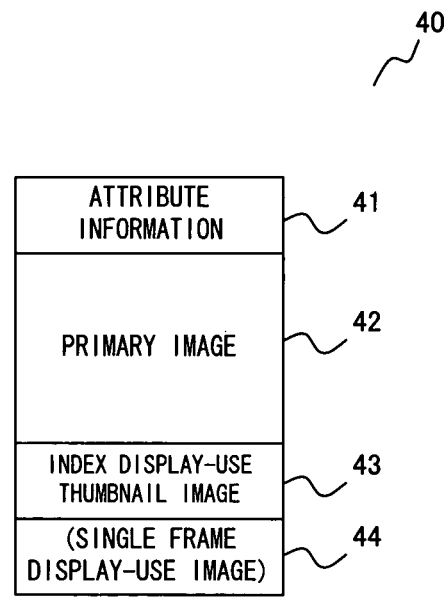
FIG. 5 is a diagram exemplifying an image file structure managed in the built-in memory or external memory according to the first embodiment.

FIG. 5 exemplifies an image file structure managed in the built-in memory 9 or external memory 10 according to the present embodiment. A single image file 40 is constituted by "attribute information" 41, "primary image" data 42, "index display-use thumbnail image" data 43, and "one frame display-use image" data 44.

The "attribute information" 41 refers to data such as photographed date & time, photography condition, photography environment and such. The "primary image" data 42 refers to photo image data. The "index display-use thumbnail image" data 43 is image data of a result of reducing the volume of information from the "primary image" for use as a thumbnail image.

The "single frame display-use image" data 44 refers to image data of a result of reducing the information volume from the "primary image" for making the display unit 7 display in a single frame display mode, that is, a QVGA image (i.e., image data of a resolution of 320×240 pixels). The "single frame display-use image" data 44 is the image data constituting a subject of search as described later.

When duplicating or moving the image data between the built-in memory 9 and external memory 10, such is carried out by the unit of image file. When registering the image data to the Flash ROM 13 from the built-in memory 9 or external memory 10, such is carried out by the unit of image file constituted by a data structure of a result of the primary image data being removed. Note that the primary image data may be included depending on a memory capacity allowance of the Flash ROM 13.

Figure 6:
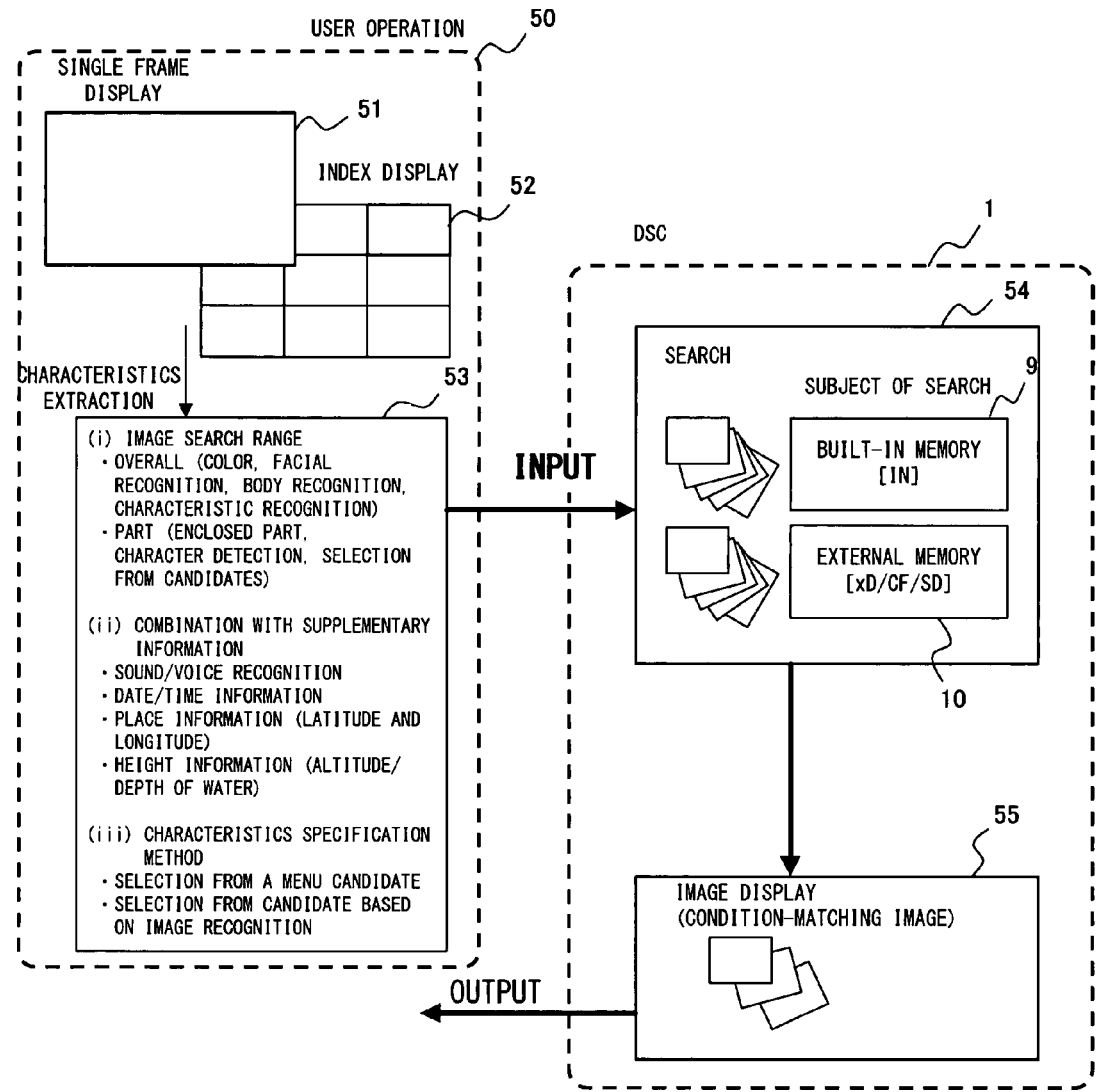
FIG. 6 is a diagram showing an outline of an image search according to the first embodiment.

FIG. 6 shows an outline of an image search according to the present embodiment. The section 50 enclosed by the dotted line on the left shows an operation of a user. The section enclosed by the dotted line on the right shows the operation of an operation of the digital camera 1.

The following is described by exemplifying FIG. 4A among the search types described for FIG. 4.

First, the user operates the operation unit 16 to make the display unit 7 display the registered images E of the Flash ROM 13. In this event, the registered images E can be displayed in the single frame display mode (51) or index display mode (52) as shown in FIG. 16.

Then the user carries out, by using the operation unit 16, the operation (53) of extracting the characteristic of the image based on the image 51 displayed in the single frame display mode or selected in the image group 52 displayed in the index display mode. That is, selecting as to which characteristic within the selected image is to use as the basis of grouping the images.

The methods for extracting the characteristic of an image includes: (i) an extraction method based on an image search range, (ii) an extraction method by a combination with supplementary information, and (iii) an image extraction method by specifying a characteristic. The following described these methods:

(i) The extraction method based on an image search range is to specify whether to make a search range of an image as the entirety of the image or a part thereof. In the case of making the search range of an image as the entirety thereof, the method for extracting a characteristic includes the color of the entire image, the recognition of a person's face if the image shows the person, the recognition of an object (e.g., a horizon, circular column, automobile, et cetera) in the image, or the recognition of a characteristic (e.g., a contrast, et cetera) of another image.

As the method for extracting a characteristic in the case of making the search range of an image a part of the image, it is possible to extract a characteristic of the selected part as a part (i.e., a part of a result of enclosing a part of the image with a frame by operating the operation unit 16, enclosing or tracing a prescribed part by operating the touch panel) similar to the case of the entirety of the image. Also possible is the character detection for the selected part. Also enabled for the digital camera is to pre-analyze the part, extract an extractable character and present the user with the extracted characteristic as a candidate for a search subject, so as to enable the user to select a characteristic for a search subject from the candidate.

(ii) The extraction method by a combination with supplementary information is one for extracting an image by combining image data with information supplementary to the image data (i.e., the attribute information 41 shown in FIG. 5). The information supplementary to image data includes the sound and voice surrounding at the time of photographing, a photographed date & time, a photographed place (i.e., latitude and longitude), height information (i.e., altitude and depth of water). These pieces of supplementary information are those obtained from the GPS 17, barometer 18, a mike 19 and such which are equipped in the digital camera, and stored together with the image data as the attribute information of the image file 40. Such pieces supplementary information can also be handled as the subjects of extraction.

(iii) The image extraction method by specifying a characteristic is one for selecting a candidate for a characteristic to constitute a search subject presented by the digital camera. One such method is the method of "selecting from the menu candidates". The "selecting from the menu candidates" is one in which candidates for a characteristic to constitute a specific search subject are pre-set (i.e., menu candidates) in the digital camera 1 and the menu candidates are presented to the user so that the user selects, from the menu candidates, a characteristic to be extracted.

Another method is one for "selecting from candidates based on an image recognition". The "selecting from candidates based on an image recognition" is a method in which the digital camera 1 pre-analyzes the selected image, extract as many a number of extractable characteristics as possible and presents the user with the extracted characteristics as search subject candidates so as to enable the user to select a characteristic to constitute a search subject from among the candidates.

As such, the user is enabled to make the characteristic obtained by the character extraction as the search condition for a grouping. Then the user gives a search execution instruction (INPUT) as the search condition to the digital camera 1.

Over at the digital camera 1, an image(s) matching with the input search condition is searched from the built-in memory 9 and/or external memory 10 (54). The digital camera 1 makes the display unit 7 display (55) the images matching with the search condition as the same group.

FIG. 7 exemplifies output images grouped together on the basis of individual characteristic of an input image according to the present embodiment. An INPUT image 60 is equivalent to the image 51 displayed in the single frame display mode, or a single image selected from an image group 52 displayed in the index display mode, either of which is shown in FIG. 6. An assumption here is that the user selects the person enclosed by the dotted line 61, performs the image recognition of the face and makes the recognized face as the search condition for the INPUT image 60. This prompts the digital camera 1 to make the display unit 7 display the images 64 and 65 shown in the group A as an image group matching with the search condition from the built-in memory 9 and/or external memory 10.

Another assumption is that the user selects the house enclosed by the dotted line 62, performs the image recognition of the image and makes the recognized house as the search condition for the INPUT image 60. This prompts the digital camera 1 to make the display unit 7 display the images 66 and 67 shown in the group B as an image group matching with the search condition from the built-in memory 9 and/or external memory 10.

Yet another assumption is that the user selects the ridge line of the mountain enclosed by the dotted line 63, performs the image recognition of it and makes the recognized ridge line of the mountain as the search condition. This prompts the digital camera 1 to make the display unit 7 display the images 68 and 69 shown in the group C as an image group matching with the search condition from the built-in memory 9 and/or external memory 10.

Figure 8:
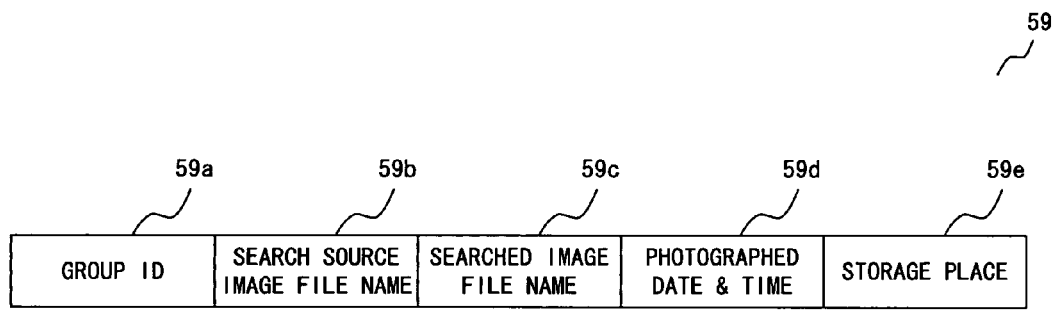
FIG. 8 is a diagram exemplifying a group management table according to the first embodiment.

FIG. 8 exemplifies a group management table according to the present embodiment. The group management table 59 is a table for managing images searched by the same characteristic and grouped, and is temporarily created in the image buffer memory 5.

The group management table 59 is constituted by data items, i.e., "group ID" 59a, "search source image file name" 59b, "searched image file name" 59c, "photographed date & time" 59d and "storage place" 59e.

The "group ID" 59a stores the ID for managing uniquely a group. The "search source image file name" 59b stores the file name of a search source image. The "searched image file name" 59c stores the file name of a searched image. The "photographed date & time" 59d stores the photographed date and time of an image specified by the "searched image file name" 59c. The "storage place" 59e stores the storage destination (i.e., built-in memory 9 or external memory 10) of an image specified by the "searched image file name" 59c.

Following a search by using a characteristic extracted from the search source image as search condition, if there is an image matching with the search condition as a result, a record of each of the extracted images is added to the group management table 59.

The next is a detailed description of contents described for FIGS. 6 and 7 by referring to the flow charts shown in FIGS. 9 through 13. In the flows of image searches, a basic type (refer to FIG. 9) and an applied type (refer to FIG. 11) exist. The basic type image search flow is one for extracting a characteristic of a search source image by specifying a search condition from a search menu statically set in the digital camera 1 and searching an image possessing the same characteristic as the extracted characteristic regardless of the characteristic of the search source image. Comparably, the applied type search flow is one for searching an image possessing the same characteristic as the extracted characteristic based on a search menu in accordance with the characteristic of the search source image.

FIG. 9 shows a flow (i.e., a basic type) of an image search according to the present embodiment. First, the user carries out an initial setup of a search condition by operating the operation unit 16 (S11). In this event, a search condition (i.e., the conditions for searching an image based on date, facial recognition, form, color and such, the specification of a search range and the combination of supplementary information) is pre-set as a menu in the digital camera 1 and therefore the user selects as to which search condition is used for the search from the menu displayed in the display unit 7 by operating the operation unit 16. Also set is as to which of the recording media (i.e., the Flash ROM 13, built-in memory 9, external memory 10 and such) is to be set as the subject of a search for the stored image.

Then, the user selects a search source image as a reference for a search (S12). Here, the display unit 7 is displaying an image for selecting which image of them, that is, (1) registered images, (2) images stored in the external memory 10 or (3) images stored in the built-in memory 9 is to be a search source image and therefore the user selects one image from either storage unit (S13).

After selecting one piece of search source image, the user carries out an operation for extracting a characteristic of the search source image by carrying out a prescribed operation on the operation unit 16 while confirming in the display unit 7 (S14). The details of the characteristics extraction is described later.

Then, the CPU 14 of the digital camera 1 searches an image group matching with a search condition from the recording medium selected in the S11 by using the characteristic of the search source image obtained by the operation in the S14 as the search condition and, if there are searched images, groups them (S15). Upon performing a grouping, a record corresponding to the detected images is added to the group management table 70 as described for FIG. 8.

If there is an image group matching with the search condition as a result of the search in the S15 (proceeding to "yes" in S16), the display control unit 15 makes the display unit 7 display the image group as the same group (S17).

Contrarily, if there is no image group matching with the search condition as a result of the search in the S15 (proceeding to "no" in S16), the display control unit 15 makes the display unit 7 display a comment to effect "there is no related image" (S18).

Figure 10:
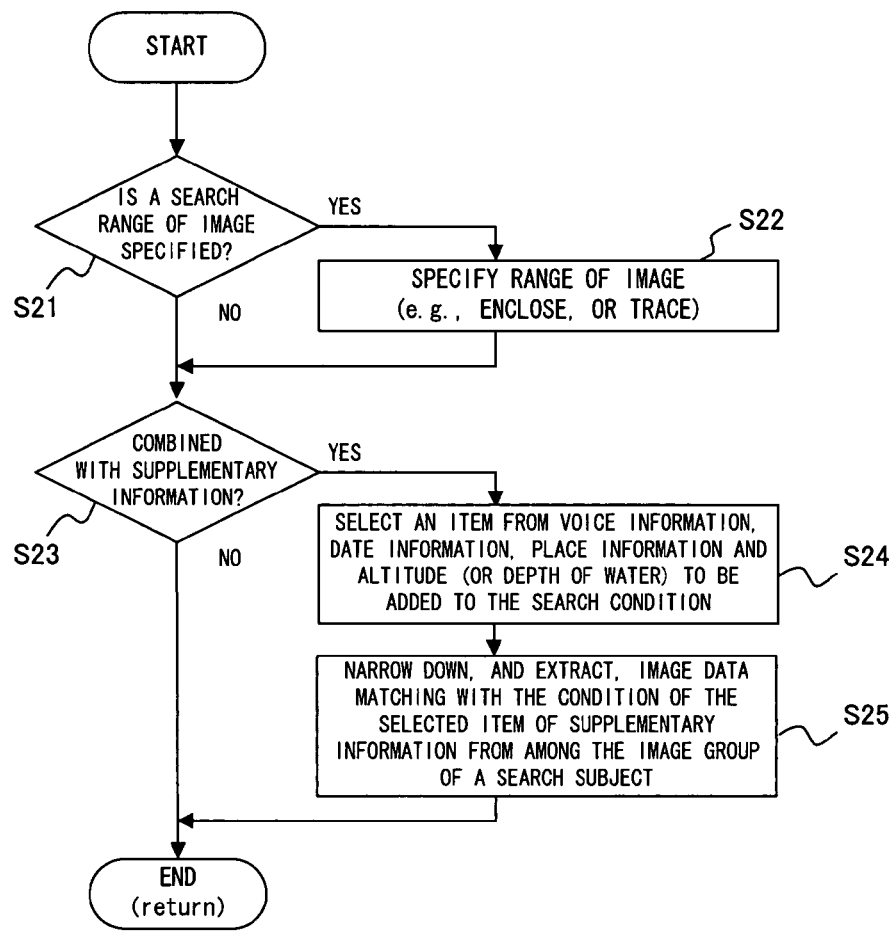
FIG. 10 is a diagram showing a detail flow of a characteristics extraction operation of S14.

FIG. 10 shows a detail flow of a characteristics extraction operation of the S14. As described for FIG. 6 (and S12), the user operates the operation unit 16 and makes the display unit 7 display a search source image. In this event, the search source image can be displayed in a single frame display (51) or index display (52). In the case of the index display (52), the user is required to operate the operation unit 16 for selecting either one image as the search source image.

Then, if a search range is specified for the search source image in the S11 (proceeding to "yes" in S21), the user is enabled to specify a part of the image as a search range by operating the operation unit 16 (S22). In this case, the user is enabled to specify the search range by enclosing a part of an image with a frame by operating the operation unit 16, by enclosing or tracing on a prescribed part by a touch panel operation. The reason for such specification of the search range is to improve the efficiency of a process speed of the extraction process by reducing the range of scan to a minimum if a plurality of search ranges is set as a characteristics extraction condition because the specified image zone is scanned one time per condition.

If a search range is not specified for the search source image in the S11 (proceeding to "no" in S21), a search range for extracting a characteristic from the search source image is set as the entire range thereof.

Then, if an image search by combing with the supplementary information is set in the S11 (proceeding to "yes" in S23), the user selects an item(s) of attribute information (e.g., voice information, date information, place information and altitude (or a depth of water)), which has been displayed in the display unit 7 by operating the operation unit 16, of the search source image to be added to the search condition (S24).

Then, one matching with the condition of the supplementary information selected in the S24 among the search subjects is narrowed down from a storage medium of the search destination (S25). The reason for this process is to reduce the number of search subject images by narrowing them down because a search by using supplementary information as the search condition is much faster than an image extraction by the image recognition.

In the meantime, if an image search is not carried out by combing with the supplementary information is set in the S11 (proceeding to "no" in S23), the present process ends.

Figure 11:
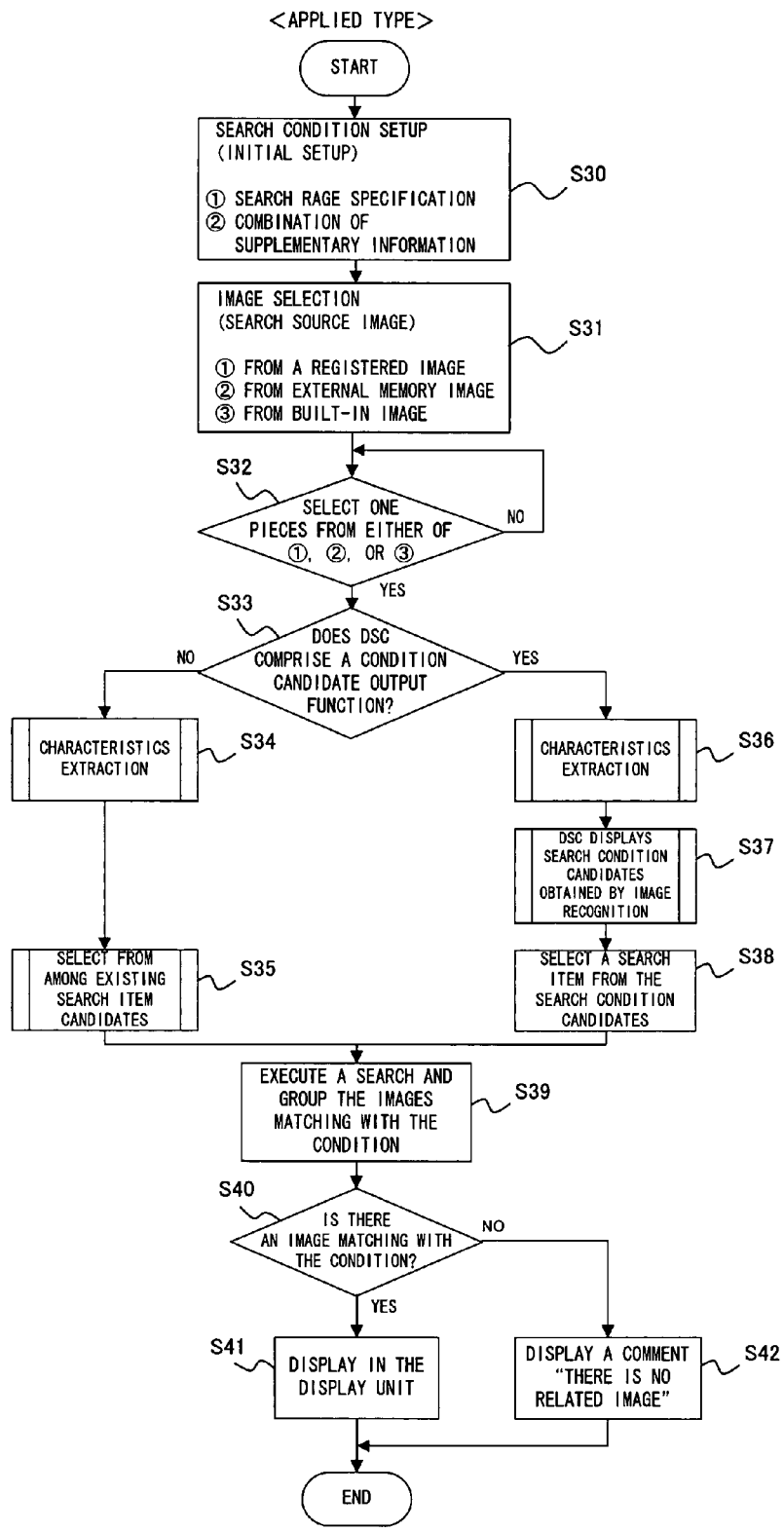
FIG. 11 is a diagram showing a flow (i.e., an applied type) of an image search according to the first embodiment.

FIG. 11 shows a flow (of an applied type) of an image search according to the present embodiment. First, the user carries out an initial setup of a search condition by operating the operation unit 16 (S30). Here, a search condition (i.e., a designation of a search range and a combination of supplementary information) is pre-set as a menu in the digital camera 1 and therefore the user selects either of the search conditions from the menu displayed in the display unit 7 by way of the operation unit 16. Also set is a selection of an image stored in either of the storage media (i.e., the Flash ROM 13, built-in memory 9, external memory 10 and such) as the search condition.

Then, the user selects a search source image as the reference for a search (S31). Here, the display unit 7 displays an image screen for selecting an image of either of (1) registered images, (2) images stored in the external memory 10 or (3) images stored in the built-in memory 9 as the search source image, and therefore the user selects one piece of image from either of the storage medium (S32).

After selecting one search source image, the user operates the operation unit 16 and makes the digital camera 1 carry out a characteristic extraction for the search source image (S32). In this event, if the digital camera 1 does not comprise a condition candidate output function, the process proceeds to the process route on the left of the drawing (i.e., S34 and S35), whereas if it comprises the aforementioned function, the process proceeds to the process route on the right of the drawing (i.e., S36 through S38) (S33).

Here, the condition candidate output function means the "selecting from candidates based on an image recognition" which has been described for the method described in the paragraph (iii) within the operation (53) for extracting a characteristic of an image shown in FIG. 6. Note that the process route on the left (i.e., S34 and S35) means the "selecting from the menu candidates" which has been described for the method described in the paragraph (iii) within the operation (53) for extracting a characteristic of an image shown in FIG. 6.

If the camera comprises no condition candidate output function (proceeding to "no" in S33), a characteristics extraction operation is performed for the search source image (S34). The detail of the characteristics extraction operation is similar to the case of FIG. 10.

After the operation of S34, only an overlapping characteristic(s) between candidates for characteristics constituting a search subject which is a pre-specific to the digital camera 1 and the characteristic extracted in the S34 is/are displayed in the display unit 7 as a candidate(s) for a search item, and therefore the user selects a characteristic constituting a subject of extraction from among the candidate(s) for search item (S35). A detail of the S35 is described later by referring to FIG. 12. After the S35, the process proceeds to S39.

Contrarily, if the camera comprises a condition candidate output function (proceeding to "yes" in S33), a characteristics extraction operation is performed for the search source image (S36). The detail of the characteristics extraction operation is similar to the case of FIG. 10.

After the process of the S36, the display control unit 15 of the digital camera 1 makes the display unit 7 display, as search condition candidates, all the characteristics obtained through an image recognition by a characteristics extraction in the S36 (S37). The detail of the S37 is described later by referring to FIG. 13.

The user selects a characteristic (i.e., a search item), from the search subject candidates displayed in the S37, for making it as a search subject by operating the operation unit 16 (S38). The process of S38 is followed by the S39.

Upon completion of the S35 or S38, the CPU 14 of the digital camera 1 searches an image group matching with a search condition by making the characteristic of the search source image obtained by the operation of the S35 or S38 from the storage media selected in the S30 and, if there are searched images, they are grouped (S39). Upon grouping the images, a record corresponding to the detected image is added to the group management table 70 as described for FIG. 8.

If there is an image group(s) matching with the search condition as a result of the search of the S39 (proceeding to "yes" in S40), the display control unit 15 makes the display unit 7 display the image group(s) as the same group (S41).

Contrarily, if there is no image group matching with the search condition as a result of the search of the S39 (proceeding to "no" in S40), the display control unit 15 makes the display unit 7 display a comment to effect "there is no related image" (S42).

Figure 12:
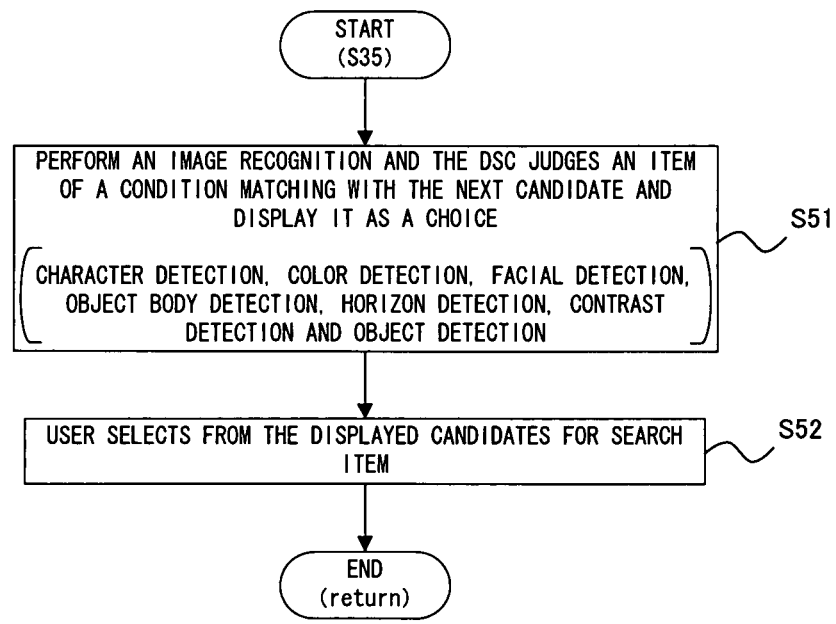
FIG. 12 is a diagram showing a detail flow of the process of S35.

FIG. 12 shows a detail flow of the process of the S35. The CPU 14 of the digital camera 1 performs an image recognition for the search source image selected in the S32 (i.e., the characteristics extraction operation of the S34). The CPU 14 of the digital camera 1 judges a characteristic item matching with the search item candidates (e.g., character detection, color detection, facial detection, object body detection, horizon detection, contrast detection, object detection, et cetera) which are pre-set in the digital camera 1 among the obtained characteristics as a result of the image recognition. The display control unit 15 of the CPU 14 makes the display unit 7 display the matching item as a search item candidate (S51).

The user selects a search item for making it as the search condition, from the search item candidates displayed in the display unit (S52).

Figure 13:
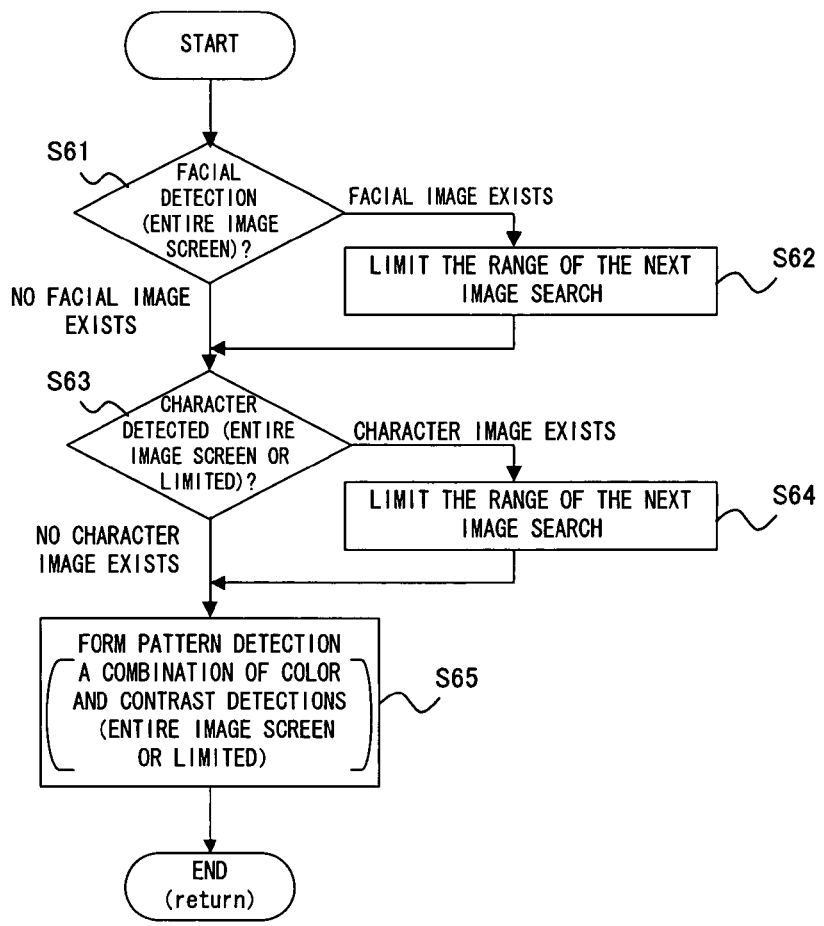
FIG. 13 is a diagram showing a detail flow of the process of S37.

FIG. 13 shows a detail flow of the process of the S37. The CPU 14 of the digital camera 1 detects a facial image of the search source image (S61). Here, the facial image refers to an image zone featuring a face of a person included in a search source image. The facial image can be recognized by an image recognition using a common algorithm based on the positional information of each parts of a human face. As an example, a flesh color is recognized by detecting a hue and a contour of the recognized part (e.g., a form is recognized, that is, whether the form of the contour is round or not) is detected. Then judged from the color and contrast is whether or not the eyes exist in the part of the form is recognized. Further judged from the interval of the eyes (i.e., the distance thereof) and how the mouth and shadow are formed is as to which direction the eye sight is oriented. Note that the positional information of each part of a face is stored in the Flash ROM 13.

If a facial image is detected from the search source image (proceeding to "a facial image exists" in S61), the CPU 14 limits the next search range of the image (S62). The limiting of the next search range of the image refers to limiting of a search range from the entire image zone to one excluding the image zone detected in the S61 at the image search of characteristics extraction by the next image recognition. This configuration makes it possible to improve a search speed. Accordingly, the character detection of the S63 performs the search in the range excluding the image zone detected in the S61.

If a facial image is not detected from the search source image (proceeding to "no facial image exists" in S61), or if the S62 is completed, the CPU 14 detects a detection image of a character from the search source image (S63). Here, the character image refers to an image zone forming a character included in the search source image. The character detection can recognize a character image by checking with a character pattern pre-registered in the Flash ROM 13 for example. As an example, character form patterns (of Japanese, English, et cetera) are pre-stored within the camera. A search of identicalness with the pre-stored character form patterns is performed by gradually narrowing down from the entirety to a part for an image, and by enlarging or reducing the character form patterns. A pattern matching also detects elements such as color and bordering.

If a character image is detected from the search source image (proceeding to "a character image exists" in S63), the range of the next image search is limited in the same manner as in the S62 (S64).

If a character image is not detected from the search source image (proceeding to "no facial image exists" in S63), or if the S64 is completed, a form pattern detection is performed (S65). Here, the form pattern detection is enabled in combination with a hue detection and contrast detection. As an example, it is possible to extract a contour of an object body based on a height difference of brightness values. As for the form pattern detection, if the range of an image search is limited in the S62 and S64, the detection is performed in the limited range, while if the range of an image search is not limited, the detection is performed for the entirety of the image. As an example, the form pattern recognized from the original image is temporarily stored and the contour of the entire image of a search subject image is generated. A search of identicalness with the temporarily stored form pattern is performed by gradually narrowing down from the entirety to a part for the search subject image of which the contour has been detected, and by enlarging or reducing the form pattern.

The next is a description of the above described contents from the viewpoint of the display aspect of the display unit 7 and that of the situation of operating the operation unit 16.

Figure 14A:
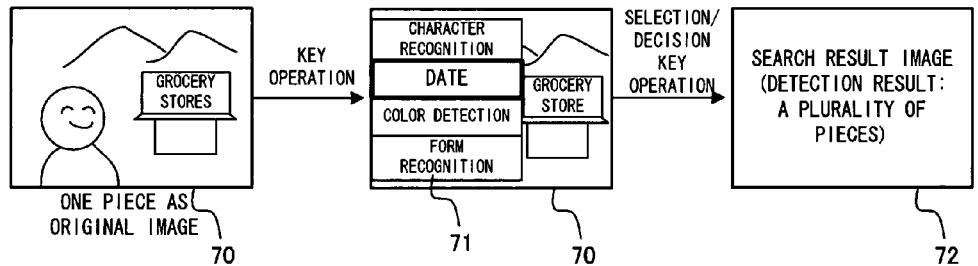
FIG. 14A is a first diagram showing a situation of a search instruction operation when a digital camera according to the first embodiment does not perform an image recognition of a search reference image in advance of the process.
Figure 14B:
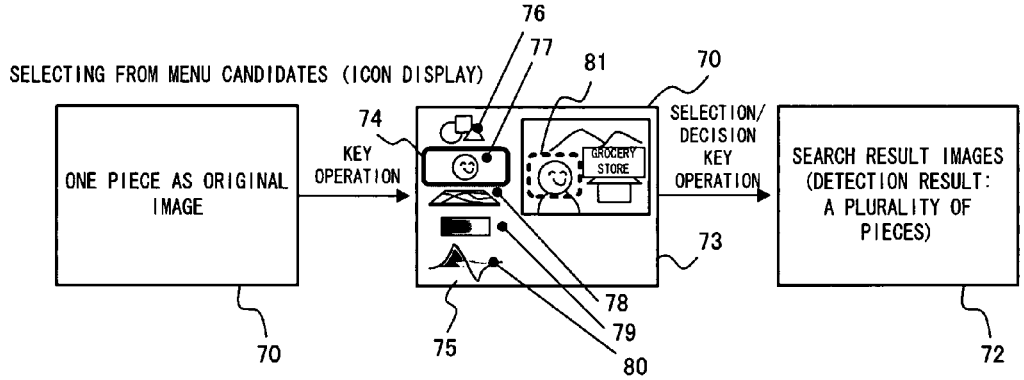
FIG. 14B is a second diagram showing a situation of a search instruction operation when a digital camera according to the first embodiment does not perform an image recognition of a search reference image in advance of the process.
Figure 14C:
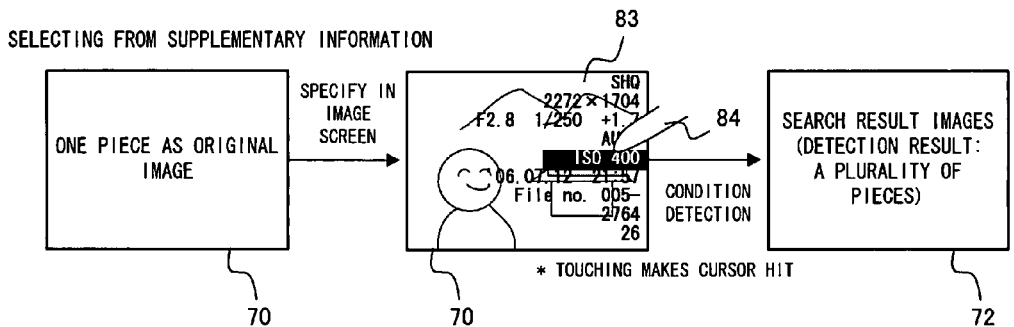
FIG. 14C is a third diagram showing a situation of a search instruction operation when a digital camera according to the first embodiment does not perform an image recognition of a search reference image in advance of the process.

FIG. 14 (i.e., FIGS. 14A, 14B and 14C) show a situation of a search instruction operation when a digital camera according to the present embodiment does not perform an image recognition of a search reference image in advance of the present process. FIG. 14 shows a situation of a search instruction operation corresponding to the flow (of the basic type) of the image search shown in FIG. 9. Note that the flow is likewise applicable to the search instruction operation corresponding to the process route (i.e., S34 and S35) on the left of FIG. 11.

FIG. 14A shows the case of selecting a search condition from a menu of candidates. First, the user selects one piece of image 70 constituting a search source image. Then the user operates a prescribed key of the operation unit 16, thereby making the display unit 7 display a menu 71 of the candidates (i.e., character recognition, date, color search and form recognition) for a search condition.

The user selects "date" for example from the candidates displayed in the menu 71 by a key operation of the operation unit 16 and presses a decision key. This prompts an execution of a search using the same date as the photographed date of the search source image. And a plurality of images matching with the search condition is detected and displayed as search result images 72.

FIG. 14B shows the case of selecting a search condition from a menu of candidates in icon display. First the user selects one piece of image 70 constituting a search source image. Then the user operates a prescribed key on the operation unit 16, thereby making the display unit 7 display a menu 75 constituted by icons (i.e., an icon 76 for form recognition, an icon 77 for facial image recognition, an icon 78 for photographed position (i.e., latitude and longitude), an icon 79 for color recognition and an icon 80 for altimeter/pressure meter (for altitude and depth of water)) delineating search conditions by figures. At this event, the search source image 70 is displayed in a reduced size on the top right corner of a display frame 73. All of the search conditions, menus and icons shown in FIG. 14 are pre-stored in the Flash ROM 13.

Meanwhile, an icon can be selected by moving a cursor 74 which is linked with a cursor 81 displayed on a search source image 70 which is displayed in a reduced size in the top right corner of the display frame 73. Therefore, a selection of the icon 77 (for facial image recognition) by the cursor 74 makes a display of the cursor 81 in the image zone constituting the subject of the facial recognition.

Then the user selects the icon 77 (for facial image recognition) for example from the candidates of an icon display menu 57 by a key operation on the operation unit 16 and presses the decision key. This prompts the digital camera 1 to carry out a search by using, as the search condition, the face as a result of the image recognition of the image zone selected by the cursor 81 in the search source image. Then, plural pieces of images matching with the search condition are detected and displayed as search result images 72.

FIG. 14C shows the case of selecting a search condition from supplementary information. First the user selects one piece of image 70 constituting a search source image. Then the user operates a prescribed key on the operation unit 16, thereby making the display unit 7 display the supplementary information (i.e., the attribute information) of the present search source image.

The user selects the supplementary information "ISO 400" (i.e., an ISO sensitivity value) for example from the displayed supplementary information by operating a key on the operation unit 16. Note that an alternative configuration may be such that the supplementary information is selected by the touch panel 83 and touch pen 84. In such a case, the configuration is such that the touch pen 84 touching an image displayed in the touch panel 83 displaying the selected supplementary information makes the cursor hit.

This prompts a search to be carried out by using the same ISO sensitivity value as that of the search source image. And a plurality of images matching with the search condition is detected and displayed as search result images 72.

FIG. 15 (i.e., FIGS. 15A, 15B and 15C) show a situation of a search instruction operation when a digital camera according to the first embodiment performs the image recognition of a search reference image in advance of the present process. FIG. 15 shows a situation of the search instruction operation corresponding to the process route on the right side (i.e., S36 through S38) of FIG. 11.

FIG. 15A shows the case of selecting a search condition from selection candidates. First the user selects one piece of image 90 constituting a search source image. This prompts the condition candidate output function of the digital camera 1 to extract automatically, from the search source image 90, a characteristic(s) possibly constituting a search condition and makes the extracted characteristic(s) displayed as a selection candidate(s).

For a display method for the selection candidates, the individual zones extracting characteristics in the search source image 90 may be enclosed by the respective dotted line frames for example as shown in FIG. 15A. The frame 91 is a result of extracting the ridge line of the mountain by performing a form recognition. The frame 92 is a result of extracting the characteristic by performing the character recognition of the characters "Grocery store" in the signboard. The frame 93 is a result of extracting a characteristic by performing the image recognition of the person's face.

Either of the frames 91, 92 or 93 can be set as a search condition by operating a touch panel or key. In the case of using a touch panel, a touching the zone enclosed by the frame 93 for example with the touch pen 94 makes the cursor hit the frame 93, thus selecting the frame 93. Meanwhile, in the case of using a key operation, an operation of the XY operation button of the operation unit 16 for moving the cursor to the frame 93 for example selects the frame 93.

Then, executed is a search based on the selected frame by a touch panel operation or key operation. And a plurality of images matching with the search condition is detected and displayed as search result images 95.

FIG. 15B shows the case of setting a search condition based on form recognition. First the user selects one piece of image 90 constituting a search source image in the touch panel.

Then the user traces a contour of a part desired to be applied by a form recognition by the digital camera 1, or draw a frame enclosing the part with the touch pen 94.

Then executed is a search based on the selected frame by a touch panel operation or key operation. And a plurality of images matching with the search condition is detected and displayed as search result images 95.

FIG. 15C shows the case of a representative result display method for each search item. This method is a result of expanding the method of FIG. 15A. According to FIG. 15A, the condition candidate output function of the digital camera 1 automatically extracts, from the search source image 90, characteristics possibly constituting a search condition, and then it does not carry out a search by displaying the extracted candidates, however. Contrarily, the method of FIG. 15C is configured to carry out a further search of the extracted respective characteristics and display a part of the search result images along with the icons delineating the respective search conditions.

First the user selects one piece of image 90 constituting a search source image in the touch panel. Then, upon operating a key, the condition candidate output function of the digital camera 1 automatically extracts, from the search source image 90, characteristics possibly constituting a search condition, followed by carrying out a search for the respective extracted characteristics.

Upon completion of the search, a reduction of the search source image 90 is displayed in a reduced size on the top left corner of the display frame 96. Then, an individual icon 97 delineating the applicable search condition, and a part 98 of the image searched by the search condition are displayed in a record format by correlating with each another (N.B.: there will be such records represented by the number of the icon 97 as a result of the search). The part 98 of the searched image displayed here refers to the representative candidate images for each of the search conditions (e.g., three images beginning with the latest date, or the oldest date, of a result of sorting the obtained images by the search in a descending order of dates or ascending order thereof).

When selecting either of the displayed records with a cursor 99, only an image group based on the selected search condition is displayed as search result images 95.

The next is a description on variations of display modes of the images displayed in the display unit 16 at the time of selecting a search source image, that of displaying a characteristic possibly constituting a search condition and after an execution of a search.

FIG. 16 (i.e., FIGS. 16A and 16B) exemplifies a display mode at the time of selecting a search source image according to the present embodiment. FIG. 16A shows a single frame display mode. FIG. 16B shows an index display mode.

Referring to FIG. 16A, the single frame display mode displays an image of the "one frame display-use image" 44 of the file structure described for FIG. 5.

FIG. 16B displays in a 3-row by 3-line (abbreviated as "3×3" hereinafter) index display method. In this case, displayed is the "index display-use thumbnail image" 43 described for FIG. 5. Moving a cursor 100 on the operation unit 16 makes it possible to select an individual image.

FIG. 17 (i.e., FIGS. 17A, 17B and 17C) exemplifies a search condition candidate display mode according to the present embodiment. FIG. 17A shows a mode for displaying a characteristic possibly constituting a search condition by a character of a candidate for a search item or an icon delineating the search condition. FIG. 17A is a display mode equivalent to that of FIG. 14A at the time of selecting a search condition, displaying a candidate menu 101 for a search condition.

FIG. 17B shows a display mode displaying a candidate for a search spot by a frame line. FIG. 17B is a display mode equivalent to that of FIG. 15A at the time of selecting a search condition. A movement of the cursor 102 of a frame line enables a selection of an image zone constituting a search condition. Upon selection, the display aspect of the frame line is changed from a dotted line to a solid line.

FIG. 17C shows a display mode in which a spot traced by a user constitutes a candidate for search. FIG. 17C is a display mode equivalent to that of FIG. 15B at the time of selecting a search condition. FIG. 17C exemplifies the case of tracing, with the touch pen 104, the ridge line 103 of the mountain of the image displayed in the touch panel 105.

FIG. 18 (i.e., FIGS. 18A, 18B, 18C and 18D) shows a representative result display mode according to the present embodiment. FIG. 18 is another display example of the mode displaying in the representative result display method described for FIG. 15C.

FIG. 18A displays a search source image in the single frame display mode, with the thumbnail images of five representative candidate images 110 being displayed in a horizontal row on the lower side. FIG. 18B displays a search source image in a single frame display mode, with the thumbnail images of five representative candidate images 110 being displayed in a vertical column on the right edge.

FIG. 18C displays a search source image in the index display mode, with the thumbnail images of five representative candidate images 110 being displayed in a horizontal row on the lower side.

FIG. 18D displays a search source image in the index display mode, with the thumbnail images of six representative candidate images 110 being displayed so as to surround the search source image selected with a cursor.

The representative result display mode shown in FIG. 18 displays three images with the latest dates for example among images matching with a search condition because the search condition is uniquely determined by the initial setup (S11) according to the basic flow shown in FIG. 9. In the flow of the applied type shown in FIG. 11, (a plurality of) search conditions of the digital camera 1 and representative images of a search result are displayed.

FIG. 19 (i.e., FIGS. 19A, 19B, 19C and 19D) shows a grouping result display mode according to the present embodiment. FIG. 19 is a mode for displaying an image group obtained as a result of searching by using a characteristic of a search source image as the search condition.

Figure 19A:
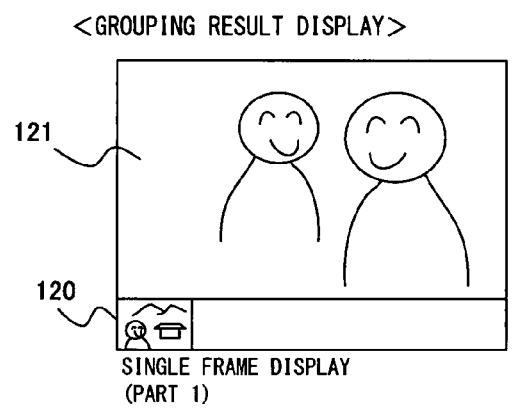
FIG. 19A is a first diagram showing a grouping result display mode according to the first embodiment.

FIG. 19A shows the case of displaying search result images in a single frame display mode (part 1). The search result image 121 is displayed in a single frame, and an operation of the operation unit 16 makes it possible to display a replay of another image (i.e., an image in the same group) searched by the same search condition. Note that the thumbnail image of the search source image 120 is shown on the left bottom of the display frame.

Figure 19B:
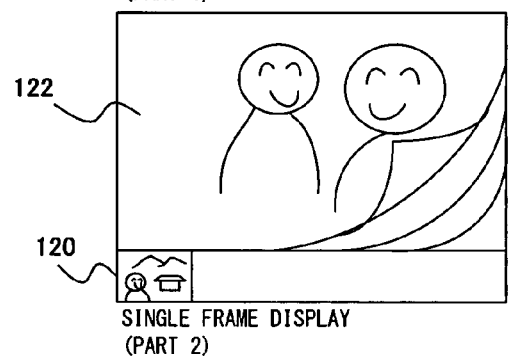
FIG. 19B is a second diagram showing a grouping result display mode according to the first embodiment.

FIG. 19B shows the case of displaying search result images in a single frame display mode (part 2). A search result image 123 is displayed as if pages are being turned over, otherwise it is similar to FIG. 19A.

Figure 19C:
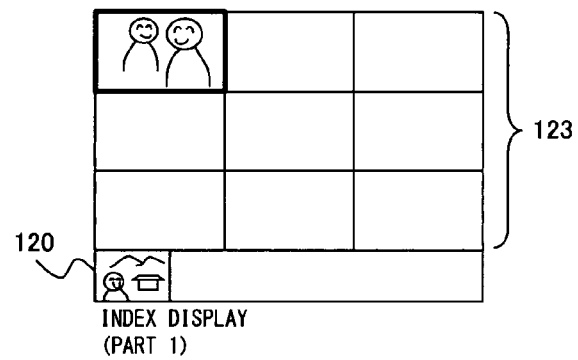
FIG. 19C is a third diagram showing a grouping result display mode according to the first embodiment.

FIG. 19C shows the case of displaying search result images in an index display mode (part 1). The search result images are displayed in an index display 123, and an operation on the operation unit 16 makes it possible to move a cursor to other images searched by the same search condition. Note that the thumbnail image of the search source image 120 is on the left bottom of the display frame.

Figure 19D:
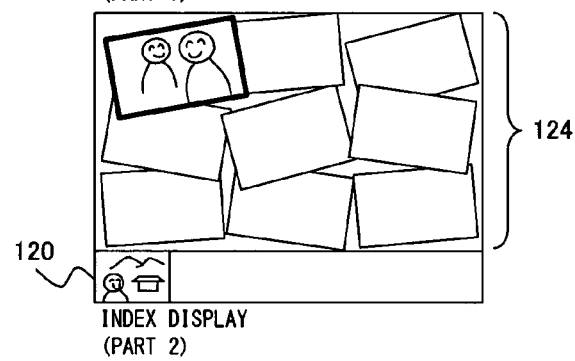
FIG. 19D is a fourth diagram showing a grouping result display mode according to the first embodiment.

FIG. 19D shows the case of displaying search result images in an index display mode (part 2). The individual thumbnail images of the index display 124 are displayed in a little shifted form, otherwise it is similar to FIG. 19C.

The present embodiment makes it possible to extract various characteristics of a selected image, search images stored in another storage medium by using each of the extracted characteristics as the search condition and group the images. This configuration enables an implementation of an album function capable of the grouping the images stored in the storage medium based on the various characteristics.

In summary of the above description, the present embodiment makes it possible to show a group of images as one set of album based on various search parameters. Also enabled is a capability of browsing an image according to an unclear requirement.

It therefore makes it possible to browse images matching a requirement based on an image.

<Second Embodiment>

A camera according to a second preferred embodiment of the present invention is one capable of searching a desired image simply and easily, and in particular capable of searching, and displaying, a desired image from stored images by a simple operation based on a displayed image.

Figure 20:
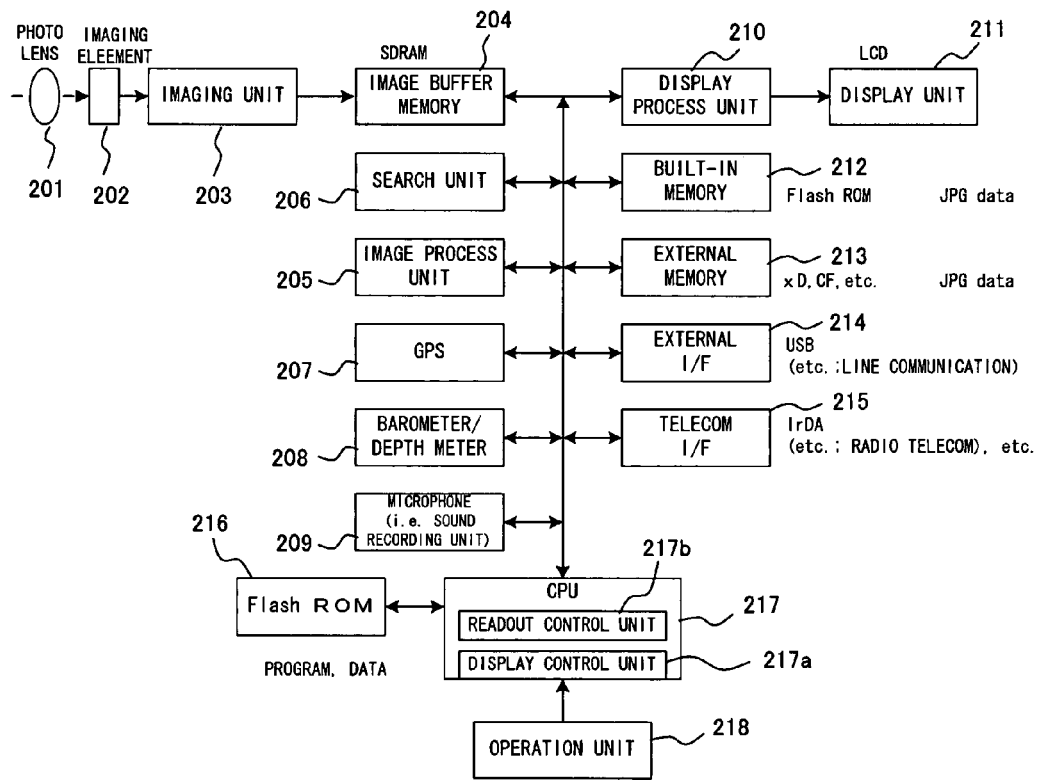
FIG. 20 is a block diagram of a digital camera according to a second preferred embodiment.

FIG. 20 is a block diagram of a digital camera that is a camera according to the present embodiment.

Referring to FIG. 20, a photo lens 201 forms an object image onto an imaging element 202. The imaging element 202 outputs an electric signal expressing an image by applying a photoelectric conversion to the object image formed onto the imaging element 202 by the function of the photo lens 201. The imaging element 202 is an image sensor constituted by a CCD or CMOS (Complementary Metal Oxide Semiconductor) for example.

An imaging unit 203, comprising a CDS for reducing a noise component, an AGC for stabilizing a signal level and an A/D converter for converting an analog electric signal into a digital electric signal, reduces a noise component of the analog electric signal output from the imaging element 202, also stabilizes a signal level, converts the analog signal into a digital electric signal and outputs it.

An image buffer memory 204 is used as a temporary storage for image data that is a digital electric signal output from the imaging unit 203, for image data in the process of various image processing performed by an image process unit 205 and for frame information of an image searched by a search unit 206. The image buffer memory 204 is synchronous dynamic random access memory (SDRAM) for example.

The image process unit 205 performs various image processes such as a compression/expansion process of image data, such as JPEG system, for recording and replaying the image data, a correction process such as gamma correction and white balance correction carried out at the time of recording the image data, and an enlargement/reduction process (i.e., a resize process) increasing or decreasing the number of pixels constituting an image.

The search unit 206 performs the process of searching, by using one of a registered favorite image (i.e., an image for making a search source image), an image based on a characteristic part of the favorite image and supplementary information thereof and storing the frame information of the searched image in the image buffer memory 204.

A GPS 207 measures latitude and longitude. A barometer/depth meter 208 measures a barometric pressure and water depth. A microphone (mike) (i.e., a sound recording unit) 209 converts a voice into an electric signal.

A display process unit 210 performs a process for generating a video image signal displayable by a display unit 211 from image data of a result of applying an image process by the image process unit 205 and outputting the video image signal to the display unit 211. This enables the display unit 211 to display a video image based on the video image signal. The display unit 211 is a liquid crystal display (LCD), a touch panel type LCD, an organic electro luminescence (EL) display or such, for example.

Built-in storage memory 212 is a recording medium built-in in the present digital camera and is a storage-use recording medium which records image data (e.g., JPG data) expressing an image. The built-in storage memory 212 is Flash ROM for example that is nonvolatile memory allowing an electrical rewriting.

External storage memory 213 is a recording medium detachably attachable to the present digital camera and is a storage-use recording medium which records image data (e.g., JPG data) expressing a photo image. The external storage memory 213 is a memory card such as xD card, Smart Media (a registered trademark), Compact Flash (a registered trademark) or such.

An external I/F 214 is an interface for connecting to an external device by way of a prescribed line communication standard. The prescribed line communication standard includes the USB and other line communication standards.

A telecom I/F 215 is an interface for connecting to an external device by way of a prescribed radio telecom standard. The prescribed radio telecom standard refers to the IrDA and other radio telecom standards.

Flash ROM 216 is nonvolatile memory allowing an electrical rewriting and stores various pieces of data used in the process of executing a camera program, in addition to storing the camera program executed by a CPU 217. It also stores image data of a favorite image possibly constituting a search source when the search unit performs a search.

The CPU 217 reads and executes the camera program stored in the Flash ROM 216, thereby controlling the operation of the entirety of the present digital camera. The CPU 217 also performs a display control by executing the camera program, thereby implementing a display control unit 217*a*. The CPU 217 also performs a readout control of an image by executing the camera program, thereby implementing a readout control unit 217*b*.

An operation unit 218 is a series of buttons for receiving various instructions from the user (e.g., a photographer) and notifying the CPU 217 of them. The operation unit 218 includes later described shutter button, zoom button, MENU button, mode dial, Up/Down/Left/Right button and OK button for example. An operation on the operation unit 218 includes an operation through a touch panel.

Figure 21:
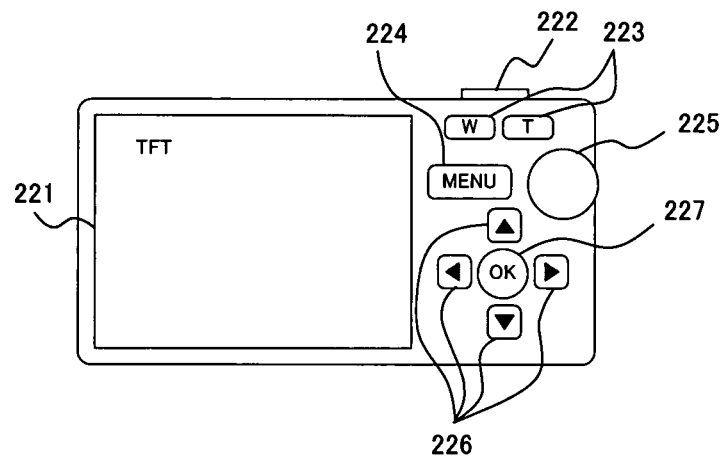
FIG. 21 is a rear view diagram of a digital camera according to the second embodiment.

FIG. 21 is a rear view diagram of a digital camera according to the present embodiment.

Referring to FIG. 21, a TFT 221 is the display screen of the display unit 211. The shutter button 222 is a button for instructing for photographing. The zoom button 223 is a button for instructing for zooming to a wide angle or telephoto. The MENU button 224 is a button for giving instructions such as having the TFT 221 display various menus and returning to a state capable of executing an image search. The mode dial 225 is a dial for setting either operation mode of a series thereof such as photo mode, replay mode (as an example of common replay mode), favorites registration mode (as an example of search image registration mode), favorites replay mode (as an example of search image replay mode), edit mode and telecom mode. The Up/Down/Left/Right button 226 is one for giving instruction such as for moving the cursor displayed in the TFT 221 and for a frame advance of images displayed in the TFT 221. The OK button 227 is one for giving instruction such as for selecting from selection items displayed in the TFT 221, confirming a selected image, searching for an image, and such.

The next is a description on an operation of the digital camera according to the present embodiment.

Figure 22:
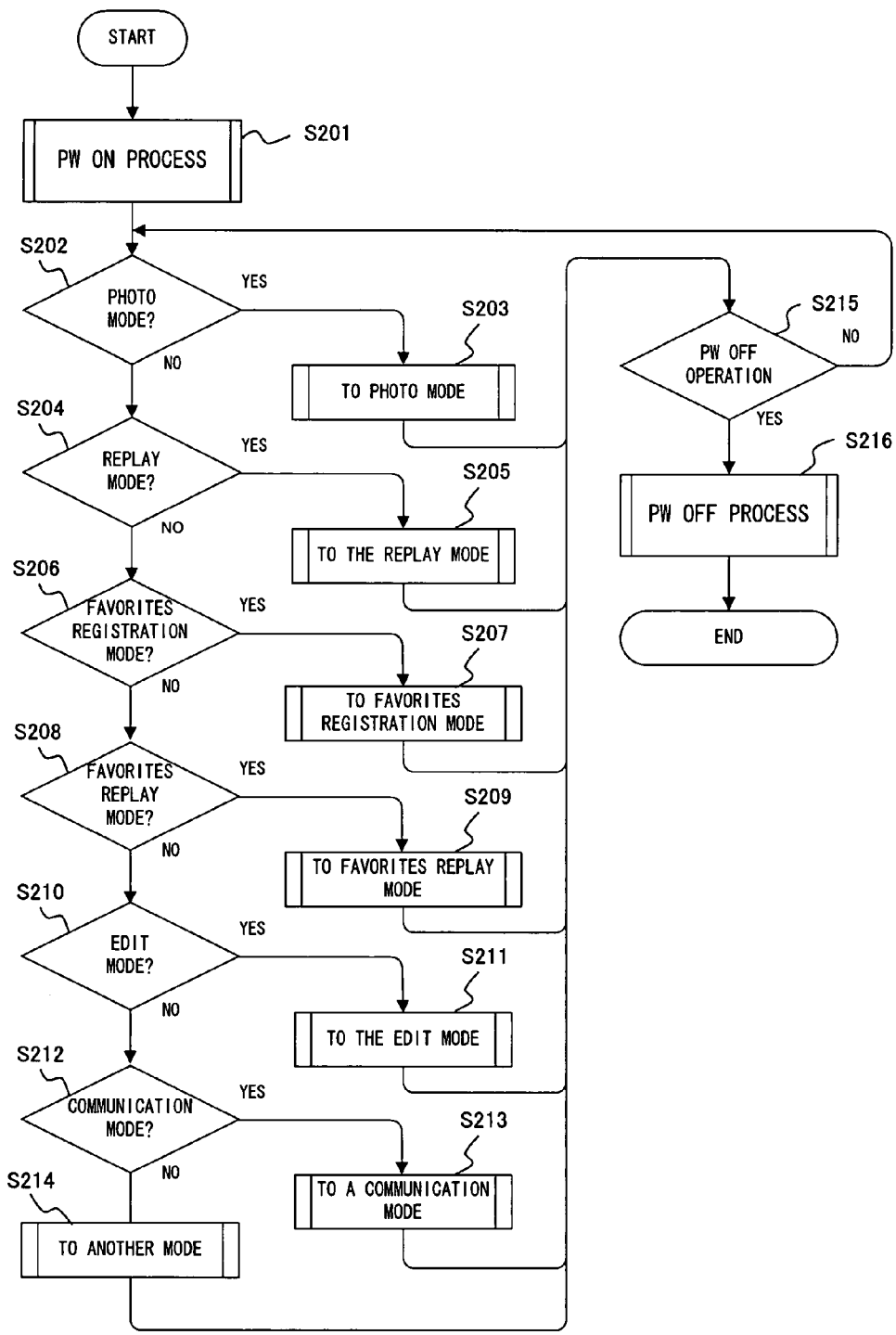
FIG. 22 is a flow chart showing the basic operation of a digital camera according to the second embodiment.

FIG. 22 is a flow chart showing the basic operation of a digital camera according to the present embodiment. The present flow starts when a power switch (not shown in a drawing herein) is turned on.

Upon starting the present flow, a prescribed power on (Pwr On) process is performed as shown in FIG. 22 (step 201; simply noted as "S201" hereinafter).

Judged is whether or not a photo mode is set by the mode dial 225 (S202). Here, if the judgment result is "yes", the process proceeds to the photo mode (S203) enabling photography of image.

If the judgment result of S202 is "no", then judged is whether or not a replay mode is set by the mode dial 225 (S204). Here, if the judgment result is "yes", the process proceeds to a replay mode (S205) enabling a replay of an image.

If the judgment result of S204 is "no", then judged is whether or not a favorites registration mode is set by the mode dial 225 (S206). Here, if the judgment result is "yes", the process proceeds to the favorites registration mode (S207) enabling a registration of a favorite image. While it is described in detail later, the process performs such as a registration of a favorite image possibly constituting a search source for searching an image.

If the judgment result of S206 is "no", then judged is whether or not a favorites replay mode is set by the mode dial 225 (S208). Here, if the judgment result is "yes", the process proceeds to the favorites replay mode (S209) enabling a search for an image based on a favorite image for making it a search source. While it is described in detail later, this process performs the process for selecting one of the registered favorite images as a search source, searching an image based on a characteristic part of the favorite image and the supplement information of the image and displaying the searched image.

If the judgment result of S208 is "no", then judged is whether or not an edit mode is set by the mode dial 225 (S210). Here, if the judgment result is "yes", the process proceeds the edit mode (S211) enabling an edit of an image.

If the judgment result of S210 is "no", then judged is whether or not a communication mode is set by the mode dial 225 (S212). Here, if the judgment result is "yes", the process proceeds to the communication mode (S213) enabling a communication with an external device.

If the judgment result of S212 is "no", then performed is a process in accordance with another mode which is set by the mode dial 225 (S214).

As such, the process proceeds to a mode which is set by the mode dial 225 and, upon completion of the process, then judged is whether or not the power switch is turned off (i.e., a Pwr Off operation is carried out) (S215) and, if the judgment result is "yes", a prescribed power off (Pwr Off) process is performed (S216), followed by ending the present operation. Contrarily, if the judgment result is "no", the process shifts back to S202.

Figure 23:
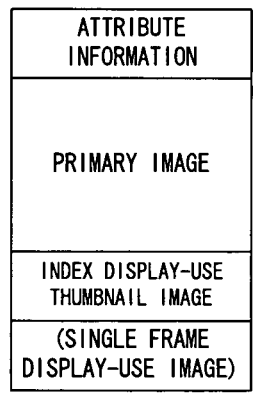
FIG. 23 is a diagram showing a structure of an image file.

Note that in the process of the photo mode (S203) of the present flow, the image data of the photo image is stored in the built-in memory 212 or external storage memory 213 as an image file possessing the structure shown in FIG. 23. Referring to FIG. 23, the attribute information is supplementary information of a photo image including the photographed date and photography condition (e.g., shutter speed, exposure value, latitude and longitude, barometric pressure, water depth) of the image, et cetera. The primary image is a photo image (i.e., image data). An index display-use thumbnail image is a thumbnail image (i.e., image data) which is a result of the primary image reduced for use in an index display. A single frame display-use image is an image (i.e., image data) reduced for a single frame display.

Figure 24:
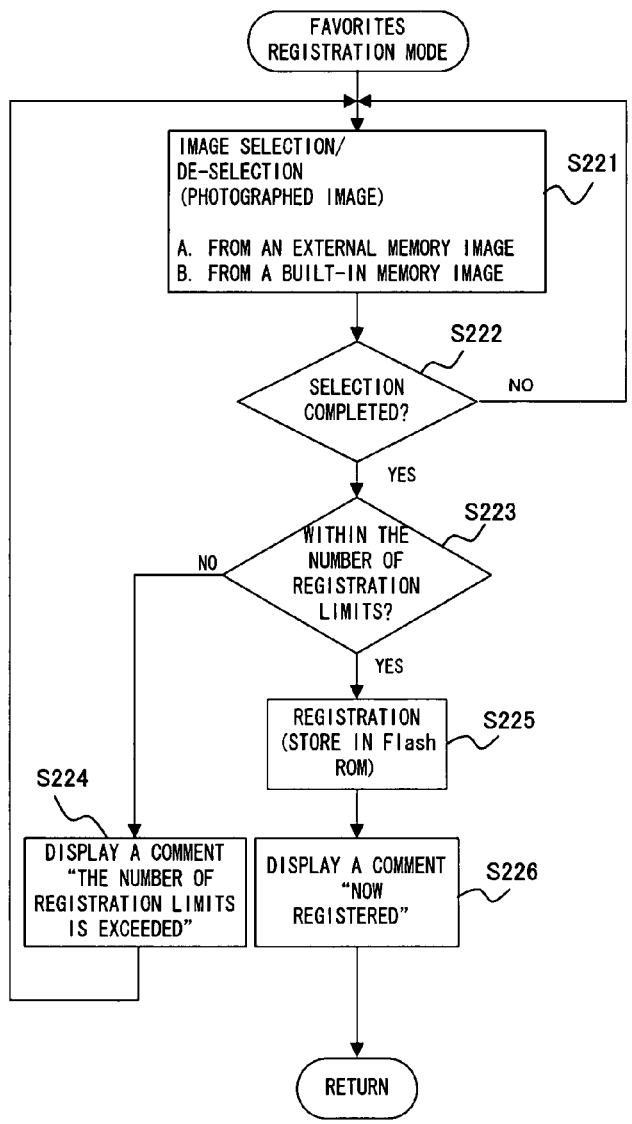
FIG. 24 is a flow chart showing the process of a favorites registration mode (S207) in details.

FIG. 24 is a flow chart showing the process of the favorites registration mode (S207) in details.

As shown in FIG. 24, first performed is a selection/de-selection process for a favorite image to be registered in accordance with the operation by the user on the operation unit 218 in the present flow (S221). This process enables a selection of one or more photo images as a favorite image(s) from among the photo images stored in the built-in memory 212 and/or external memory 213, and a release of the selection.

Then judged is whether or not the selection of a favorite image is completed (S222). This is performed by judging whether or not the OK button 227 has been pressed. Here, if the judgment result is "no" (i.e., the OK button is not pressed), the process shifts back to S221.

Contrarily, if the judgment result of S222 is "yes", (i.e., the OK button 227 has been pressed), then judged is whether or not the number of photo images selected as favorite images is within the number of registration limits (S223). Note that the present embodiment is for example configured to set the number of registration limits at nine.

If the judgment result of S223 is "no", a comment "the number of registration limits is exceeded" is displayed in the TFT 221 (S224) and the process shifts back to S221.

Contrarily if the judgment result of S223 is "yes", the photo images selected as favorite images are registered as favorite images (S225), a comment "now registered" is displayed in the TFT 221 (S226) and the process returns. The favorite images are registered by copying the image files of the photo images to be registered as favorite images to the Flash ROM 216. The photo image copied to the Flash ROM 216 and the ones of the copy source are mutually independent so that, for example, even if the photo image of the copy source is erased, the ones copied in the Flash ROM 216 remains un-erased.

Figure 25:
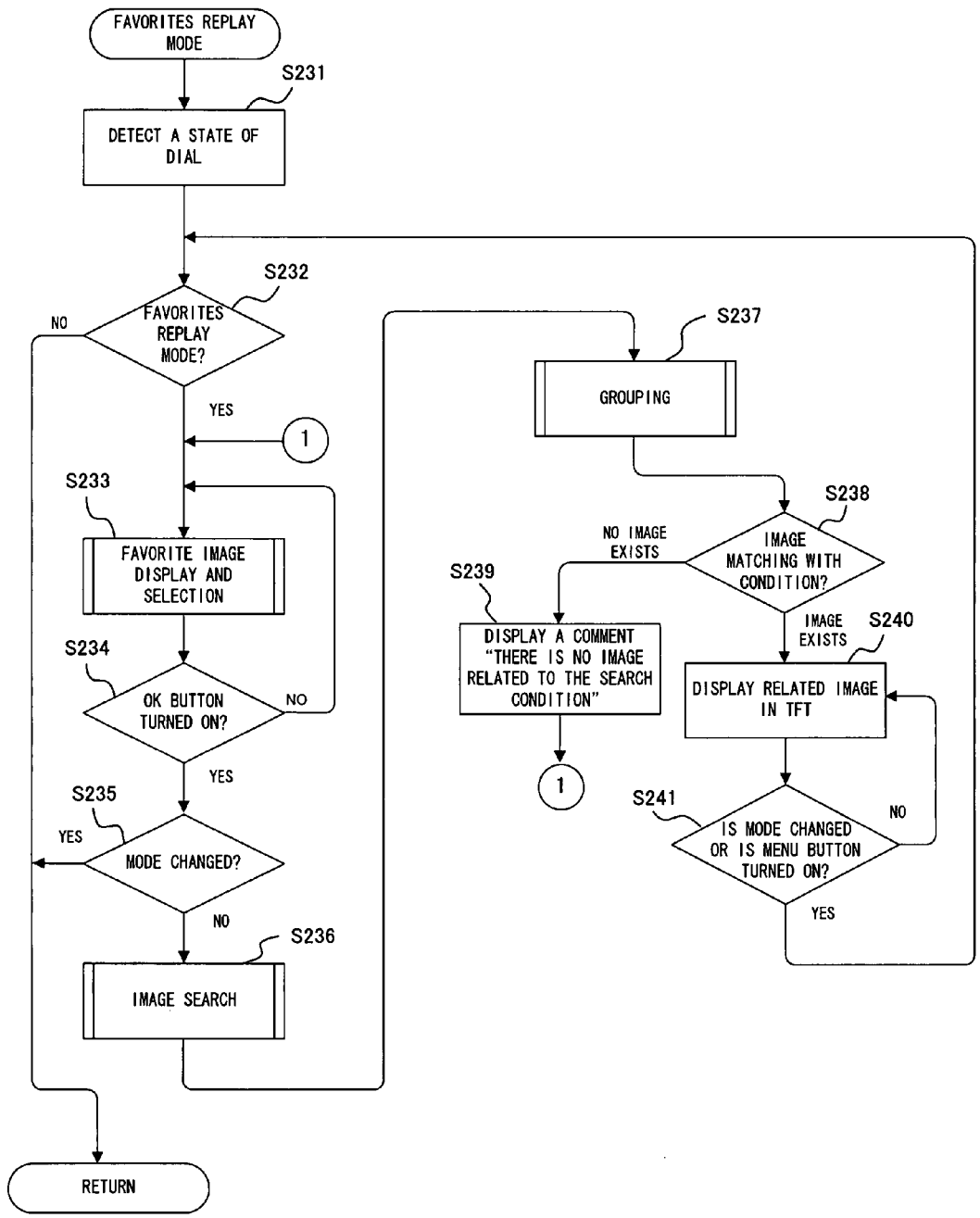
FIG. 25 is a flow chart showing the process of a favorites replay mode (S209) in details.
Figure 26:
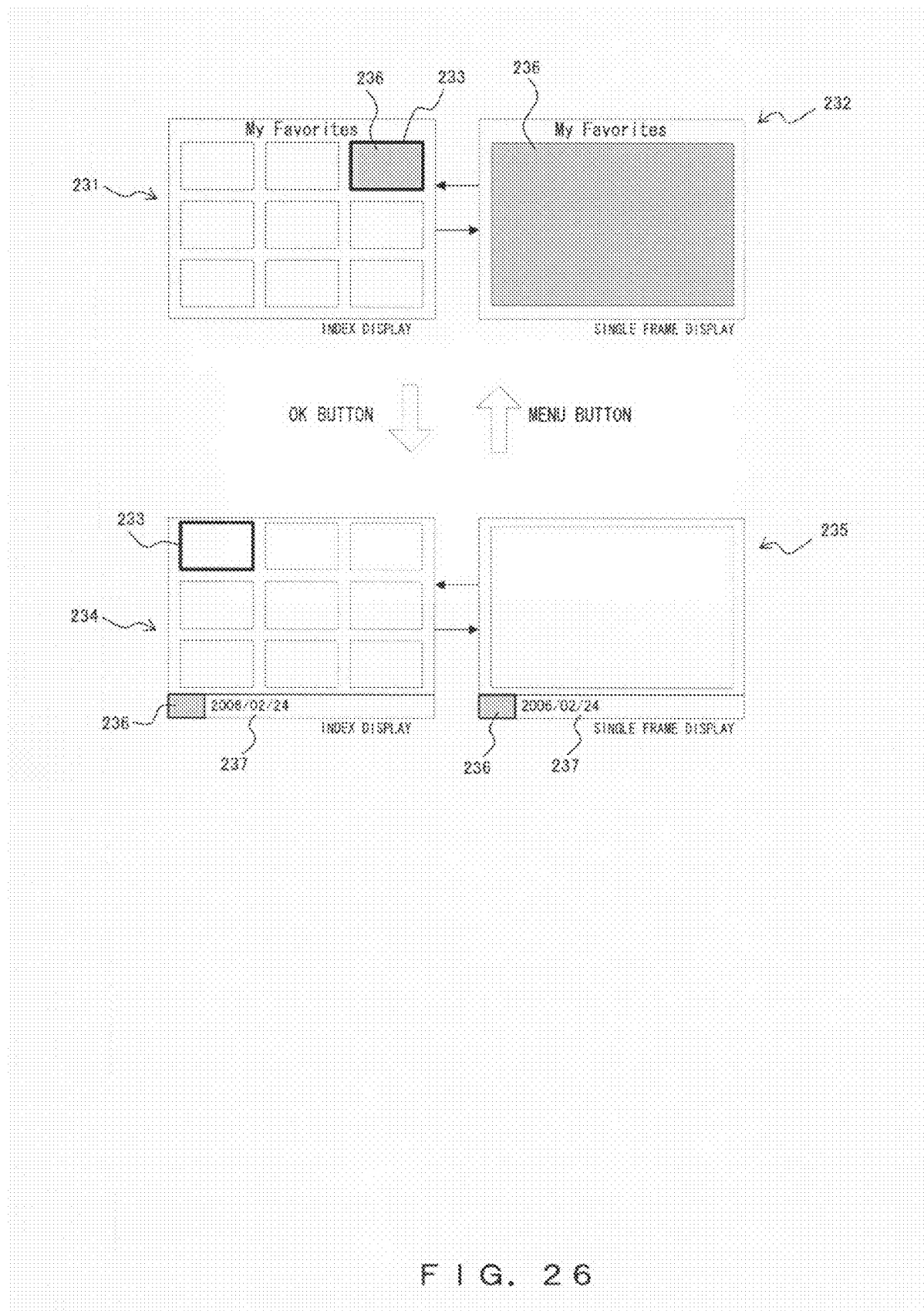
FIG. 26 is a diagram describing contents displayed in a TFT during the process of the favorites replay mode.

FIG. 25 is a flow chart showing the process of the favorites replay mode (S209) in details; and FIG. 26 is a diagram describing contents displayed in the TFT 221 during the process.

As shown in FIG. 25, first, a state of the mode dial 225 is detected in the present flow (S231), followed by judging whether or not the favorites display mode is set by the mode dial 225 (S232). Here, if the judgment result is "no", the process returns and, if the judgment result is "yes", the registered favorite images are displayed and selected (S233).

In displaying the favorite images in the S233, an index display-use thumbnail image or single frame display-use image included in the image file of the favorite image stored in the Flash ROM 216 is read and displayed in the TFT 221. As an example, if the index display form is already set, the index display-use thumbnail images of the favorite images are read and displayed in the TFT 221 by an index display form (i.e., the present embodiment premises a 3×3 index display form; refer to a display screen 231 shown in FIG. 26). If the single frame display form is already set, the single frame display-use image of the favorite image is read and displayed in the TFT 221 by the single frame display form (refer to a display screen 232 shown in FIG. 26). Here, the configuration is such that, if there are plural favorite images, a sequential single frame display of the favorite images by an operation of the Up/Down/Left/Right button 226 is enabled. Note that the display of the favorite images is configured to change between the index display form and single frame display form freely by the user operating on the operation unit 218.

Meanwhile in the selection of a favorite image in the S233, one favorite image for making it a search source is selected. As an example, if the favorite images are already displayed in the index display form, a favorite image at the cursor position is selected as a search source (refer to a cursor 233 within the display screen 231 shown in FIG. 26). Note that the cursor is configured to allow a movement in accordance with the user operating the Up/Down/Left/Right button 226. If a favorite image is displayed in the single frame display form, the displayed favorite image is selected as a search source.

Then judged is whether or not the OK button 227 has been pressed (S234) and, if the judgment result is "yes", the process proceeds to S235, while if the judgment result is "yes", it returns to the S233. Note that if the judgment result of S234 is "yes" (i.e., the OK button 227 has been pressed), the selected favorite image results in being determined. Meanwhile, if the favorites replay mode remains as being set in accordance with the pressing of the OK button 227, an image search of a later described S236 is started, and therefore the OK button 227 is configured to include also the function of instruction means for instructing to perform an image search.

If the judgment result of S234 is "yes", then judged is whether or not there is a mode change (S235) and, if the judgment result is "yes", the process returns. Note that the judgment is made by judging whether or not a mode other than the favorites replay mode is set by the mode dial 225.

If the judgment result of S235 is "no", the search unit 206 searches, on the basis of the characteristic part of the favorite image determined to be the search source and the supplementary information of the image, a photo image possessing a characteristic part or supplementary information which is the same as, or similar to, the characteristic part and supplementary information from the built-in memory 212 or/and external memory 213 (S236).

Then, the searched photo images are grouped (S237) The grouping is performed by obtaining the frame information of the searched photo image and storing it in the image buffer memory 204. Note that the photo image stored in the built-in memory 212 or/and external memory 213 is assigned with a frame number in accordance with the photographed date & time, and the frame number of the searched photo image is obtained as frame information, thereby making it possible to read the searched photo image in a later date based on the frame information.

Then judged is a presence or absence of a condition matching image (i.e., a presence or absence of a searched photo image) (S238). Here, the judgment result is "no image", a comment "there is no image related to the search condition" is displayed in the TFT 221 (S239) and the process shifts back to S233.

Contrarily, if the judgment result of S238 is "there is image", the searched image (i.e., an image related to the characteristic part of the favorite image as the search source or to the supplementary information) is displayed in the TFT 221 (S240). Specifically, the index display-use thumbnail image or single frame display-use image of a photo image corresponding to the frame information stored in the image buffer memory 204 is read from the built-in memory 212 or/and external memory 213 and displayed in the TFT 221 in accordance with the pre-set display form (i.e., the index display form or single frame display form) (S240). As an example, if the index display form is already set, the index display-use thumbnail images of the photo images corresponding to the frame information is read and displayed in the TFT 221 in the index display form (the present embodiment premises a 3×3 index display form) (refer to the display screen 234 shown in FIG. 26). Here, if the number of photo images matching with the frame information exceeds nine, the configuration makes it possible to move a cursor (refer to the cursor 233 within the display screen 234 shown in FIG. 26) by the user operating the Up/Down/Left/Right button 226 and display the photo images matching with the frame information sequentially in the index display form. If the single frame display form is already set, a single frame display-use image of a photo image matching with the frame information is read and displayed in the TFT 221 in the single frame display form (refer to the display screen 235 shown in FIG. 26). Here, if there are plural photo images corresponding to the frame information, the configuration enables a sequential single frame display of the photo images corresponding to the frame information by the user operating the Up/Down/Left/Right button 226. Note that in the display of the photo images corresponding to the frame information, the favorite image as the search source and the supplementary information of the present image are displayed in the same image screen (refer to the search source image 236 within the display screen 234 and 235 and the date 237 as the supplementary information which are shown in FIG. 26). Also, in the display of the photo image corresponding to the frame information, the configuration enables a free change of the display form between the index display form and single frame display form by the user operating the operation unit 218.

Subsequently judged is whether or not a mode is changed, or whether or not the MENU button 224 is pressed (S241) and, if the judgment result is "yes", the process shifts back to S232, while if it is "no", the process shifts back to S240. Here, the presence or absence of a mode change is judged by discerning whether or not a mode other than the favorites replay mode is set by the mode dial 225. If the MENU button 224 is pressed and if the favorites replay mode remains to be set according to the judgment of S241, the process proceeds to the S233, in which case another favorite image is selected as new search source in the S233, thereby making it possible to continue a search by a different search condition.

Note that the processes of the image search (in S236) and grouping (in S237) in the present flow are carried out by the following processes for example.

Figure 27:
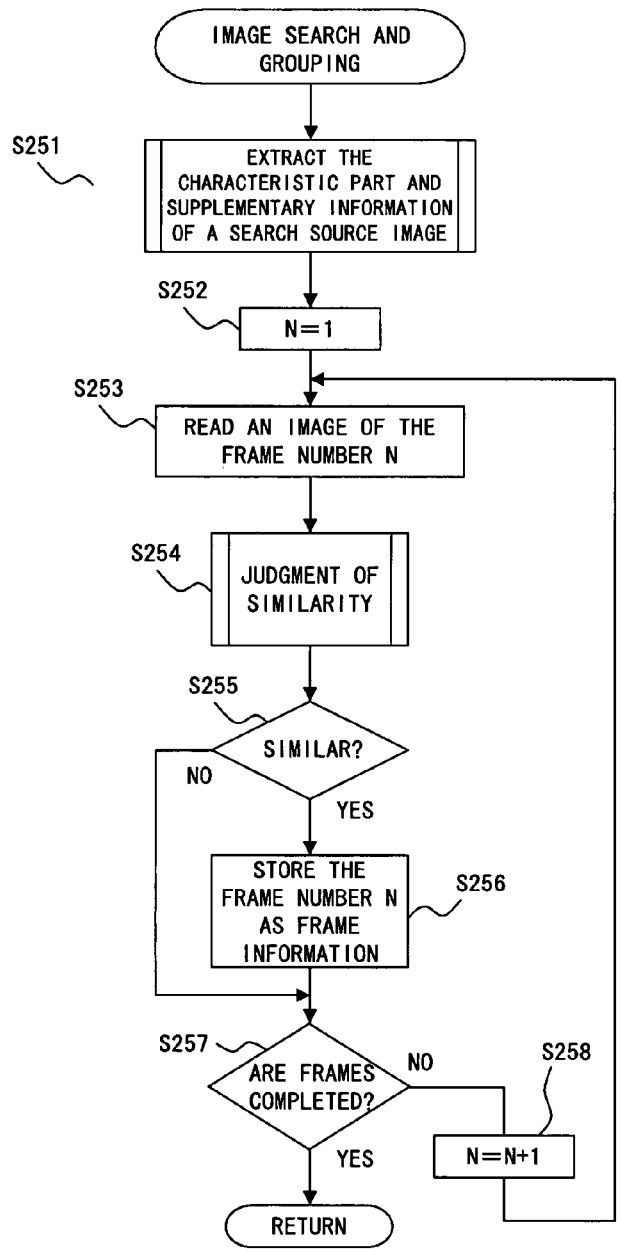
FIG. 27 is a diagram exemplifying the processes of an image search (S236) and of a grouping (S237)

FIG. 27 is a flow chart exemplifying the process.

In the flow shown in FIG. 27, first, the characteristic part (e.g., a characteristic part such as face, form and color) of a favorite image determined to be a search source image and the supplementary information (e.g., shutter speed, exposure value, et cetera) of the favorite image are extracted. Note that the characteristic part is extracted from the primary image included in the image file of the favorite image of the search source and the supplementary information is extracted from the attribute information included in the image file.

Then, N=1 is set (S252), the primary image and supplementary information (i.e., attribute information) included in the image file of the photo image of the frame number N are read from the built-in memory 212 or/and external memory 213 (S253) and the characteristic part and supplementary information of the primary image is judged for a similarity with the characteristic part and supplementary information extracted in the S251 (S254).

Note that when judging the similarity, the configuration may be to judge the respective similarities of the characteristic part and supplementary information of the image, or to judge the similarity of only the characteristic part of the image, or to judge the similarity of only the supplementary information thereof. In the case of configuring to judge the similarity of only the characteristic part of the image, the S251 may be for extracting only the characteristic part of the image, and the S253 may be for reading only the characteristic part of the image. In the case of configuring to judge the similarity of only the supplementary information, the process of S251 may be for extracting the supplementary information and the S253 may be for reading only the supplementary information.

Then, the similarity (including the sameness) of the characteristic part and supplementary information of the photo image of the frame number N (where N is a positive integer) with the characteristic part and supplementary information extracted in the S251 is judged (S255) and, if the judgment result is "yes", the frame number N is stored as frame information in the image buffer memory 204 (S256), while if it is "no", the process of S256 is skipped.

Then judged is whether or not all the frames are completed, that is, whether or not the frame number N is the final frame number (S257) and, if the judgment result is "yes", the process returns, while if it is "no", the N is incremented to N=N+1 (S258) and the process shifts back to S253.

Such flow searches a photo image possessing the characteristic part and supplementary information which are the same as, or similar to, the characteristic part and supplementary information of the favorite image determined to be a search source image from the built-in memory 212 or/and external memory 213, and stores the frame number of the photo image as frame information in the image buffer memory 204.

Note that an alternative configuration may be such that the user is asked to select which characteristic part of an image, or which supplementary information thereof, is to be used for judging a similarity prior to judging the similarity in the flow described above. In such a case, the configuration may be such that the process of S251 is for extracting the characteristic part and supplementary information of the favorite image of the search source, followed by presenting the user with them so that the user is asked to select one or more for use in the judgment of a similarity.

When the searched photo image (i.e., the photo image corresponding to the frame information) is displayed in the TFT 221 in the process for displaying (S240) the related image in the TFT 221 of the flow shown in FIG. 25, it is also possible to configure to display the favorite image of the search source or/and the supplementary information of the favorite image thereof together with the searched photo image. As an example, a configuration may be such that, in the case of searching an image based on the characteristic part of the favorite image of the search source, the favorite image of the search source is also displayed together with the searched photo image. And, in the case of searching an image based on the characteristic part and supplementary information of the favorite image of the search source, or based on the supplementary information of the favorite image thereof, then the favorite image of the search source and the supplementary information may be displayed together with the searched photo image.

Figure 28:
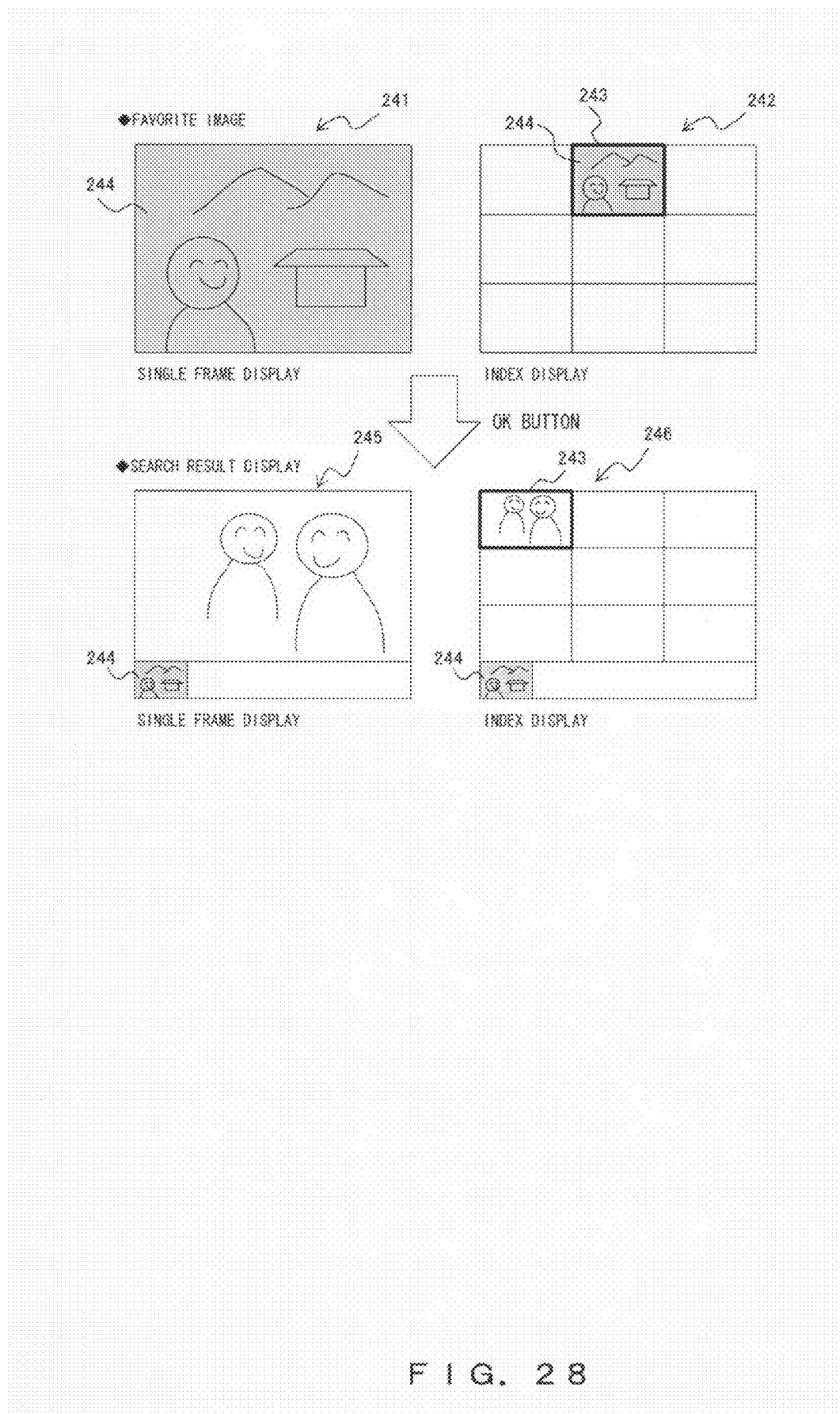
FIG. 28 is a screen image example displayed in a TFT during the process of a favorites image replay mode.

FIG. 28 is a screen image example displayed in the TFT 221 during the process of a favorites replay mode shown in FIG. 25.

Referring to FIG. 28, the display screen 241 is a screen image example displaying a favorite image in the single frame display form. Here, if there are plural favorite images, it is possible to display the favorite images sequentially in the single frame display by operating the Up/Down/Left/Right button 226. The display screen 242 is a screen image example when displaying the favorite images in the index display form. Here, the cursor 243 can be moved by operating the Up/Down/Left/Right button 226. In the display of the favorite image, the display form can be freely changed between the index display form and single frame display form by operating the operation unit 218.

A pressing of the OK button when a favorite image is displayed determines the favorite image 244 displayed in the single frame display or the favorite image 244 displayed in the position of the cursor 243 within the favorite images displayed in the index display, followed by performing an image search based on the search source image. In this example, the assumption is that the characteristic part of a face if extracted as the characteristic part of the search source image and that a photo image possessing a characteristic part which is the same as, or similar to, the characteristic part of the search source image is searched.

The display screen 245 is a screen image example when the photo image searched by such an image search is displayed in the single frame display form. Here, if there are plural favorite images, it is possible to display the favorite images sequentially in the single frame display by operating the Up/Down/Left/Right button 226. The display screen 246 is a screen image example when displaying the favorite images in the index display form. Here, if the number of the searched photo images exceeds nine, the searched photo images can be displayed sequentially in the index display by moving the cursor 243 by operating the Up/Down/Left/Right button 226. When the searched photo image is displayed, the favorite image of the search source 244 is also displayed together with the searched photo image in the same display screen. Note that the image is searched on the basis of the characteristic part of an image in this example and therefore the supplementary information of the favorite image of the search source is not displayed, while the favorite image of the search source is displayed together with the searched photo image. Also, when the searched photo image is displayed, the display form can be freely changed between the index display form and single frame display form by operating the operation unit 218.

Figure 29:
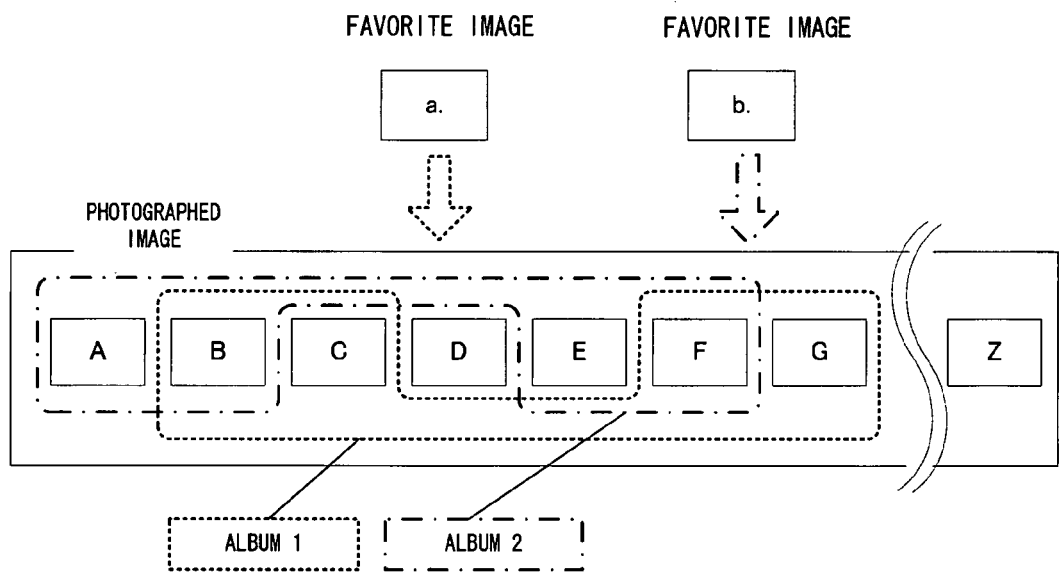
FIG. 29 is a diagram illustrating a search example by the process of a favorites replay mode (S209)

FIG. 29 is a diagram illustrating a search example by the process of a favorites replay mode (of S209) shown in FIG. 25.

As shown in FIG. 29, if the favorite image "a" is used as the search source for example, photo images B, C, F and G are searched, and if the favorite image "b" is used as the search source, photo images A, B, E and F are searched.

Just a registration of an image possessing the desired characteristic part of a image or the desired supplementary information as a favorite image makes it possible to search easily a photo image possessing the characteristic part of the image or the supplementary information which are similar to those of the registered image. Also enabled is an appreciation of the searched photo images as album. In such a case, the appreciation can be carried out without requiring the user to register them one by one (refer to the album 1 and album 2 shown in FIG. 29).

As described thus far, if the user pre-registers an image possessing a desired characteristic part of image and desired supplementary information as a favorite image, the present embodiment makes it possible to search an image possessing a look alike (i.e., the same or similar to) characteristic part of image or supplementary information.

Also, the registration of a favorite image, the image search based on the registered favorite image and the display of the image search result are enabled just by the setup operation of the mode dial 225, thereby eliminating a necessity of a conventional cumbersome operation such as making a display unit display a targeted setup screen by repeating button operation for a number of times, and enabling practically anyone to use it simply.

Therefore, it is possible to search, and display, a desired image from the stored images by a simple operation based on the displayed image.

Note that the present embodiment is configured to store the frame number of a searched image as frame information in the image buffer memory 204 and display the searched image based on the frame information as described by referring to the flows shown in FIGS. 25 and 27; an alternative configuration, however, may be in a manner to store the information of the file path (i.e., a path indicating the storage position of the image file) of the searched image for example and display the searched image based on the information of the file path.

Also note that the camera according to the present embodiment may be another apparatus capable of photographing and replaying an image, such as a portable phone equipped with a camera, a personal digital assistant (PDA) equipped with a camera, or such device, in lieu of being limited to a digital camera.

<Third Embodiment>

A camera according to a third preferred embodiment of the present invention is one capable of searching a desired image simply and easily, and particularly one capable of searching a desired image easily by a simple operation regardless of a situation when displaying an image at the time of photographing and replaying.

Figure 30:
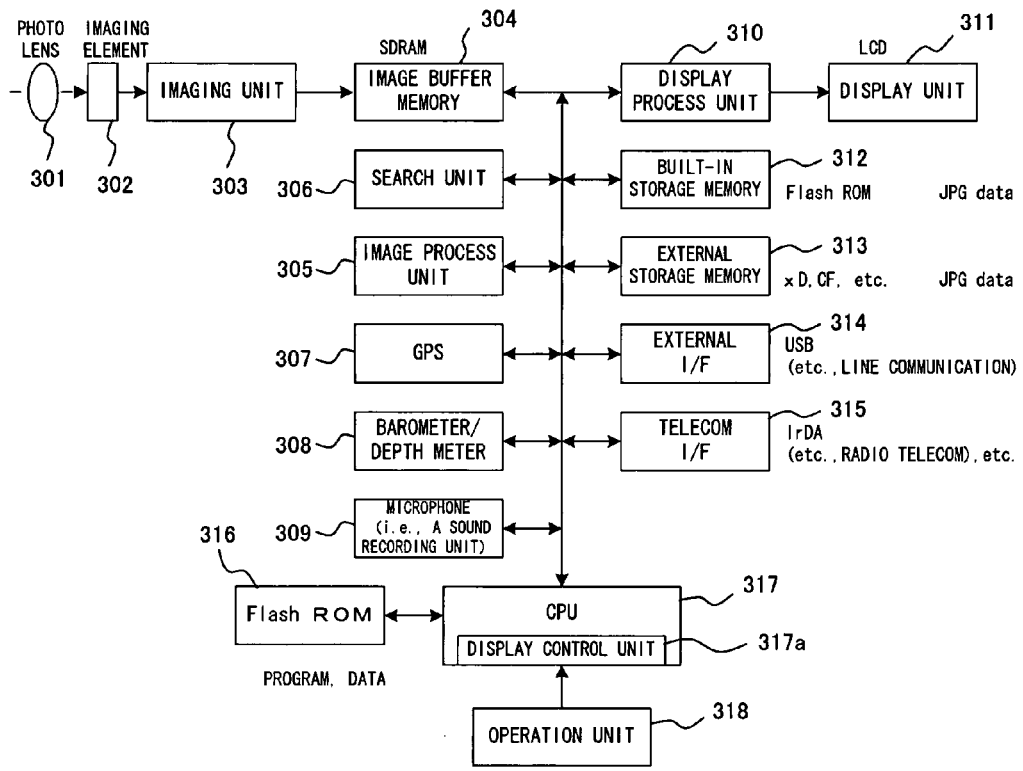
FIG. 30 is a block diagram of a digital camera according to a third preferred embodiment.

FIG. 30 is a block diagram of a digital camera that is a camera according to the third embodiment.

Referring to FIG. 30, a photo lens 301 forms an object image onto an imaging element 302. The imaging element 302 outputs an electric signal expressing an image by applying a photoelectric conversion to the object image formed onto the imaging element 302 by the function of the photo lens 301. The imaging element 302 is an image sensor constituted by a CCD for example.

An imaging unit 303, comprising a CDS for reducing a noise component, an AGC for stabilizing a signal level and an A/D converter for converting an analog electric signal into a digital electric signal, reduces a noise component of the analog electric signal output from the imaging element 302, also stabilizes a signal level, converts the analog signal into a digital electric signal and outputs it.

An image buffer memory 304 is used as a temporary storage for image data that is a digital electric signal output from the imaging unit 303, for image data in the process of various image processing performed by an image process unit 305 and for frame information (i.e., an example of link information of an image) of an image searched by a search unit 306. The image buffer memory 304 is SDRAM for example.

The image process unit 305 performs various image processes such as a compression/expansion process of image data, such as JPEG system, for recording and replaying the image data, a correction process such as gamma correction and white balance correction which are carried out at the time of recording the image data, and an enlargement/reduction process (i.e., a resize process) increasing or decreasing the number of pixels constituting an image.

The search unit 306, using an image displayed in a through image form (i.e., a form displaying a pickup image in real time) in the photo mode and using an image replayed (i.e., displayed) in the replay mode both of which as image of a search source, performs the processes of searching an image based on the characteristic part of the image of the search source and based on the supplementary information of the aforementioned image and storing the frame information of the searched image in the image buffer memory 304.

A GPS 307 measures latitude and longitude. A barometer/depth meter 308 measures a barometric pressure and a water depth. A microphone (i.e., a sound recording unit) 309 converts a voice into an electric signal.

A display process unit 310 performs a process for generating a video image signal displayable by a display unit 311 from image data of a result of applying an image process by the image process unit 305 and outputting the video image signal to the display unit 311. This enables the display unit 311 to display a video image based on the video image signal. The display unit 311 is an LCD, a touch panel type LCD, an organic EL display or such for example.

Built-in storage memory 312 is a recording medium built-in in the present digital camera and is a storage-use recording medium which records image data (e.g., JPG data) expressing an image. The built-in storage memory 312 is Flash ROM for example that is nonvolatile memory allowing an electrical rewriting.

External storage memory 313 is a recording medium detachably attachable to the present digital camera and is a storage-use recording medium which records image data (e.g., JPG data) expressing a photo image. The external storage memory 313 is a memory card such as xD card, Smart Media (a registered trademark), Compact Flash (a registered trademark) or such.

An external I/F 314 is an interface for connecting to an external device by way of a prescribed line communication standard. The prescribed line communication standard includes the USB and other line communication standards.

A telecom I/F 315 is an interface for connecting to an external device by way of a prescribed radio telecom standard. The prescribed radio telecom standard refers to the IrDA and other radio telecom standards.

Flash ROM 316 is nonvolatile memory allowing an electrical rewriting and stores various pieces of data used in the process of executing a camera program, in addition to storing the camera program executed by a CPU 317.

The CPU 317 reads and executes the camera program stored in the Flash ROM 316, thereby controlling the operation of the entirety of the present digital camera. The CPU 317 also performs a display control by executing the camera program, thereby implementing a display control unit 317a.

An operation unit 318 is a series of buttons for receiving various instructions from the user (e.g., a photographer) and notifying the CPU 317 of them. The operation unit 318 includes later described shutter button, zoom button, MENU button, favorites button, Up/Down/Left/Right button and OK button for example. An operation on the operation unit 318 includes an operation through a touch panel.

FIG. 31 is a rear view diagram of a digital camera according to the present embodiment.

Referring to FIG. 31, a TFT 321 is the display screen of the display unit 311. The shutter button 322 is a button for instructing for photographing. The zoom button 323 is a button for instructing for zooming to a wide angle or telephoto. The MENU button 324 is a button for giving instructions such as having the TFT 321 display various menus. A favorites button 325 is one for giving an instruction for searching an image and for cancelling a search. The Up/Down/Left/Right button 326 is one for giving instruction such as for moving the cursor displayed in the TFT 321 and for a frame forward of images displayed in the TFT 321. The OK button 327 is one for giving instruction such as for selecting from selection items displayed in the TFT 321, confirming a selected image, searching for an image, and such.

Note that the present embodiment is configured to set a series of operation modes such as photo mode and replay mode which are described later by the operations of MENU button 324, Up/Down/Left/Right button 326 and OK button 327; alternatively, however, the rear face of the digital camera may be equipped with a mode dial for enabling the setup of a series of operation modes and set up of an operation mode in accordance with the operation of the mode dial.

The next is a description on an operation of the digital camera according to the present embodiment.

Figure 32:
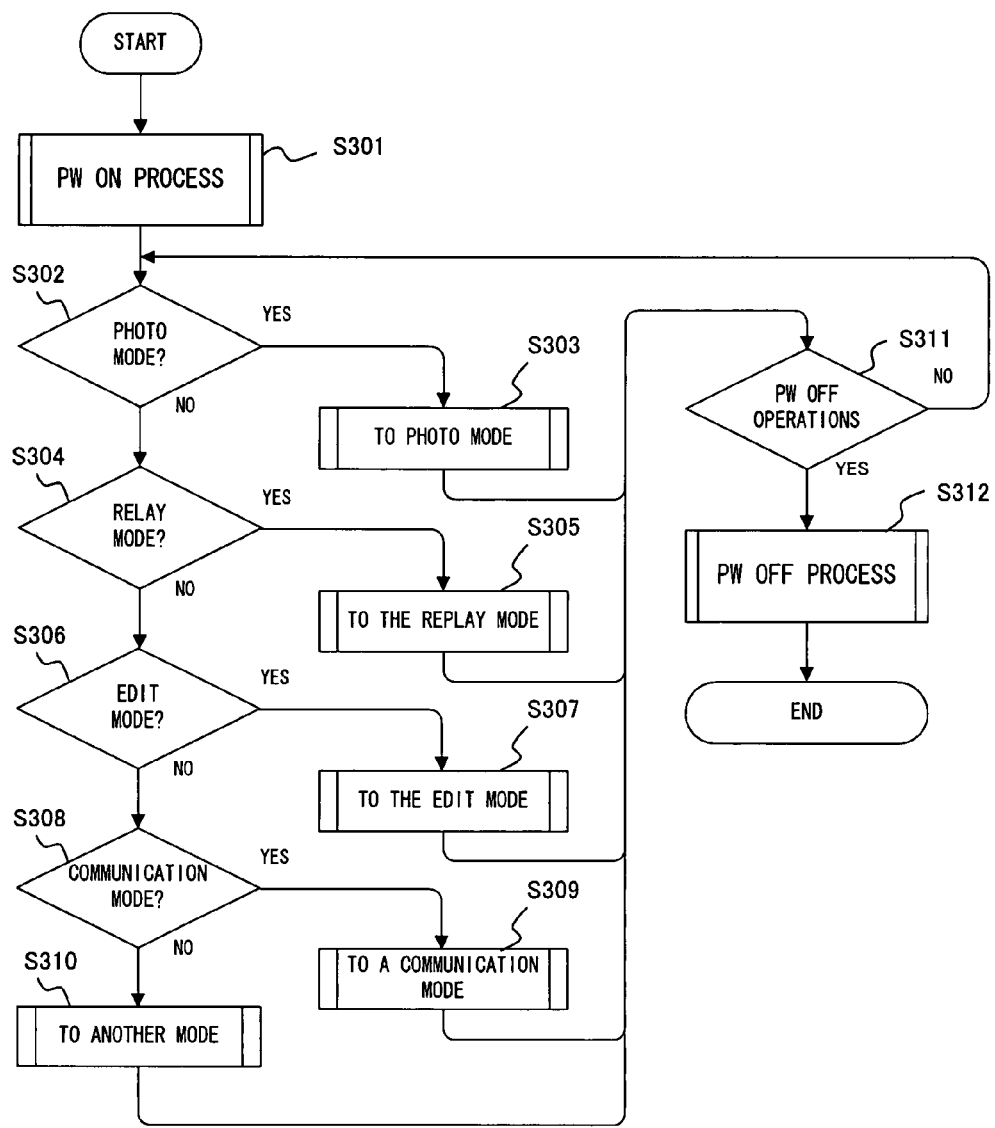
FIG. 32 is a flow chart showing the basic operation of a digital camera according to the third embodiment.

FIG. 32 is a flow chart showing the basic operation of a digital camera according to the present embodiment. The present flow starts when a power switch (not shown in a drawing herein) is turned on.

Upon starting the present flow, a prescribed power-on (Pwr On) process is performed as shown in FIG. 22 (step 301; simply noted as "S301" hereinafter).

Then judged is whether or not a photo mode is set (S302). Here, if the judgment result is "yes", the process proceeds to the photo mode (S303) enabling a photographing of image. In addition to a photography process, this process is configured to be capable of executing the processes such as searching an image based on the characteristic part of an image that is an image displayed in the through image form as an image of the search source (search source image) and displaying the searched image, which is described in detail later.

If the judgment result of S302 is "no", then judged is whether or not a replay mode is set (S304). Here, if the judgment result is "yes", the process proceeds to the replay mode (S305) enabling a replay of an image. In addition to the replay process, this process is configured to make it possible to execute the processes of searching an image based on the characteristic part and supplementary information of an image that is the image replayed (i.e., displayed) as the image of the search source and displaying the searched image, which is described in detail later.

If the judgment result of S304 is "no", then judged is whether or not an edit mode is set (S306). Here, if the judgment result is "yes", the process proceeds to the edit mode (S307) enabling an edit of an image.

If the judgment result of S306 is "no", then judged is whether or not a communication mode is set (S308). Here, if the judgment result is "yes", the process proceeds to the communication mode (S309) enabling a communication with an external device. Note that this process does not receive an instruction from the favorites button 325.

If the judgment result of S308 is "no", then performed is a process in accordance with the set other mode (S310).

As such, the process proceeds to a set mode and, upon completion of the process, judged is whether or not a power switch is turned off (i.e., whether or not a Pwr Off operation is carried out) (S311) and, if the judgment result is "yes", a prescribed power off (i.e., Pwr Off) process is performed (S312), followed by ending the present operation. Contrarily if the judgment result is "no", the process shifts back to S302.

The next is a detailed description of the process of the photo mode (of S303) by referring to FIG. 33 through 36.

Figure 33:
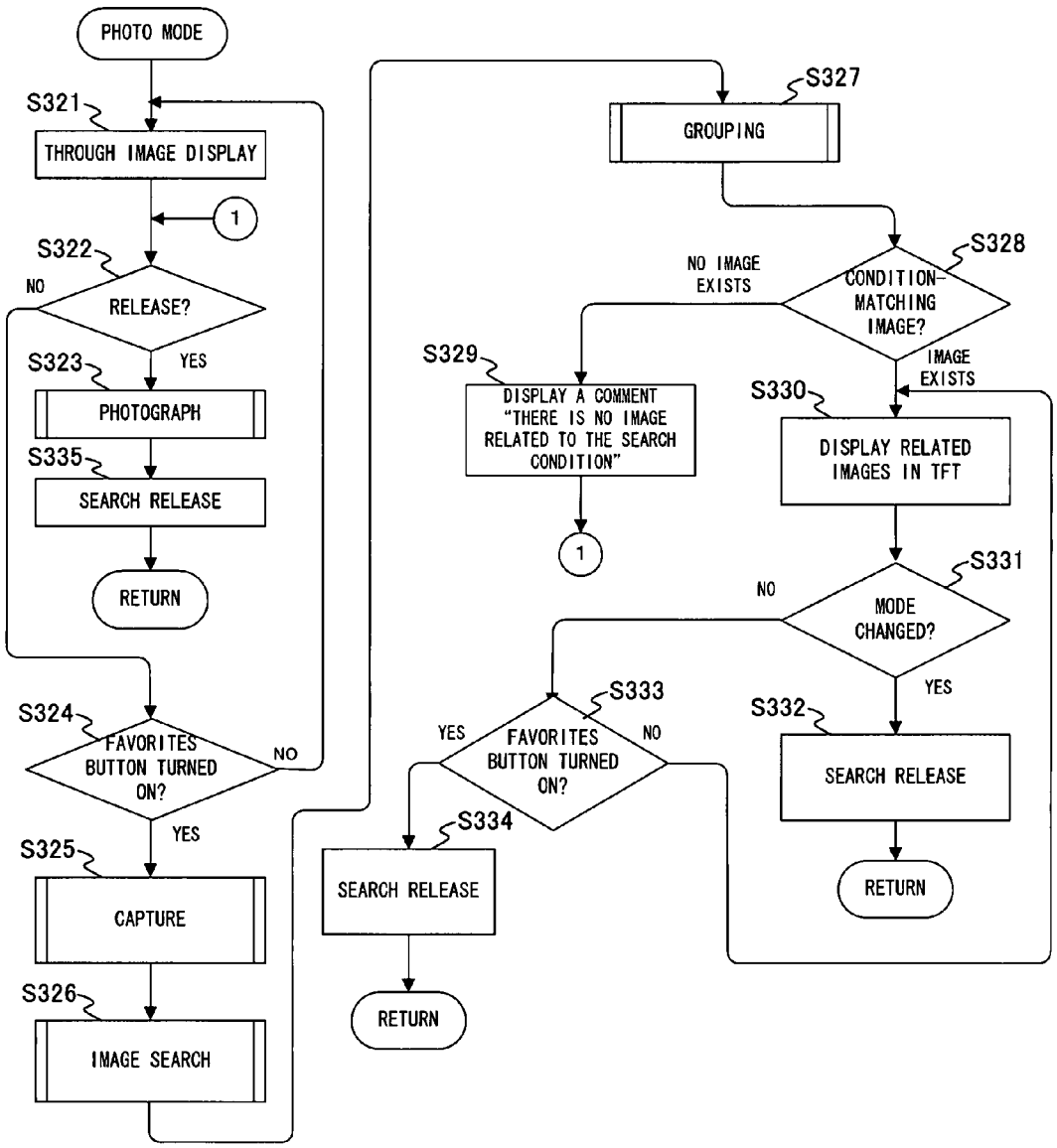
FIG. 33 is a flow chart showing the process of a photography mode (S303) in details.
Figure 34:
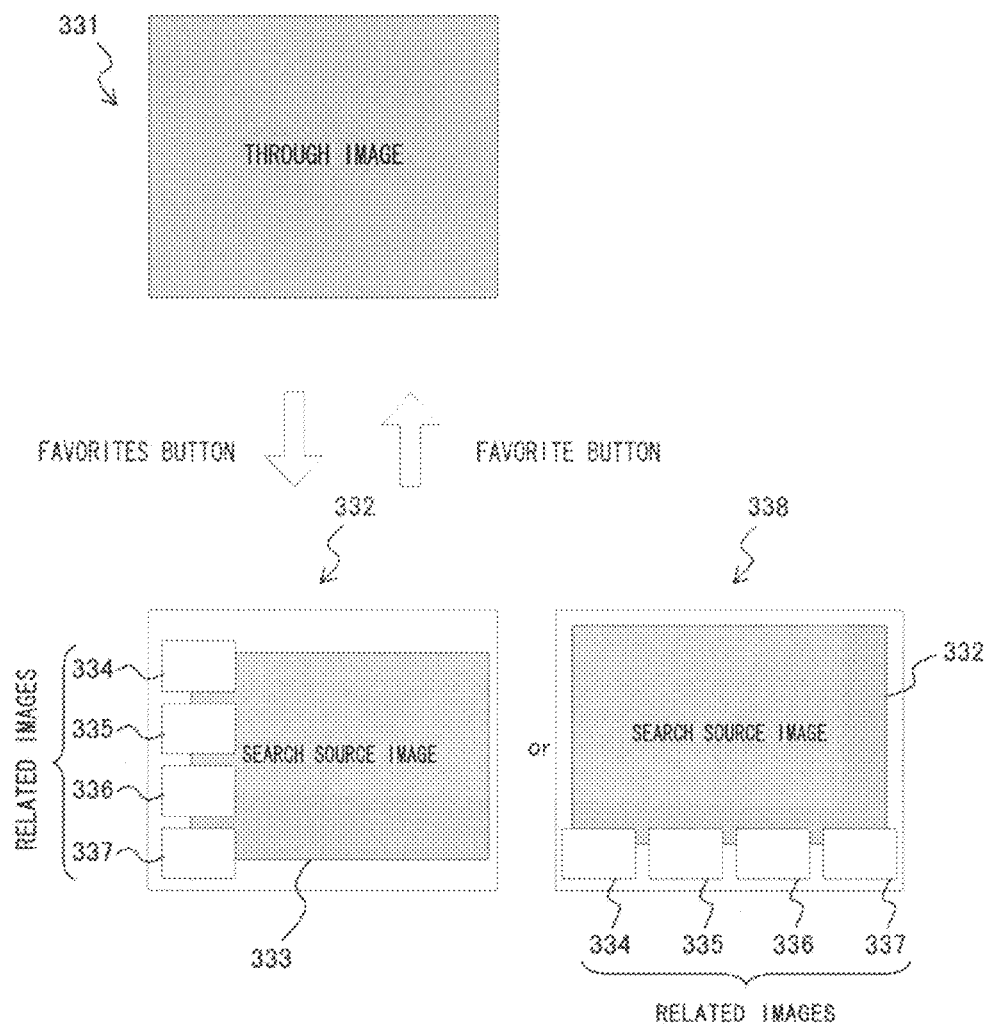
FIG. 34 is a diagram describing contents displayed in a TFT during the process of a photography mode.
Figure 35:
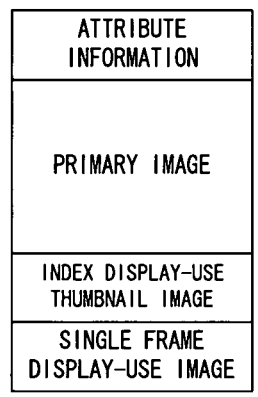
FIG. 35 is a diagram showing a structure of an image file recorded by a photography process.

FIG. 33 is a flow chart showing the process of a photography mode (of S303) in details. FIG. 34 is a diagram describing contents displayed in the TFT 321 during the process of a photography mode. FIG. 35 is a diagram showing a structure of an image file recorded by a photography process during the aforementioned process.

As shown in FIG. 33, first an image is displayed in the TFT 321 in the through image form in the present flow (S321). Specifically, a repetition of a series of processes such as applying a prescribed process to an image picked up by the imaging element 302 by the imaging unit, image process unit, display control unit and such, and displaying the resultant in the display unit 311 makes the TFT 321 display the picked-up image in real time (refer to the display screen 331 shown in FIG. 34).

Then judged is whether or not the shutter button is pressed (i.e., the shutter is released) (S322). Here, if the judgment result is "yes", a photography process is performed (S323). The photography process records a photo image as an image file possessing the structure shown in FIG. 35 in the built-in memory 312 or external memory 313. Referring to FIG. 35, the attribute information is supplementary information of a photo image including the photographed date and photography condition (e.g., shutter speed, exposure value, latitude and longitude, barometric pressure, water depth) of the image, et cetera. The primary image is a photo image (i.e., image data). An index display-use thumbnail image is a thumbnail image (i.e., image data) which is a result of the primary image reduced for use in an index display. A single frame display-use image is an image (i.e., image data) reduced for a single frame display.

Upon completing the photography process (S323 of FIG. 33), then performed is a search release process such as invalidating the image as the search source and the search result which are described later (S335), followed by the process returning.

Note that, if the judgment result of S322 is "yes" (i.e., if the shutter button 322 is pressed), an instruction given by the favorites button 325 is not accepted between that time and the completion of the search release process (between the time of the S322 being "yes" and the completion of the processes in the S323 and S335).

Contrarily, if the judgment result of S322 is "no", then judged is whether or not the favorites button 325 is pressed (S324) and, if the judgment result is "no", the process shifts back to S321.

If the judgment result of S324 is "yes" (i.e., if the favorites button 325 is pressed), then an image displayed in the through image form in the TFT 321 at the time is captured (i.e., imported) (S325).

Then the search unit 306 searches, by using the captured image as the search source image, a photo image(s) possessing a characteristic part which is the same as, or similar to, the characteristic part of the captured image based on the characteristic part thereof from the built-in memory 312 or/and external memory 313 (S326).

Then, the searched photo images are grouped (S327). The grouping is performed by obtaining the frame information of the searched photo image and storing the information in the image buffer memory 304. Note that a frame number is assigned to the photo image (i.e., the image file) stored in the built-in memory 312 or/and external memory 313 so that an obtainment of the frame number of the searched photo image as frame information makes it possible to read the searched photo image in later time based on the frame information.

Then, a presence or absence of a condition-matching image (i.e., a presence or absence of a searched photo image) is judged (S328). Here, if the judgment result is "no image", a comment "there is no image related to the search condition" is displayed in the TFT 321 (S329) and the process shifts back to S322.

Contrarily, if the judgment result of S328 is "image exists", the searched image (i.e., the image related to the characteristic part of the image of the search source) is displayed in the TFT 321 together with the image of the search source (i.e., the image captured in the S325) (S330). In specific, the index display-use thumbnail image(s) included in the image file of the photo image corresponding to the frame information stored in the image buffer memory 304 is read from the built-in memory 312 or/and external memory 313 and displayed in the TFT 321 together with the image of the search source. As an example, four index display-use thumbnail images (i.e., images 334, 335, 336 and 337) of the photo images corresponding to the frame information are displayed by arraying on the left side of the display screen together with the image 333 of the search source as shown in the display screen 332 of FIG. 34, or displayed by arraying on the lower side of the display screen as shown in the display screen 338. In both examples the configuration is such that, if the number of photo images corresponding to the frame information exceeds four, the remaining index display-use thumbnail images corresponding to the frame information can be likewise displayed in sequence by the user operating the Up/Down/Left/Right button 326. Note that a form of displaying the photo images corresponding to the frame information together with the image of the search source may be different, in lieu of being limited as such.

Then, whether of not there is a mode change is judged (S331) and, if the judgment result is "yes", the process proceeds to S332, while if it is "no", to S333. Here, the judgment of whether there is a mode change is performed by discerning whether or not the set operation mode has been changed to an operation mode other than the photo mode.

If the judgment result of S331 is "yes", then performed is the search release process such as invalidating the image of the search source and the search result (S332) and the process returns.

If the judgment result of S331 is "no", then judged is whether or not the favorites button 325 is pressed (S333) and, if the judgment result is "no", the process shifts back to S330, while if it is "yes", performed is the search release process such as invalidating the image of the search source and the search result (S334), followed by the process returning. Here, if the photo mode remains to be set, the process shifts back to S321 again in which case another image is captured for making it a new search source, thereby making it possible to continue a search with a different condition. That is, if the photo mode is set, every pressing of the favorites button 325 results in alternatively repeating a search instruction and search release instruction. In this event, a configuration such as a display indicating each state or an illumination of a relevant button so as to distinguish between receiving a search instruction and receiving a search release improves a comprehension of the usage.

Figure 36:
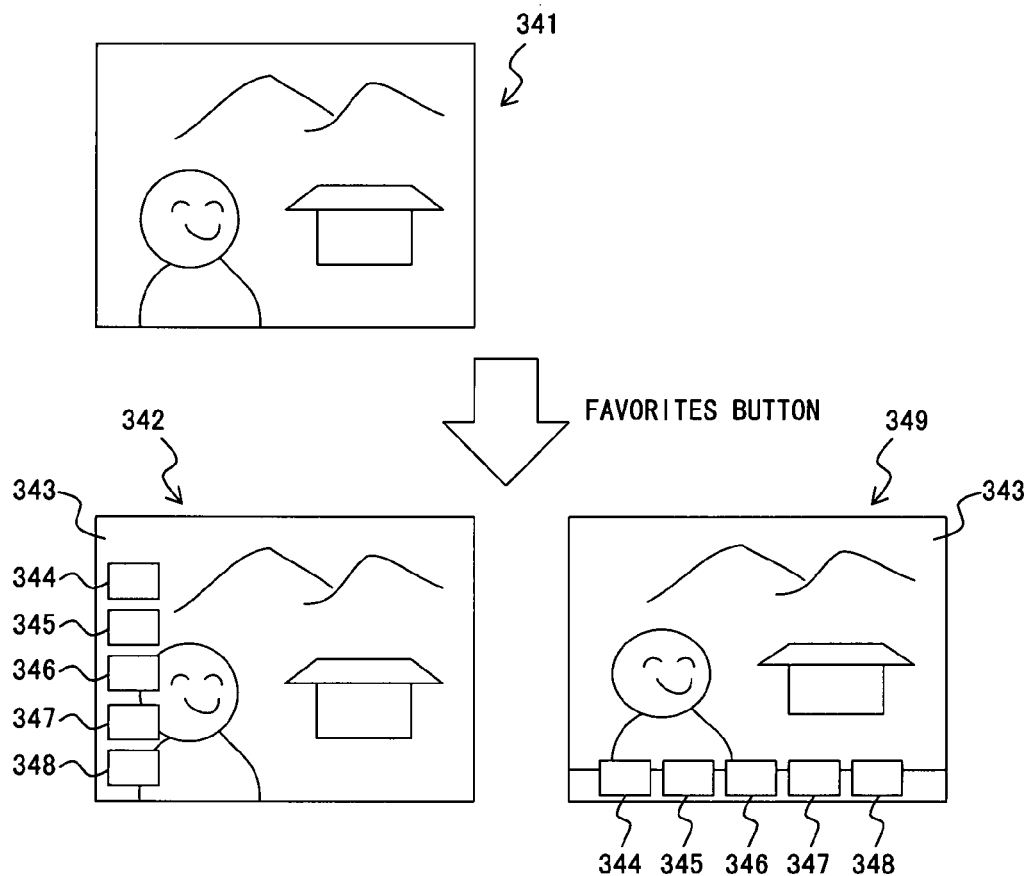
FIG. 36 is a screen image example displayed in a TFT during the process of a photography mode.

FIG. 36 is a screen image example displayed in the TFT 321 during the process of a photography mode shown in FIG. 33.

Referring to FIG. 36, the display screen 341 exemplifies a screen image at a certain point in time when an image is displayed in the through image form.

When an image is displayed in the through image form, a pressing of the favorite button 325 captures the image displayed at the time even if a photographing is being readied. Then, using the captured image as the image of the search source, an image search is performed on the basis of the characteristic part of the image. This example shows the case in which the characteristic part of a face is extracted as the characteristic part of the search source image and photo images possessing the characteristic part which is the same as, or similar to, the extracted characteristic part have been searched. This search is performed by using a known technique such as a pattern matching method, a semantic association image search method and such.

The display screen 342 exemplifies a screen image of displaying five searched photo images (i.e., images 344, 345, 346, 347 and 348) which are arrayed on the left side of the display screen 342 together with the image 343 of the search source. The display screen 349 exemplifies a screen image of displaying five searched photo images (i.e., images 344, 345, 346, 347 and 348) which are arrayed on the bottom side of the display screen. In both cases, the configuration is such that, if the number of searched photo images exceeds five, the remainder of the searched photo images can be likewise displayed in sequence by operating the Up/Down/Left/Right button 326.

Note that the present embodiment is configured such that, if the favorites button 325 is pressed when an image is displayed in the TFT 321 in the through image form, the image displayed at the time is captured and the captured image is selected as the search source image in the process of the photo mode as described above; an alternative configuration, however, may be such that, just when the favorites button 325 is pressed, an image of a result of the imaging element 302 picking up image for displaying it in the through image form and the imaging unit 303 and image process unit 305 applying a prescribed image process to the pickup image so that the obtained image is used as a search source image.

Figure 37:
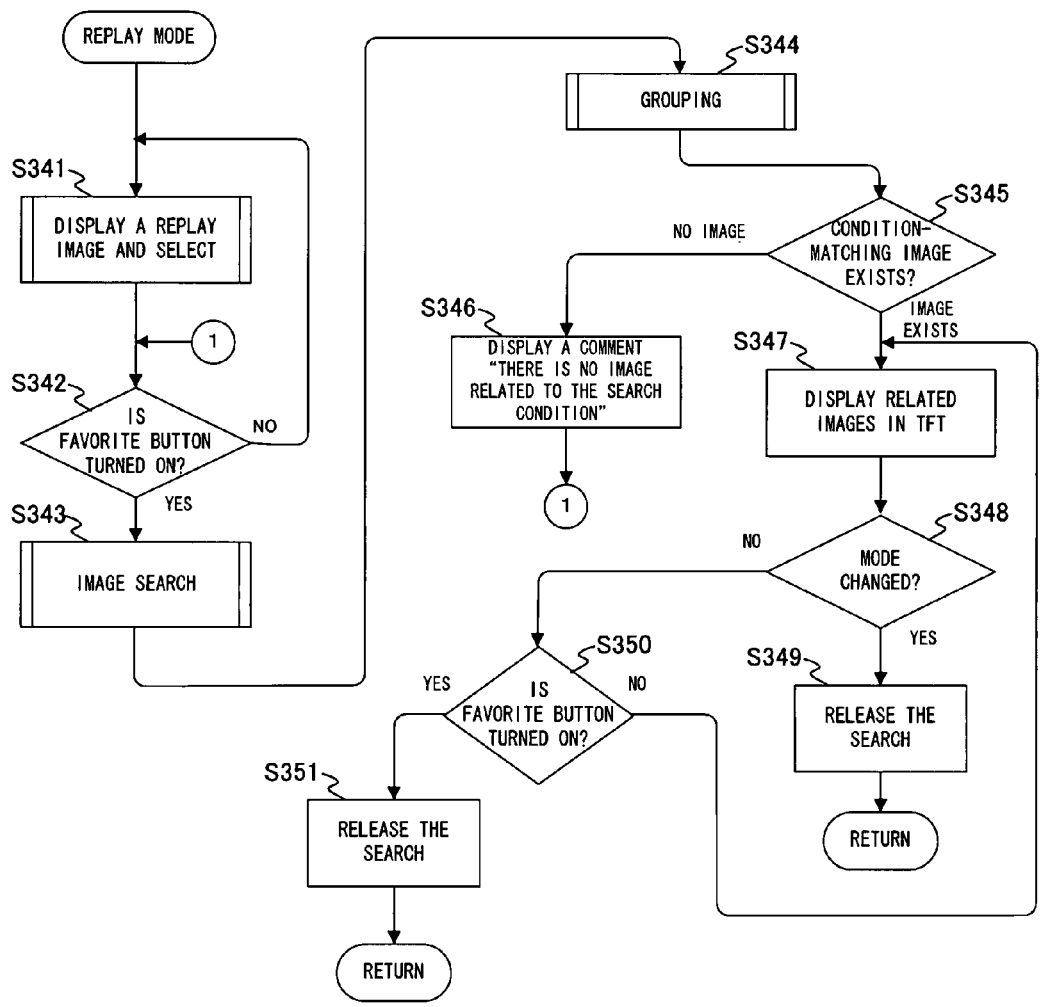
FIG. 37 is a flow chart showing the process of a replay mode (S305) in details.
Figure 38:
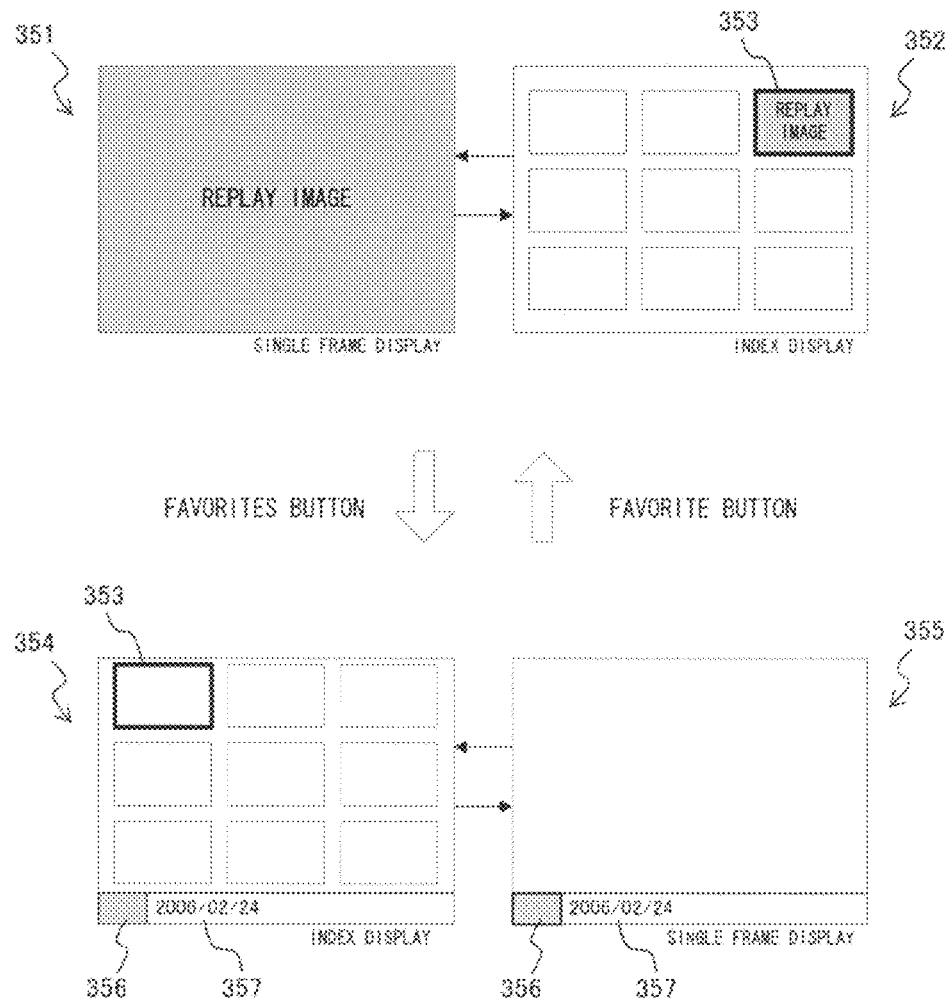
FIG. 38 is a diagram describing contents displayed in a TFT during the process of a replay mode.
Figure 39:
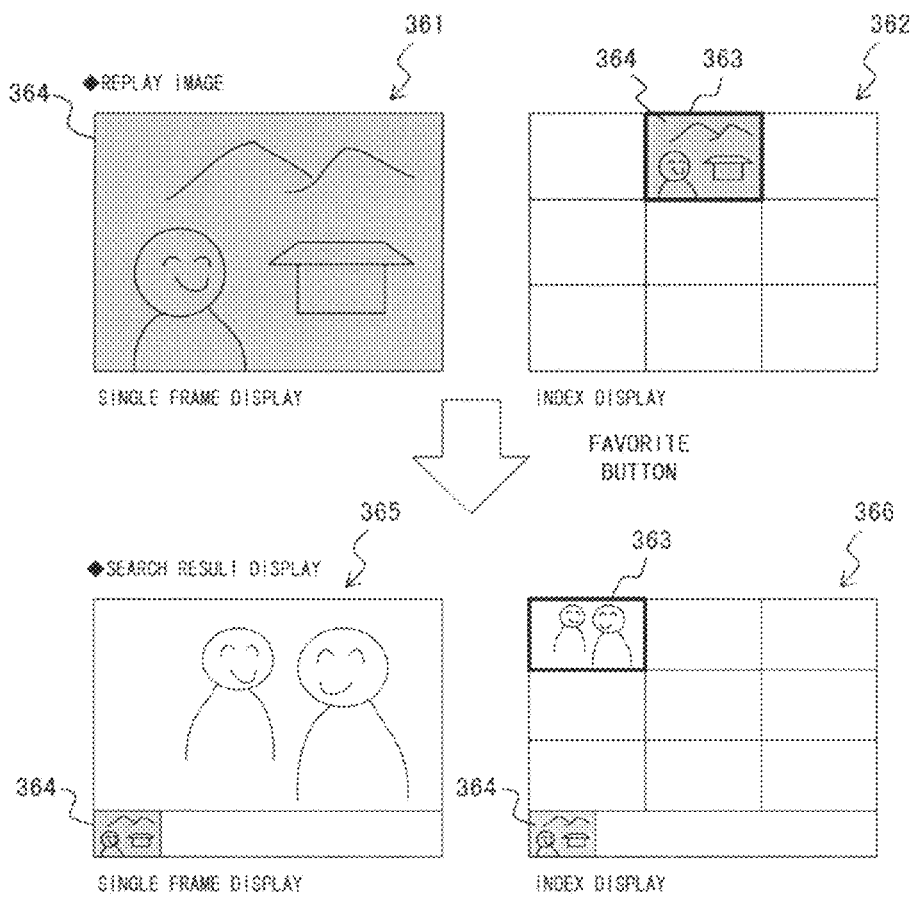
FIG. 39 is a screen image example displayed in a TFT during the process of a replay mode.

The next is a detailed description of the process of the replay mode (of S305) by referring to FIGS. 37 through 39.

FIG. 37 is a flow chart showing the process of the replay mode (of S305) in details. FIG. 38 is a diagram describing the content displayed in the TFT 321 during the process.

As shown in FIG. 37, the present flow starts with the display and selection of a replay image (S341).

To begin with the display of a replay image in the S341, read and displayed in the TFT 321, is an index display-use thumbnail image or single frame display-use image included in an image file of a photo image registered in the built-in memory 312 or/and external memory 313, as a replay image, in accordance with the pre-set display form (i.e., the index display form capable of displaying images by a prescribed number of frames, or a single frame display form capable of displaying an image by a frame). As an example, if the single frame display form is already set, a single frame display-use image is read as the replay image and displayed in the TFT 321 in the single frame display form (refer to the display screen 351 shown in FIG. 38). Here, if there are plural replay images, the configuration enables a sequential single frame display of the replay images by the user operating the Up/Down/Left/Right button 326. If the index display form is already set, the index display-use thumbnail images of photo images are read as replay images and displayed in the TFT 321 in the index display form (which is configured as a 3×3 index display form according to the present embodiment) (refer to the display screen 52 shown in FIG. 38). Here, if the number of replay images exceeds nine, the configuration enables a sequential index display of the replay images by the user operating the Up/Down/Left/Right button 326. Note that the configuration makes it possible to change the display form freely between the index display form and single frame display form by the user operating the operation unit 318, in displaying the replay images.

And selecting a replay image in the S341, one replay image for making it the search source is selected. As an example, if a replay image is already display in the single frame display form, the displayed replay image is selected as the search source. If replay images are already displayed in the index display form, a replay image in the cursor position is selected as the search source (refer to the cursor 353 within the display screen 52 shown in FIG. 38). Note that the cursor is configured to be movable in response to the user operating the Up/Down/Left/Right button 326.

Then, judged is whether or not the favorites button 325 is pressed (S342) and, if the judgment result is "no", the process shifts back to S341.

If the judgment result of S342 is "yes", (i.e., the favorites button 325 is pressed), then the search unit 306 searches, from the built-in memory 312 or/and external memory 313, a photo image(s) possessing the characteristic part and supplementary information which are the same as, or similar to, the characteristic part and supplementary information of the replay image selected as the search source, based on the aforementioned characteristic part and supplementary information (S343).

Then, the searched photo images are grouped (S344). The grouping is performed by obtaining the frame information of the searched photo image and storing it in the image buffer memory 304.

Then, a presence or absence of a condition-matching image (i.e., a presence or absence of a searched photo image) is judged (S345). Here, if the judgment result is "no image", a comment "there is no image related to the search condition" is displayed in the TFT 321 (S346) and the process shifts back to S342.

Contrarily, if the judgment result is "image exists", the searched image(s) (i.e., the image related to the characteristic part and supplementary information of the search source image is displayed in the TFT 321 (S347). Specifically, the index display-use thumbnail image or single frame display-use image included in the image file of a photo image corresponding to the frame information stored in the image buffer memory 304 is read from the built-in memory 312 or/and external memory 313 in accordance with the pre-set display form (i.e., the index display form or single frame display form), and displayed in the TFT 321. As an example, if the index display form is already set, the index display-use thumbnail image of a photo image corresponding to the frame information is read and displayed in the TFT 321 in the index display form (which is configured as a 3×3 index display form according to the present embodiment) (refer to the display screen 354 shown in FIG. 38). Here, if the number of photo images exceeds nine, the configuration makes it possible to display the photo images corresponding to the frame information in sequence by the user operating the Up/Down/Left/Right button 326 for moving the cursor (refer to the cursor 353 within the display screen 354 shown in FIG. 38). If the single frame display form is already set, a single frame display-use image of a photo image corresponding to the frame information is read and displayed in the TFT 321 in the single frame display form (refer to the display screen 355 shown in FIG. 38). Here, if there are plural photo images corresponding to the frame information, the configuration makes it possible to display the photo images corresponding to the frame information sequentially in the single frame display form by the user operating the Up/Down/Left/Right button 326. Note that the replay image and supplementary information of the search source are displayed in the same screen in displaying the photo image corresponding to the frame information (refer to the search source image 356 and the date 357 as the supplementary information within the display screen 354 and 355 shown in FIG. 38). Also, in displaying the photo images corresponding to the frame information, the configuration enables a free change of the display form between the index display form and single frame display form by the user operating the operating unit 318.

In the subsequent S348 through S351, the similar processes as the S331 through S334 shown in FIG. 35 are performed and therefore the description is omitted here.

Note that, in the process of displaying the related image in the TFT 321 in the present flow, when the searched image (i.e., the photo image corresponding to the frame information) is displayed in the TFT 321, an alternative configuration may be to display the replay image of the search source, or/and the supplementary information of the replay image of the search source, together with the searched photo image. As an example, the configuration may be such that, if an image has been searched on the basis of the characteristic part of the replay image as the search source, the replay image of the search source is displayed together with the searched photo image; and that, if an image has been searched on the basis of the characteristic part and supplementary information of the replay image as the search source, or on the basis of the supplementary information of the replay image as the search source, the replay image of the search source and the supplementary information thereof are displayed together with the searched photo image.

FIG. 39 is a screen image example displayed in the TFT 321 during the process of a replay mode shown in FIG. 37.

Referring to FIG. 39, the display screen 361 is a screen image example displaying a replay image in single frame display form. Here, if there are plural replay images, they can be displayed sequentially by an operation of the Up/Down/Left/Right button 326. The display screen 362 exemplifies a screen image displaying a replay image in the index display form. Here, an operation of the Up/Down/Left/Right button 326 enables a movement of the cursor 363 and a sequential index display of the replay image. In displaying the replay image, an operation of the operation unit 318 makes it possible change the display form freely between the index display form and single frame display form. A pressing of the favorites button 325 when a replay image is displayed, using a replay image 364 displayed in the single frame display form or the replay image 364 in the position of the cursor 363 within the replay image displayed in the index display form as the search source image, performs an image search based on the search source image. This example assumes a result of extracting the characteristic part of the face as that of the search source image and searching a photo image possessing a characteristic part which is the same as, or similar to, the characteristic part.

The display screen 365 exemplifies a screen image displaying the searched photo image in the single frame display form. Here, if there are plural searched photo images, they can be displayed sequentially in the single frame display form by operating the Up/Down/Left/Right button 326. The display screen 366 exemplifies a screen image displaying the searched photo image in the index display form. Here, if the number of searched photo images exceeds nine, the searched photo images can be displayed in the index display form sequentially by moving the cursor 363 through the operation of the Up/Down/Left/Right button 326. When the searched photo images are displayed, the replay image 364 of the search source is also displayed together with the searched photo image in the same display screen. Note that this example is a result of searching an image based on the characteristic part of an image and therefore does not display the supplementary information, while displays the replay image of the search source together with the searched photo image. Also, when the searched photo image is displayed, the display form can be changed freely between the index display form and single frame display form by operating the operation unit 318. As such, a pressing of the favorites button when an image is replayed in the common replay mode captures an image displayed at the time and performs an image search by using the captured image as the search source image.

The process of the photo mode (of S303) and that of the replay mode (of S305) have so far been described in detail, in which the image search (of S326) and grouping (of S327) of the process in the photo mode, and the image search (of S343) and grouping (of S344) of the process in the replay mode are carried out as described in the following for example.

Figure 40:
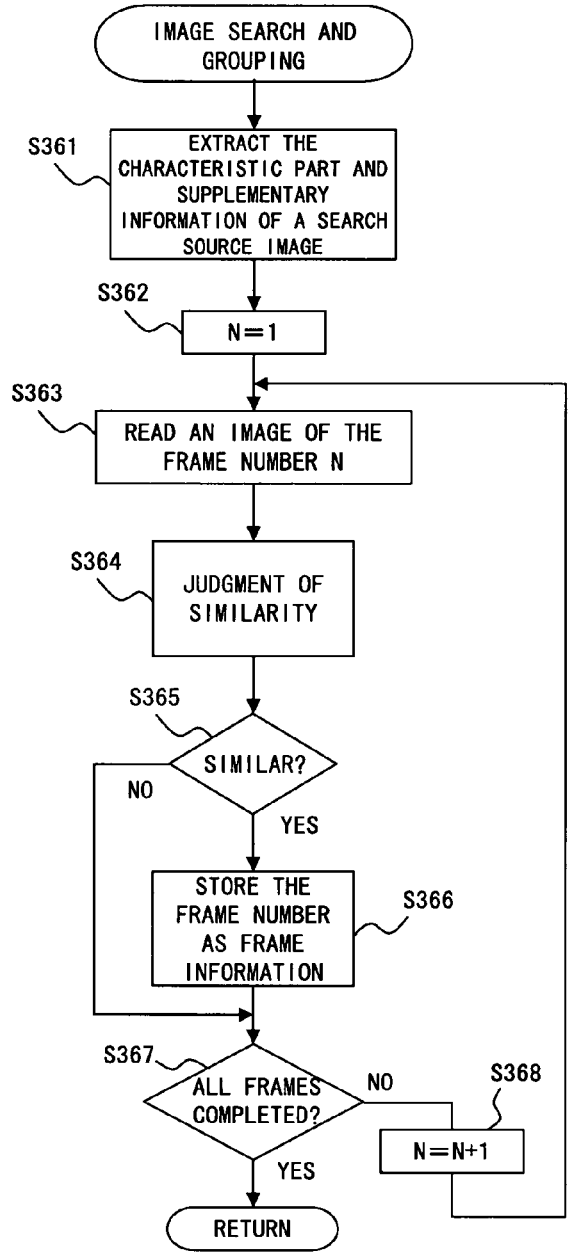
FIG. 40 is a flow chart exemplifying the processes of an image search and of a grouping.

FIG. 40 is a flow chart exemplifying the processes.

In the flow shown in FIG. 40, first, the characteristic part of the image as the search source (e.g., a characteristic part such as face, form and color) and the supplementary information of the image (e.g., a shutter speed and an exposure value) are extracted (S361). The configuration, however, is such that the characteristic part of the image as the search source (i.e., the image captured in S325 shown in FIG. 33) is extracted in the photo mode, while the characteristic part and supplementary information of the image as the search source (i.e., the characteristic part of the primary image included in the image file of the replay image selected in the S341 of FIG. 37 and the supplementary information (i.e., attribute information) included in the aforementioned image file) are extracted in the replay mode.

Then, setting as N=1 (S362), the primary image and supplementary information (i.e., attribute information) which are included in the image file of a photo image of the frame number N is read from the built-in memory 312 or/and external memory 313 (S363) and a degree of similarity of the characteristic part and supplementary information of the primary image with the characteristic part and supplementary information which are extracted in the S351 is judged (S364). In the photo mode, however, the primary image included in the image file of a photo image of the frame number N is read from the built-in memory 312 or/and external memory 313, and a degree of similarity of the characteristic part of the primary image with the characteristic part extracted in the S361 is judged according to the configuration. Note that the configuration may be such as to judge a degree of similarity of the characteristic parts and supplementary information between images, or similarity of only the characteristic parts therebetween, or similarity of only the supplementary information therebetween.

Then, judged is whether or not the characteristic part and supplementary information of the photo image of the frame number N is similar to (including the sameness) the characteristic part and supplementary information extracted in the S361 from the judgment result of S364 (S365). In the photo mode, however, judged is whether or not the characteristic part of the photo image of the frame number N is similar to (including the sameness) the characteristic part extracted in the S361.

If the judgment result of S365 is "yes", the frame number N is stored as frame information in the image buffer memory 304 (S366), while if it is "no", the S366 is skipped.

Then judged is whether the frames are completed, that is, whether or not the frame number N is the final frame number (S367) and, if the judgment result is "yes", the process returns, while if it is "no", the N is incremented to N=N+1 (S368) and the process shifts back to S363.

By such a flow, a photo image possessing the characteristic part which is the same as, or similar to, that of the search source image is searched from the built-in memory 312 or/and external memory 313 in the photo mode; and a photo image possessing the characteristic part and supplementary information which are the same as, or similar to, the characteristic part and supplementary information of the search source image is searched from the built-in memory 312 or/and external memory 313. Then, the frame number of the searched photo image is stored as frame information in the image buffer memory 304.

Incidentally in the present flow, an alternative configuration may be such that the user is asked to select which characteristic part of an image or which supplementary information of the image is to be used for judging a similarity prior to judging the similarity. As an example, in the photo mode, after the extraction of a plurality of characteristic parts of a search source image, they are presented to the user so as to ask her/him to select one or more of them to be used for judging a similarity, in the S361. Or, in the replay mode, after the extraction of one or more characteristic parts and supplementary information of a search source image, they are presented to the user so as to ask her/him to select one or more of them to be used for judging a similarity, in the S361.

Figure 41:
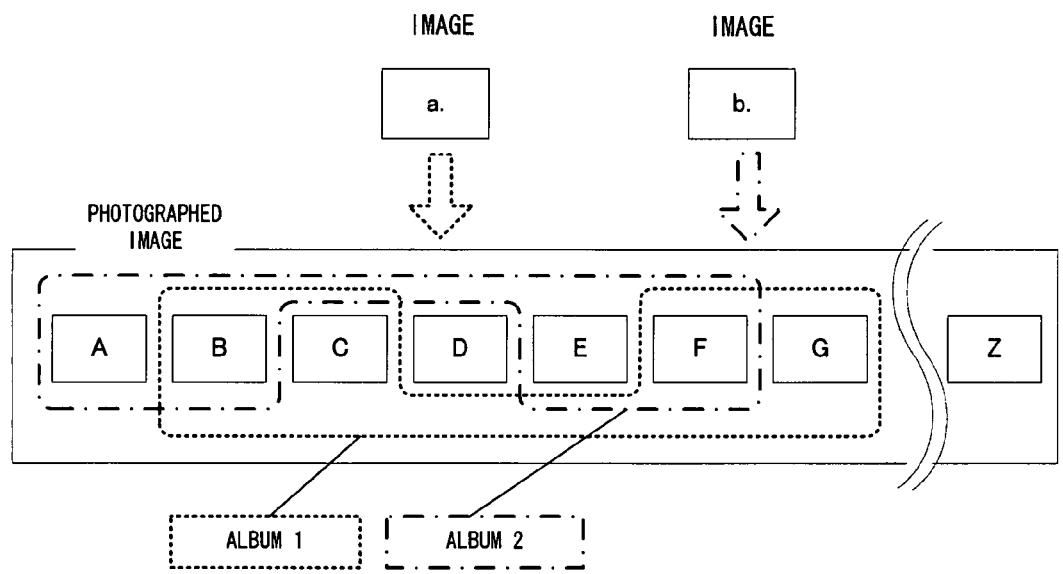
FIG. 41 is a diagram illustrating a search example by the process of a photography mode (S303) or a replay mode (S305)

FIG. 41 is a diagram illustrating a search example by the process of a photography mode (of S303) or a replay mode (of S305).

As shown in FIG. 41, if the image "a" is used as the search source for example, photo images B, C, F and G are searched, and if the image "b" is used as the search source, photo images A, B, E and F are searched.

Just a registration of an image possessing the desired characteristic part of an image or the desired supplementary information as the search source makes it possible to search easily a photo image possessing the characteristic part of the image or the supplementary information which are similar to those of the registered image. Also enabled is an appreciation of the searched photo images as an album. In such a case, the appreciation can be carried out without requiring the user to register them one by one (refer to the album 1 and album 2 shown in FIG. 41).

As such, the present embodiment is configured to enable the user to search easily an image possessing a look alike (i.e., the same or similar) characteristic part of image by displaying an image possessing the desired characteristic part of an image in the through image display form and pressing the favorites button 325 in the photo mode. It is also configured to enable the user to search easily an image possessing a look alike (i.e., the same or similar) characteristic part and supplementary information by displaying an image possessing the desired characteristic part and desired supplementary information of an image and pressing the favorites button 325 in the replay mode.

This configuration enables the user to search an image easily by using an image prior to recording and one after the recording. It also makes it possible to search an image practically at all times in the photo mode and replay mode and appreciate a desired image whenever the user wishes.

It also enables the display form of the searched images to be changed over between the photo mode and replay mode, thereby displaying the search images easily recognizable and comprehensible.

It also enables the specification of an image as the search source and the instruction for search just by pressing the favorites button 325, thus the operation is easy to understand for practically anyone to use it simply without requiring a conventional cumbersome operation such as displaying a targeted setup screen (e.g., a setup screen for searching an image) in a display unit by repeating the button operations for a number of times.

Therefore, it is possible to search a desired image by a simple operation regardless of a situation when displaying an image for photographing, replaying, et cetera.

Note that the present embodiment is configured to store the frame number of a searched image as frame information in the image buffer memory 304 and display the searched image based on the frame information as described by referring to the flows shown in FIGS. 33, 37 and 40; an alternative configuration, however, for example, may be in a manner to store the information (i.e., an example of link information of an image) of the file path (i.e., a path indicating the storage position of an image file) of a searched image in the image buffer memory 304 and display the searched image based on the information of the file path.

Also, the present embodiment is described for the image search in the photo mode and replay mode; alternatively, however, a search may be possible in another mode. In such a case, a reception of the favorites button may be inhibited for giving a higher priority to an operation mode in the case of an operation mode where the operating time is limited, such as a telecom mode for communicating with an external apparatus, or the favorites button may be permitted/inhibited depending on the operation mode.

Also note that the camera according to the present embodiment may be another apparatus capable of photographing and replaying an image, such as a portable phone equipped with a camera, a PDA equipped with a camera, or such device, in lieu of being limited to a digital camera.

<Fourth Embodiment>

A camera according to a third preferred embodiment of the present invention is one capable of searching a desired image simply and easily, and particularly the one capable of changing the range of search condition, which is used when a user carrying out an image search, by a simple operation.

Figure 42:
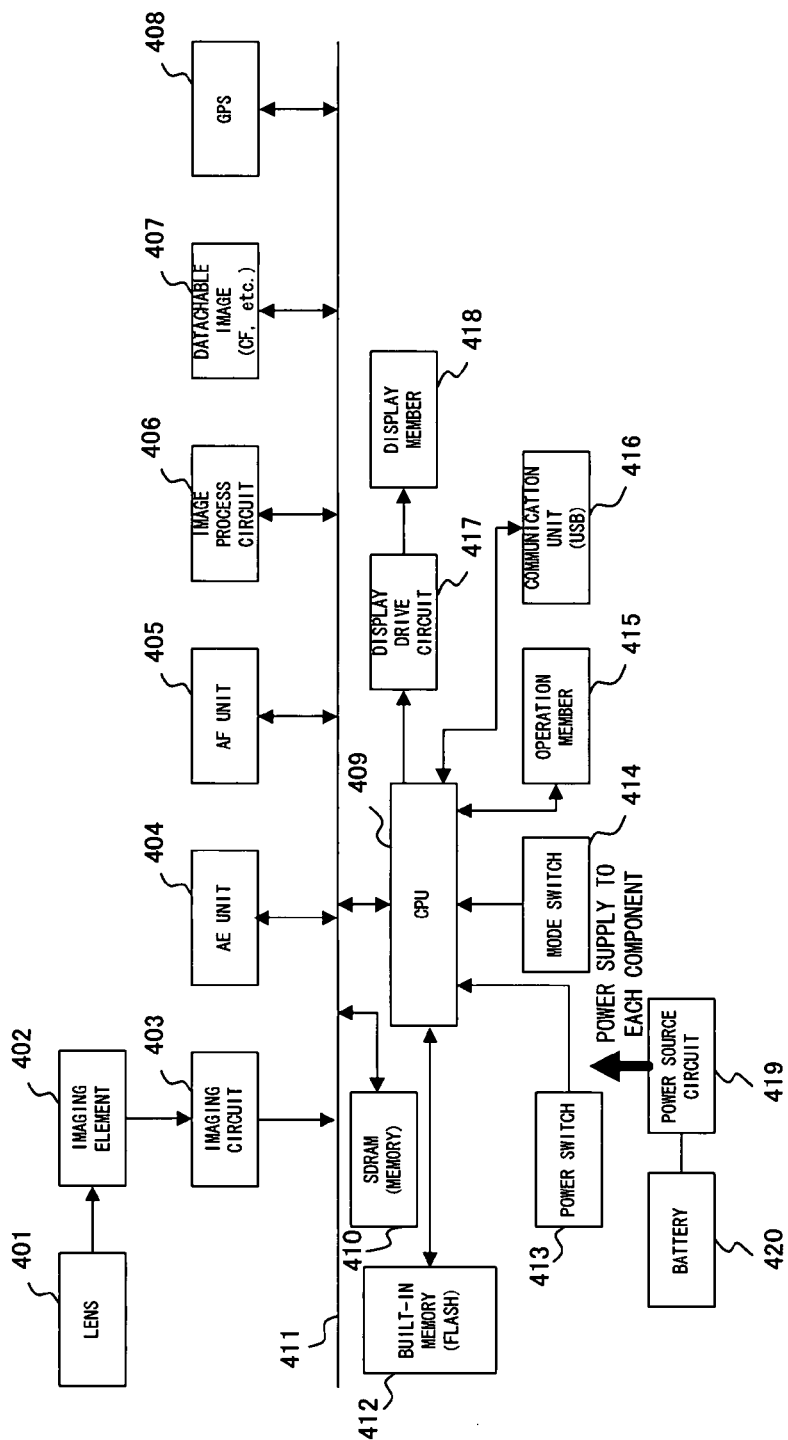
FIG. 42 is a block diagram of a digital camera according to a fourth preferred embodiment.

FIG. 42 is a block diagram of a digital camera that is a camera according to the present embodiment.

Referring to FIG. 42, a photo lens 401 forms an object image onto an imaging element 402. The imaging element 402 outputs an electric signal expressing an image by applying a photoelectric conversion to the object image formed onto the imaging element 402 by the function of the photo lens 401. The imaging element 402 is an image sensor constituted by a CCD and a CMOS for example.

An imaging circuit 403, comprising a CDS for reducing a noise component, an AGC for stabilizing a signal level and an A/D converter for converting an analog electric signal into a digital electric signal, reduces a noise component of the analog electric signal output from the imaging element 402, also stabilizes a signal level, converts the analog signal into a digital electric signal and outputs it.

The imaging circuit 403, automatic exposure (AE) unit 404, automatic focus (AF) unit 405, image process circuit 406, detachable memory 407, GPS unit 408, CPU 409 and SDRAM 410 are interconnected through a bus 411, by way of which each of the aforementioned components is enabled to transmit and receive data with one another.

The SDRAM 410 is used as a temporary storage for such as image data that is a digital electric signal output from the imaging circuit 403, image data in the process of various image processes applied by the image process circuit 406, and such data.

The image process circuit 406 performs various image processes such as a compression/expansion process of image data, such as JPEG system, for recording and replaying the image data, a correction process such as gamma correction and white balance correction which are carried out at the time of recording the image data, and an enlargement/reduction process (i.e., a resize process) increasing or decreasing the number of pixels constituting an image.

The AE unit 404 performs an exposure control based on image data that is a digital electric signal output from the imaging circuit 403. The AF unit 405 performs a focus adjustment control based on image data that is a digital electric signal output from the imaging circuit 403.

The detachable memory 407 is a recording medium detachably attachable to the present digital camera and is a storage-use recording medium which records image data (e.g., JPG data) expressing a photo image. The detachable memory 407 is a memory card such as xD card, Smart Media (a registered trademark), Compact Flash (a registered trademark) or such.

The GPS 408 measures latitude and longitude.

The CPU 409 reads and executes a camera program stored in built-in memory 412, thereby controlling the operation of the entirety of the present digital camera. The CPU 409 also executes the camera program, thereby implementing a search unit for performing an image search, a display control unit for performing a display control, a search condition update unit for updating the condition at the time of searching an image and an image movement control unit for controlling a movement of the display position of an image to another window.

A built-in memory 412, a power switch 413, a mode switch 414, an operation member 415, a communication unit 416 and a display drive circuit 417 are connected to the CPU 409.

The built-in memory 412 stores various programs used during an execution of a camera program, in addition to the camera program executed by the CPU 409. The various data includes, for example, search items (i.e., parameters such as "date", "time", "place", "photography mode", "exposure value" and "white balance") which are usable for an image search, and various kinds of data such as an initial range of each search item and search mathematical expressions (noted as "search expression" hereinafter) usable for an image search. The built-in memory 412 also stores such as search condition information to be used at an image search, which is described later. The built-in memory 412 is such as nonvolatile memory, e.g., Flash ROM, enabling an electrical rewriting operation.

The display drive circuit 417 drives the display member 418 under a display-control of the CPU 409 for making the display member 418 display an image and such. This makes the display member 418 displays an image and such related to the image data recorded in the detachable memory 407 for example. The display member 418 is an LCD, a touch panel type LCD or an organic EL display for example.

The communication unit 416 is an interface for connecting to external devices in a prescribed line communication standard or radio telecom standard. The prescribed line communication standard is USB and other line communication standard for example, and the prescribed radio telecom standard is IrDA or other radio telecom standard for example.

The power switch (SW) 413 is a switch for notifying the CPU 409 of an instruction for turning on or off the power of the present digital camera in response to an operation of the user (e.g., a photographer). The mode switch (SW) 414 is a switch for notifying the CPU of an instruction for changeover of operation modes in response to an operation of the user. Note that the present digital camera comprises a plurality of modes including a photo mode enabling photography of an image and a replay mode enabling replay of an image.

The operation member 415 is a button and such for notifying the CPU 409 of an applicable instruction in response to an operation of the user. As an example, the operation member 415 includes a menu button for instruction the display member 418 for displaying a menu screen, shifting one step back of operation and such; a release button for instructing for a photographing start; a Up/Down/Left/Right button (Up, Down, Left and Right buttons) and an OK button for instructing for determining the selected image and item.

The power supply circuit 419 supplies the individual units of the present digital camera with the voltage supplied from the battery 420 which is a rechargeable battery for example.

The next is a description of an operation of the digital camera configured as noted above.

Figure 43:
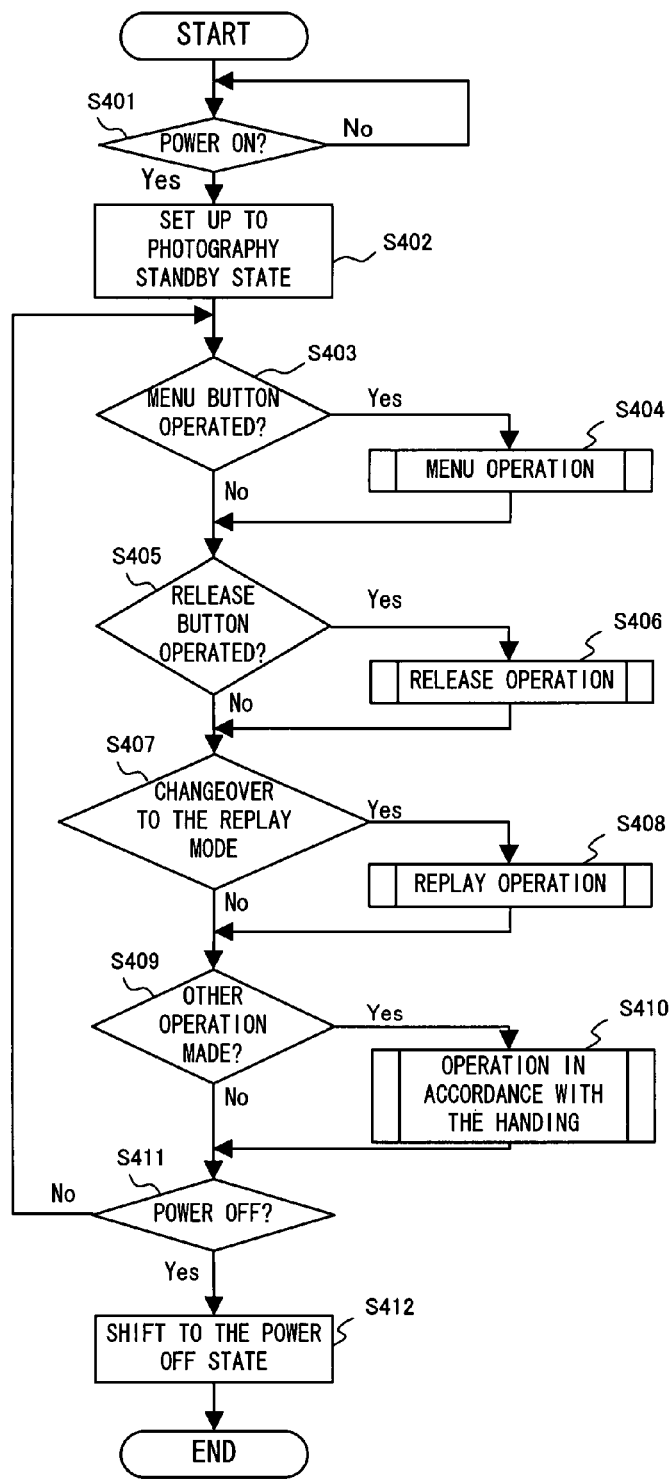
FIG. 43 is a flow chart showing the basic operation of a digital camera.

FIG. 43 is a flow chart showing the basic operation of the digital camera.

As shown in FIG. 43, the basic operation judges whether or not the power switch 413 is turned on while the state of the camera is in the power off state (step 401; abbreviated as "S401" hereinafter). Here, if the judgment result is "no", the present judgment is repeated.

If the judgment result of S401 is "yes", then a photo mode is set as operation mode, and a prescribed setup process is performed, followed by shifting the state of the camera to a photography standby state (S402).

Then, judged is whether or not the menu button is operated (i.e., pressed) (S403) and, if the judgment result is "yes", a menu operation is performed in accordance with the operation of the menu button (S404).

If the judgment result of S403 is "no", or after the S404, then judged is whether or not the release button is operated (i.e., pressed) (S405) and, if the judgment result is "yes", a release operation (photography operation) is performed (S406). In the release operation, the image data of a photographed image (photo image) is recorded as an image file in the detachable memory 407. The image file contains not only the image data of the photo image but also the supplementary information of the image data. The supplementary information includes information such as the date, time and place (i.e., latitude and longitude) at the time of photographing, a kind of photo mode, an exposure value, a white balance and such. The information of the place (i.e., latitude and longitude) at the time of photographing is obtained from the GPS 408.

If the judgment result of S405 is "no", or after the S406, then judged is whether or not the operation mode has been changed over to the replay mode by the operation of the mode switch 414 (S407) and if the judgment result is "yes", the replay mode is set as the operation mode for performing a replay operation (S408). The replay operation enables, in addition to replaying an image related to the image data recorded in the detachable memory 407, a performing of an image search by using a displayed image as the search source image based on the search condition information recorded in the built-in memory 412, and the like operation.

If the judgment result of S407 is "no", or after the S408, then judged is whether or not another operation (i.e., handling) to the operation member 415 or another operation (i.e., handling) to the mode switch 414 has been made (S409) and, if the judgment result is "yes", the operation related to the handling is performed (S410). If the judgment result of S409 is "no", or after the S410, then judged is whether or not the power switch 413 has been turned off (S411) and, if the judgment result is "no", the process shifts back to S403.

If the judgment result of S411 is "yes", then a prescribed end process is performed, the state of the camera is shifted to a power off (S412) and the present flow is ended.

The next is a description of the replay operation (of S408) in details.

In this operation, enabled is a performing of an image search by using the replayed image as the search source image. The image search determines a search range based on a set-up search condition and the supplementary information (i.e., the information of the time, place and such at the time of photographing) of the search source image and searches an image included in the search range). Then the searched image and an unsearched image (i.e., an image not searched) are simultaneously displayed. A designation of the unsearched image in this event adds a search range so as to include the unsearched image in the search range. The configuration of course makes it possible to search an image included in a search range after an addition or deletion is made.

Figure 44A:
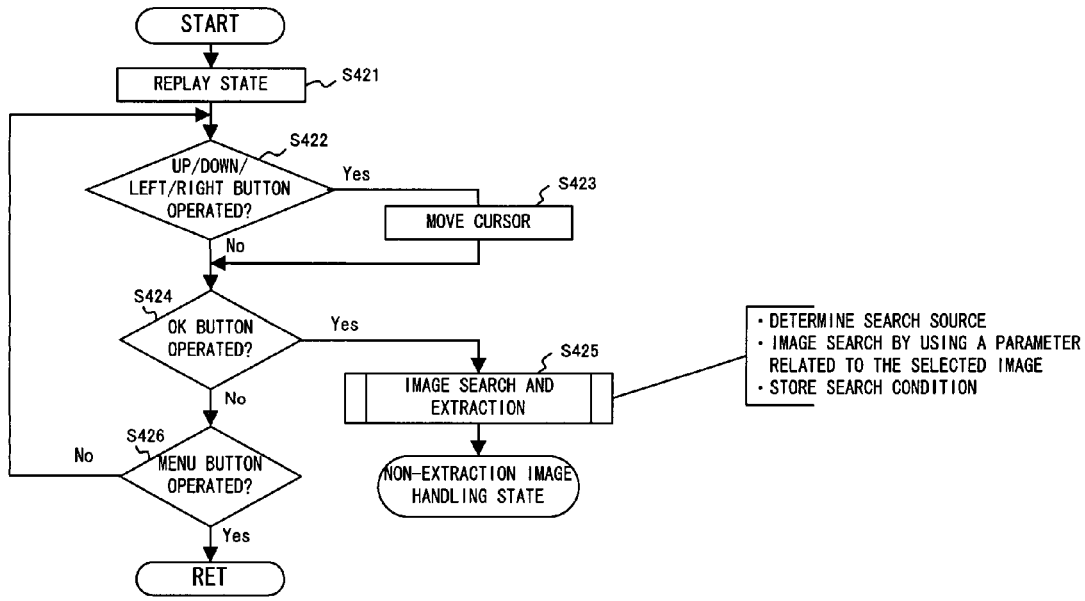
FIG. 44A is a first flow chart showing an image search operation during a replay operation in detail.
Figure 44B:
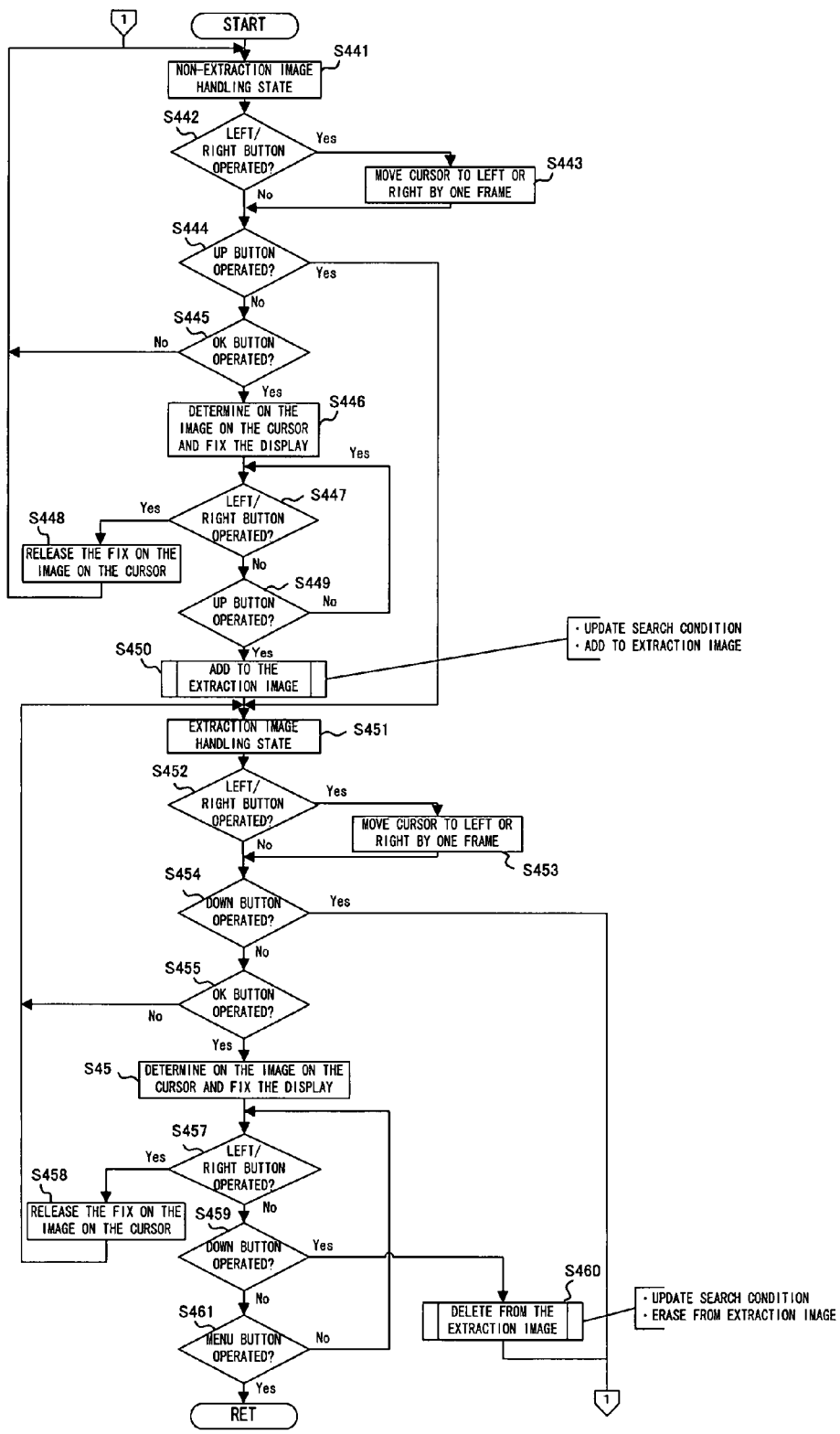
FIG. 44B is a second flow chart showing an image search operation during a replay operation in detail.
Figure 45A:
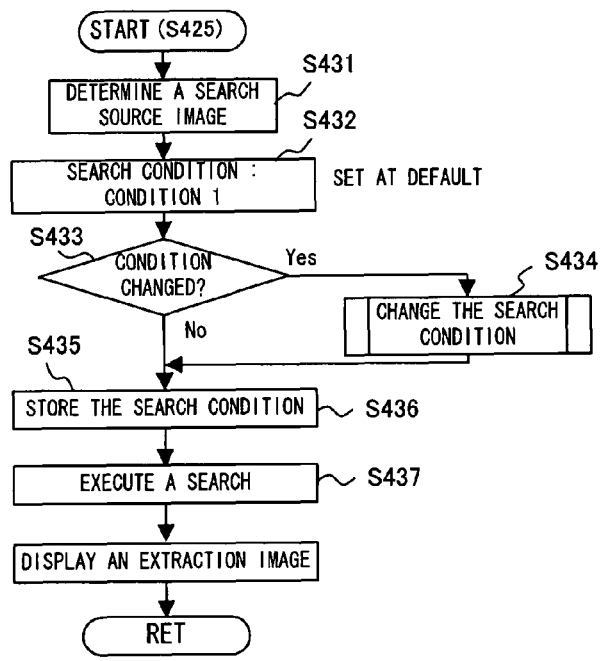
FIG. 45A is a flow chart showing the process of an image search and extraction (S425)
Figure 45B:
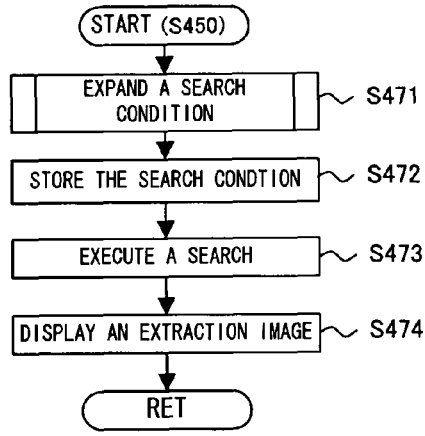
FIG. 45B is a flow chart showing the process of adding (S450) a non-extraction image as extraction image.
Figure 45C:
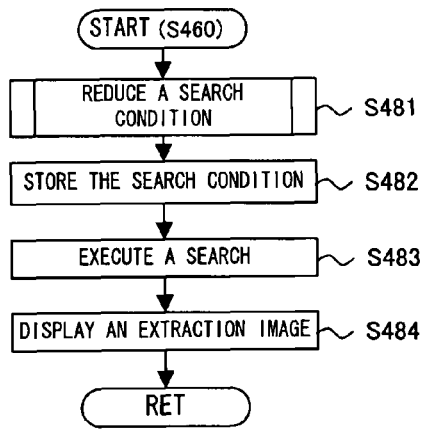
FIG. 45C is a flow chart showing the process of adding (S460) an extraction image as non-extraction image.
Figure 47:
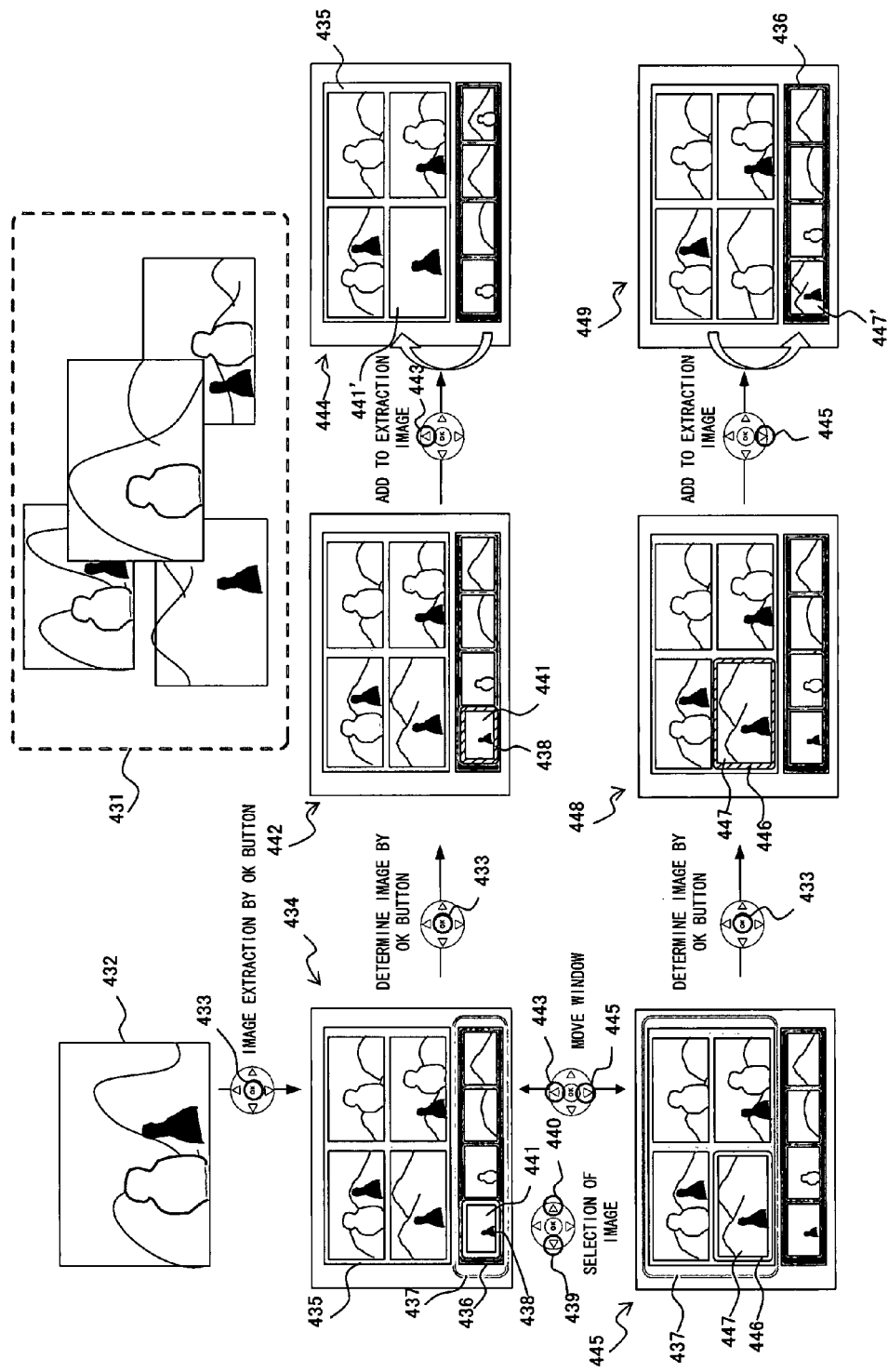
FIG. 47 is a diagram exemplifying an image transition of a display during an image search operation.
Figure 48:
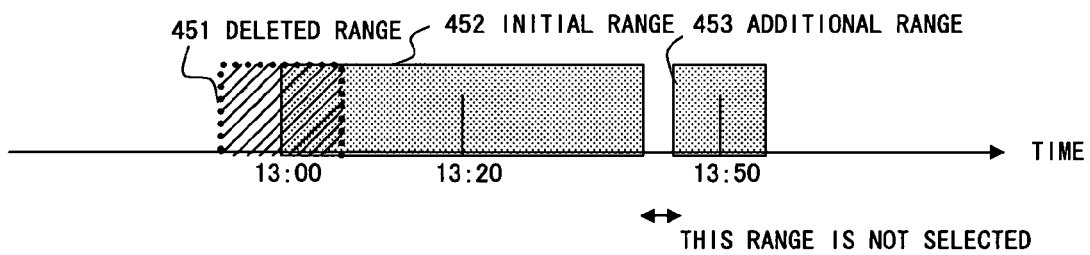
FIG. 48 is an image diagram expressing an example of a search range.

FIGS. 44A and 44B together show a first flow chart detailing an image search operation during such a replay operation. FIGS. 45A, 45B and 45C are flow charts showing respective parts of the image search operation. FIGS. 46A through 46F are diagrams for describing the examples of updating search condition information during the image search operation. FIG. 47 is a diagram exemplifying an image transition of the display member 418 during the image search operation. FIG. 48 is an image diagram expressing an example of a search range.

Upon starting a replay operation as shown in FIG. 44A, the state of the camera is shifted to a replay state (S421), followed by reading image data of a prescribed number of frames recorded in the detachable memory 407, displaying in the index display form (e.g., a 3×3 index display form) and displaying a cursor (which is a cursor formed as a frame according to the present embodiment) as pointer indicating the position for the image (e.g., the image displayed on the top left corner of the screen image) displayed in a prescribed position. Note that the present description exemplifies the display form of the image as the index form; it is, however, possible to change the display form to the single frame form.

Then judged is whether or not the Up/Down/Left/Right button is operated (i.e., pressed) (S422) and, if the judgment result is "yes", the cursor is moved in accordance to the button operation (S423). If the Up button is pressed when the cursor is displayed in the image on the upper end of the screen, or if the Down button is pressed when the cursor is displayed in the image on the bottom end of the screen, the prescribed number of frames of the other pieces of image data are read from the detachable memory 407 in response to the button operation and the cursor is displayed for the image (e.g., the image displayed on the top left corner.

If the judgment result of S422 is "no", or after the S423, then judged is whether or not the OK button is operated (i.e., pressed) (S424) and, if the judgment result is "yes", the process of image search and extraction is performed (S425). This performs the processes for determining a search source, searching an image by using a parameter related to the selected image (i.e., the search source image) and storing the search condition (including the search range), which are described in details later by referring to FIG. 45A. This process also shifts the state of the camera to a non-extraction image handling state.

If the judgment result of S424 is "no", then judged is whether or not the menu button is operated (i.e., pressed) (S426) and, if the judgment result is "yes", the process shifts back to S422, while if it is "no", the process returns.

Here, the process of the image search and extraction (of S425) is described in detail by referring to the flow chart shown in FIG. 45A and FIGS. 46A through 46D.

Before starting to describe the flow chart shown in FIG. 45A, a description here is on the examples of the search items usable for an image search, the initial range of each search item and a search expression usable for an image search all of which are stored in the built-in memory 412 by referring to FIGS. 46A and 46B.

FIG. 46A is a diagram exemplifying search items (i.e., parameters) usable for an image search and the ranges of the respective search items which are stored in the built-in memory 412. As an example, "a" indicates "date" as a parameter, with "±0" being indicated as the range of the parameter as shown in FIG. 46A. Also, "b" indicates "time" as a parameter, with "±0:20" being indicated as the range. Likewise, "c", "d", "e" and "f" indicate individual parameters, with the respective ranges of parameters being indicated. The "photo mode" of "d" is undefined because it is not definable.

FIG. 46B is a diagram exemplifying a search expression which is usable for an image search and which is stored in the built-in memory. As shown in FIG. 46B, there are two search expressions as ones usable for an image search. The "condition 1" indicates the search expression "b", and the "condition 2" indicates the search expression "a*b+c". Note that the "a", "b" and "c" included in the search expressions respectively correspond to the "a", "b" and "c" which are shown in FIG. 46A. Also, the "*" and "+" represent the logic product and logic sum, respectively. Also, the example only uses "a", "b" and "c" in the search expressions; it is of course possible to use a search expression including the "d", "e" and "f".

Premising that such data is stored in the built-in memory 412, the next is a description on the process of the image search/extraction (of S425) by referring to the flow chart shown in FIG. 45A and FIGS. 46C and 46D.

In the image search/extraction process, first, is to determine the image displayed with the cursor when the OK button has been pressed in the S424 as the search source image as shown in FIG. 45A (S431).

Then, the "condition 1" (i.e., the search expression "b") is set at default as the search condition used for an image search (S432).

Then judged is whether or not there has been an instruction for changing the search condition by the user operation of the operation member (S433) and, if the judgment result is "yes", the set search condition is changed in accordance with the instruction (S434). Two conditions are provided in the present embodiment as shown in FIG. 46B, enabling the user to change the search condition to the "condition 2". The change of the search condition, however, may alternatively be configured for the user to create a discretionary search expression based on the parameters shown in FIG. 46A and change to a search condition based on the created search expression.

If the judgment result of S433 is "no", or after the S434, then the set (or a post-change) search condition (i.e., the search expression), the parameter(s) included in the search expression, the range of the parameter(s) and the information of the search source image corresponding to the parameter(s) are stored as the search condition information in the built-in memory 412 (S435). Note that the information of the search source image corresponding to the parameter is read from the supplementary information of the image data of the search source image recorded in the detachable memory 407.

In storing the search condition information, if the "condition 1" (i.e., the search expression "b") is set as the search condition for example, the search expression "b" as the search condition, the "time" as the parameter, the "±0:20" as the range and the photographed time of the search source image as the information of the search source image corresponding to the parameter are stored as the search condition information in the built-in memory 412. FIG. 46C is a diagram exemplifying the search condition information in this event. Note that the example assumes the photographed time of the search source image is "13:20".

Alternatively, if a condition (i.e., a search expression "a+b+c+d+e+f") created discretionarily by the user is set as the search condition for example, stored as the search condition information in the built-in memory 412 are: the search expression; all parameters shown in FIG. 46A and the ranges of respective parameters; and the date, time, place, photo mode, exposure value and white balance of the search source image at the time of photographing. FIG. 46D is a diagram exemplifying the search condition information in this event. Note that the date, time, place, photo mode, exposure value and white balance of the search source image at the time of photographing are: "2006/08/08", "13:20", "N:45, E:135", "landscape", "−3EV", and "5000K", respectively in this example. Note that "N" and "E" in "N:45, E:135" represent North (in latitude) and East (in longitude).

Upon completing the S435, then searched is image data matching with the search condition from the image data recorded in the detachable memory 407 based on the search condition information stored in the built-in memory 412 (S436).

As an example, if the "condition 1" (i.e., the search expression "b") is set as the search condition, the image data included in a search range that is the photographed time is 13:20±0:20 is searched. Or, if the "condition 2" (i.e., a search expression "a*b+c") is set, the image data included in a search range that is the photographed date being 2006/08/08 ±0 and the photographed time being 13:20±0:20, or the photographed place being N:45±0, E:135±10 (where the assumption here is that the date, time and place of the search source image at the time of photographing is 2006/08/08, 13:20 and N:45, E:135, respectively).

The present example premises that the set search condition is "condition 1" (i.e., the search expression "b") and the image data matching with the search condition has been searched. Note that the search for image data is performed by the supplementary information of each data stored in the detachable memory 407 is being referred to.

Then, image data matching with the search condition, that is, the image data extracted by the image search, is read from the detachable memory 407, the image (simply noted as "extraction image" hereinafter) expressed by the image data is displayed in an extraction image window in the display screen of the display member 418; and image data not matching with the search condition, that is, the image data not extracted by the image search, is read from the detachable memory 407, and the image (simply noted as "non-extraction image" hereinafter) expressed by the image data is displayed in the non-extraction image window of the display screen (S437). This configuration displays the extraction image and non-extraction image simultaneously and identifiably in the same display screen. In the present example, it is configured to make it possible to display four extraction images in a 2×2 form within the extraction image window and display four non-extraction images in a 1×4 form within the non-extraction image window.

Also in the S437, a window frame is displayed for the non-extraction image window and a cursor is displayed for a non-extraction image displayed in a prescribed position (e.g., the non-extraction image displayed on the left end) within the non-extraction image window. Note that the window displayed with a window frame indicates a window allowing an image handling.

By this, the state of the camera shifts to a state (i.e., a non-extraction image handling state) in which a non-extraction image displayed within the non-extraction image window allows a handling.

And, upon completion of the S437, the process returns.

The following is a description, by using a part of FIG. 47, of an example of a screen image transition during the operation shown in FIG. 44A including the process of an image search/extraction shown in FIG. 45A.

Referring to FIG. 47, at the time of replaying the images (i.e., a replay image group) of the image data recorded in the detachable memory 407, which is conceptually shown within the dotted line box, a pressing of the OK button 433 when an image displayed with the cursor is the image 432 prompts a performing of an image search using the image 432 as the search source image and displaying a display screen 334 in the display member 418 based on the process shown in FIG. 45A. The display screen 334 displays an extraction image window 435 including a 2×2 extraction images and a non-extraction image window 436 including 1×4 non-extraction images. Also displayed in the non-extraction image window 436 is a window frame 437, and displayed a cursor 438 for the non-extraction image 441 on the left end within the non-extraction image window 436. With this, the state of the camera shifts to the non-extraction image handling state.

As such, the user pressing the OK button when the camera is in the replay state prompts to determine the replayed image to be the search source image, thereby enabling an image search based on the search source image.

The next is a description, by referring to the flow chart shown in FIG. 44B, of an operation after the state of the camera shifts to the non-extraction image handling state following the completion of the process of an image search and extraction (of the S425 shown in FIG. 44).

In this operation, a state of the camera is shifted to a non-extraction image handling state unless the state of the camera is already shifted to the non-extraction image handling state (e.g., in the case of performing a process after S454 (which is described later) is "yes") as shown in FIG. 44B (S441). Here, in the case of shifting the state to the non-extraction image handling state, the window frame already displayed for the extraction image window is moved to the non-extraction image window, and a cursor is displayed for the non-extraction image displayed at a prescribed position (e.g., the non-extraction image displayed on the left end) within the non-extraction image window so as to make a state of enabling a handling of the non-extraction image. In this case, a cursor within the extraction image window not showing a window frame becomes hidden.

Then, judged is whether or not the Left/Right button is operated (i.e., pressed) (S442) and, if the judgment result is "yes", the cursor within the non-extraction image window is moved to the left or right by one image based on the button operation (S443). That is, the cursor is moved to the right by one image if the right button is pressed, or the cursor is moved to the left by one image if the Left button is pressed. However, if the Left button is pressed when the cursor is displayed for the non-extraction image on the left end within the non-extraction image window, or if the Right button is pressed when the cursor is displayed for the non-extraction image on the right end within the non-extraction image window, the pieces of image data of four other non-extraction images are read from the detachable memory 407 and so they are displayed in the non-extraction image window based on the button operation, and the cursor is displayed for the non-extraction image displayed in a prescribed position (e.g., the non-extraction image displayed on the left end).

If the judgment result of S442 is "no", or after the S443, then judged is whether or not the Up button is operated (i.e., pressed) (S444) and, if the judgment result is "yes", the process proceeds to S451.

If the judgment result of S444 is "no", then judged is whether or not the OK button is operated (i.e., pressed) (S445) and, if the judgment result is "no", the process shifts back to S441.

If the judgment result of S445 is "yes", the non-extraction image displayed with the cursor is determined to be a non-extraction image to be added as an extraction image and the display is fixed by changing the colors of the cursor (S446). The change of colors of the cursor as described above enables the user to recognize the fact of the non-extraction image to be added as an extraction image being determined. Note that the change of colors of the cursor refers to changing the color of the frame of the displayed cursor to another color. Incidentally, the colors of the frame for both pre- and post-changes can be discretionarily selected by the user.

Then judged is whether or not the Left/Right button is operated (i.e., pressed) (S447) and, if the judgment result is "yes", the determination made in the S446 is released (S448) and the process shifts back to S441. Note that the release changes the color of the cursor back to the original. As such, the pressing of the Left/Right button enables the user to change non-extraction images to be added as an extraction image.

Contrarily, if the judgment result of S447 is "no", then judged is whether or not the Up button is operated (i.e., pressed) (S449) and, if the judgment result is "no", the process shifts back to S447.

If the judgment result of S449 is "yes", performed is the process of adding (to the extraction image(s)) the non-extraction image, which is determined in the S446, as an extraction image (S450). This process performs such as the processes for updating the search condition (including the search range) and adding the non-extraction image (to the extraction image(s)) as an extraction image, which is described later in detail by referring to FIG. 45B.

After the S450, or if the judgment result of S444 is "yes", unless the state of the camera is already shifted to the extraction image handling state (e.g., in the case of performing a process after the S444 is "yes"), the state of the camera is shifted to the extraction image handling state (S451). Here, in the case of shifting the state to the extraction image handling state, the window frame already displayed for the non-extraction image window is moved to the extraction image window, and the cursor is displayed for the extraction image displayed in a prescribed position within the extraction image window (e.g., the non-extraction image displayed on the left bottom) so as to enable a handling of the extraction image. In this case, the cursor within the non-extraction image window not displaying a window frame becomes hidden.

Then, judged is whether or not the Left/Right button is operated (i.e., pressed) (S452) and, if the judgment result is "yes", the cursor within the extraction image window is moved to the left or right by one image based on the button operation (S453). That is, if the Left button is pressed, the cursor is moved to the left by one image, or if the Right button is pressed the cursor is moved to the right by one image. However, if the Right button is pressed when the cursor is displayed for the extraction image on the top right within the extraction image window, the cursor is moved to the extraction image on the left bottom within the extraction image window, or if the Left button is pressed when the cursor is displayed for the extraction image on the left bottom within the extraction image window, the cursor is move to the extraction image on the top right within the extraction image window. If the Left button is pressed when the cursor is displayed for the extraction image on the top left within the extraction image window, or if the Right button is pressed when the cursor is displayed for the extraction image on the bottom right, the pieces of image data of four other extraction images are read from the detachable memory 407 based on the button operation, the four extraction images are displayed within the extraction image window, and the cursor is displayed for the extraction image displayed in a prescribed position (e.g., the extraction image displayed on the top left).

If the judgment result of S452 is "no", or after the S453, then judged is whether or not the Down button is operated (i.e., pressed) (S454) and, if the judgment result is "yes", the process shifts back to S441.

If the judgment result of S454 is "no", then judged is whether or not the OK button is operated (i.e., pressed) (S455) and, if the judgment result is "no", the process shifts back to S451.

If the judgment result of S455 is "yes", the extraction image displayed with the cursor within the extraction image window is determined to be an extraction image which is to be added as a non-extraction image and the display is fixed by changing the colors of the cursor (S456). Thus changing the colors of the cursor enables the user to recognize the fact of an extraction image to be added as a non-extraction image being determined.

Then judged is whether or not the Left/Right button is operated (i.e., pressed) (S457) and, if the judgment result is "yes", the determination made in the S456 is released (S458), followed by the process shifting back to S451. Note that the release changes the color of the cursor back to the original. As described above, the pressing of the Left/Right button enables the user to change the extraction image to be added as a non-extraction image.

If the judgment result of S457 is "no", then judged is whether or not the Down button is operated (i.e., pressed) (S459).

If the judgment result of S459 is "yes", performed is the process for adding (i.e., deleting from the extraction image) the extraction image determined in the S456 as a non-extraction image (S460). This process performs the processes for updating the search condition (including the search range) and adding (i.e., deleting from the extraction image) the extraction image as a non-extraction image, which is described later by referring to FIG. 45C. Upon completion of the process, the process shifts back to S441.

Contrarily, if the judgment result of S459 is "no", then judged is whether or not the menu button is operated (i.e., pressed) (S461) and, if the judgment result is "no", the process shifts back to S457, while if it is "yes", the process returns.

At this time, a further detailed description is provided for the process (of S450) for adding (i.e., adding to the extraction image) a non-extraction image as an extraction image and the process (of S460) for adding (i.e., deleting from the extraction image) an extraction image as a non-extraction image.

The first is the process (of S460) for adding (i.e. adding to the extraction image) a non-extraction image as an extraction image by referring to the flow chart shown in FIG. 45B and FIG. 46E.

As shown in FIG. 45B, this process first reads the information corresponding to a parameter included in the set search condition (i.e., the search expression) from the supplementary information of the image data of the non-extraction image determined in the S446 (simply noted as "determined non-extraction image" hereinafter) and the search condition is expanded by adding a search range based on the information (S471). In the present example, the set search condition is the condition 1 (i.e., the search expression "b"), and therefore a photographed time is read from the supplementary information of image data of the determined non-extraction image and the search range is expanded by adding a search range of ±0:05 with the photographed time being the center value. Here, the photographed time of the determined non-extraction image is 13:50 and therefore the search range of 13:50±0:05 is added. By this, the search range is expanded by adding the range of the photographed time being 13:50±0:05 to the range of the photographed time being 13:20±0:20, resulting in expanding the search condition.

Then, the expanded search condition is stored in the built-in memory 412 (S472). In specific, the information of the adding search range (simply named as "additional search range" hereinafter) is added to the search condition information and stored in the built-in memory 412. FIG. 46E is a diagram exemplifying the information of the additional search range added to the search condition. The addition of the additional search range to the search condition information as described above stores the expanded search condition.

Then, a search of image data matching with the search condition from the image data stored in the detachable memory 407 is performed (S473). That is, performed is a search of image data matching with the expanded search condition. In the present example, performed is a search of image data included in the search range that is the photographed time is 13:20±0:20 or the photographed time is 13:50±0:05.

Then, the image data matching with the expanded search condition is read from the detachable memory 407 and an image (i.e., an extraction image) related to the image data is displayed within the extraction image window in the display screen of the display member 418, while image data not matching with the expanded search condition is read from the detachable memory 407 and an image (i.e., a non-extraction image) related to the image data is displayed within the non-extraction image window in the display screen in the same manner as the S437 (refer to FIG. 45A). Note that the configuration is in a manner to display an image that is the determined non-extraction image always within the extraction image window at the time so as to enable the user to recognize the fact of the determined non-extraction image being added as an extraction image.

Also in the S474, the window frame displayed for the non-extraction image window is moved to the extraction image window, and the cursor is displayed for the extraction image displayed in a prescribed position (e.g., the extraction image displayed on the bottom left) within the extraction image window. Note that the cursor within the non-extraction image window not displaying a window frame is now hidden.

By this, the state of the camera shifts to a state enabling an operation for the extraction image within the extraction image window (i.e., the extraction image handling state).

Then, upon completion of the S474, the process returns.

The next is a description of the process (of S460 shown in FIG. 44B) for adding an extraction image as a non-extraction image (i.e., deleting from the extraction image) by referring to the flow chart shown in FIG. 45C, and FIGS. 46F and 48.

As shown in FIG. 45C, the process first reads information corresponding to a parameter included in the set search condition (i.e., the search expression) from the supplementary information of image data of the extraction image determined in the S456 (simply named as "determined extraction image" hereinafter), and the search condition is reduced by deleting a search range based on the information (S481). Since the present example uses the condition 1 (i.e., the search expression "b") as the set search condition, a photographed time is read from the supplementary information of image data related to the determined extraction image and the search condition is reduced by deleting the search range of ±0:05 with the readout photographed time being the center value. Here, the photographed time of the determined extraction image is 13:00, and the search range of 13:00±0:05 is accordingly deleted. By this, the search range is reduced from the range of the photographed time of 13:20±0:20 added by the photographed time of 13:50±0:05 to the resultant of the aforementioned addition of photographed time minus that of 13:00±0:05, thus resulting in reducing the search condition.

Then, the reduced search condition is stored in the built-in memory 412 (S482). In specific, the information of the search range to be deleted (simply noted as "deleted search range" hereinafter) is added to the search condition information and stored in the built-in memory 412. FIG. 46F is a diagram exemplifying the information of the deleted search range added to the search condition information. The addition of the deleted search range to the search condition information in this manner results in storing the reduced search condition.

Then a search of image data matching with the search condition from the image data recorded in the detachable memory 407 is carried out on the basis of the search condition information stored in the built-in memory 412 (S483). That is, the image data matching with the reduced search condition is searched. Therefore, the present example searches for image data included in the search range of the photographed time of 13:20±0:20 or that of 13:50±0:05 and the one not including in the search range of the photographed time of 13:00±0:05 based on the search condition information. FIG. 48 is an image diagram expressing the reduced search range in this event. The deleted range 451 delineated by dotted lines indicates the deleted search range with the photographed time of the determined extraction image at the center value, the initial range 452 indicates the search range with the photographed time of the search source image at the center value and the added range 453 indicates the additional search range of the photographed time of the determined non-extraction image at the center value. By this, a search is eventually carried out for the image data of the photographed time of between 13:05 and 13:40 or between 13:45 and 13:55. Incidentally, of the deleted range 451 shown by the dotted lines, the range between 12:55 and 12:59 are originally not selected.

Then, the image data matching with the reduced search condition is read from the detachable memory 407 and an image (i.e., an extraction image) related to the image data is displayed within the extraction image window in the display screen of the display member 418; and image data not matching with the reduced search condition is read from the detachable memory 407 and an image (i.e., a non-extraction image) related to the image data is displayed within the non-extraction image window in the display screen likewise the above described S437 (refer to FIG. 45A). Note that the configuration is such as to display the image that is the determined extraction image without fail within the non-extraction image window at the time so as to enable the user to recognize the fact of the determined extraction image being added as a non-extraction image.

Also in the S484, the window frame already displayed for the extraction image window is moved to the non-extraction image window, and the cursor is displayed for the non-extraction image displayed in a prescribed position (e.g., the extraction image displayed on the left end) within the non-extraction image window. Note that the cursor within the extraction image window not displaying a window frame is now hidden.

This process makes the state of the camera shift to a state (i.e., a non-extraction image handling state) enabling a handling of a non-extraction image within the non-extraction image window.

Then, upon completion of the S484, the process returns.

The following is a description, by using the remainder part of FIG. 47, of a screen image example shown during the operation (shown in FIG. 44B) including such process for adding the non-extraction image shown in FIG. 45B as an extraction image and the process for adding the extraction image shown in FIG. 45C as a non-extraction image.

Referring to FIG. 47, a pressing of the Left/Right buttons (i.e., the Left button 439 and Right button 440) when the display screen 334 is displayed, that is, the state of the camera is in the non-extraction image handling state, makes it possible to select a non-extraction image by moving the cursor 438 displayed within the non-extraction image window 436. Here, a pressing of the OK button 433 when the cursor 438 is displayed for the non-extraction image 441 on the left end within the non-extraction image window 436 determines the selected non-extraction image 441 to be the non-extraction image to be added as extraction image and changes the colors of the cursor 438 as shown in the display screen 442. Here, the color of the post-change cursor 438 is indicated by a diagonal line shading for convenience of the drawing. The color of the cursor 438 is changed to red if the usual color of the cursor 438 is green, for example. This configuration enables the user to recognize the event of the non-extraction image 441 having been determined to be a non-extraction image to be added as an extraction image. Here, a further pressing of the Up button 443 expands, and stores, the search condition, performs an image search based on the expanded search condition and display the display screen 444 in accordance with the process shown in FIG. 45B. The display screen 444 displays a 2×2 extraction images in the extraction image window 435 and a 1×4 non-extraction images in the non-extraction image window 436 of a result of an image search based on the expanded search condition. In this event, a non-extraction image 441 is displayed within the extraction image window 435 as an extraction image 441' without fail so as to enable the user to recognize the event of the non-extraction image 441 having been added as an extraction image. This results in a non-extraction image to be added as an extraction image moving from the non-extraction image window to the extraction image window. Then, although not shown in a drawing herein, the window frame 437 already displayed in the non-extraction image window 436 moves to the extraction image window 435 and the cursor is displayed for the extraction image displayed in a prescribed position within the extraction image window 435. Incidentally, the cursor 446 within the non-extraction image window 436 is now hidden. This prompts the state of the camera to shift to the extraction image handling state.

In the meantime, a pressing of the Down button 45 in the display screen 334 moves the window frame 437 already displayed in the non-extraction image window 436 to the extraction image window 435 and displays the cursor 446 for the extraction image displayed on the bottom left within the extraction image window 435 as shown in the display screen 445. Incidentally the cursor 438 within the non-extraction image window 436 is now hidden. This prompts the state of the camera to shift to the extraction image handling state. In the display screen 445, a pressing of the Left/Right buttons (i.e., the Left button 439 and Right button 440) makes it possible to select an extraction image by moving the cursor 446 indicated within the extraction image window 435. Here, a pressing of the OK button 433 when the cursor 446 is displayed for the extraction image 447 on the bottom left within the extraction image window 435 determines the selected extraction image 447 to be the extraction image to be added as a non-extraction image, and changes the color of the cursor 446 as shown in the display screen 448. Except that the color of the post-change cursor 446 is represented by a diagonal line shading for convenience of the drawing. The color of the cursor 446 is changed to red if the usual color thereof is green for example. This configuration enables the user to recognize the event of the determination of the extraction image 447 as an extraction image to be added as a non-extraction image. Here, a further pressing of the Down button 45 reduces, and stores, the search condition, performs an image search based on the reduced search condition and displays a display screen 449 in accordance with the process shown in FIG. 45C. The display screen 449 displays a 2×2 extraction images in the extraction image window 435 and a 1×4 non-extraction images in the non-extraction image window 436 of a result of an image search based on the reduced search condition. In this event, an extraction image 447 is displayed within the non-extraction image window 436 as a non-extraction image 447' without fail so as to enable the user to recognize the event of the extraction image 447 having been added as a non-extraction image. This results in the extraction image to be added as a non-extraction image moving from the extraction image window to the non-extraction image window. Then, although not shown in a drawing herein, the window frame already displayed in the extraction image window 435 moves to the non-extraction image window 436 and the cursor 438 is displayed for a non-extraction image displayed in a prescribed position within the non-extraction image window 436. Incidentally, the cursor 446 within the extraction image window 435 is now hidden. This prompts the state of the camera to shift to the non-extraction image handling state.

Note that a pressing of the Up button 443 in the display screen 445 makes it possible to return to the display screen 334.

As described above, in the state of the camera being in the non-extraction image handling state (e.g., the state of the display screen 334), the user pressing the Left/Right button and OK button selects and determines a non-extraction image to be added as an extraction image, and a further pressing of the Up button adds a search range based on the non-extraction image (i.e., the determined non-extraction image), making it possible to perform an image search based on the expanded search condition. Also, in the non-extraction image handling state, a pressing of the Up button also makes it possible to shift the state of the camera to the extraction image handling state.

Also, in the state of the camera being in the extraction image handling state (e.g., the state of the display screen 445), the user pressing the Left/Right button and OK button selects and determines an extraction image to be added as a non-extraction image, and a further pressing of the Down button deletes a search range based on the extraction image, making it possible to perform an image search based on the reduced search condition. Also in the extraction image handling state, a pressing of the Down button moves the window frame, thereby making it possible to shift the state of the camera to the non-extraction image handling state.

Also as described above, the fact of matching between the movement direction of the window frame and the operating direction of the button (i.e., the handling of the Up and Down buttons), that of matching between the movement direction of the determined non-extraction image and the operating direction of the button (i.e., the Up button), and that of matching between the determined extraction image and the operating direction of the button (i.e., the Down button) provides the user with very comprehensive operability.

As described thus far, when the user tries to search and display only the image data satisfying a discretionary condition from among the image data recorded in the detachable memory 407, the present embodiment makes it possible to change not only the condition (e.g., the "condition 1" and "condition 2" shown in FIG. 46B) but also the range of the condition (e.g., a search range related to the photographed time) discretionarily. Moreover, it makes it possible to change the range of the condition just by a simple operation such as specifying an image displayed as the result of an image search in the screen. This configuration enables the user to update the search condition satisfying her/his intention vis-à-vis the result of the image search simply and easily.

It is therefore possible to change discretionarily the range of a search condition used for the user performing an image search in a simply operation.

Note that the present embodiment is configured to set both of the additional search range and deleted search range at the range of a ±0:05 with the photographed time of the determined image at the center value as shown in FIGS. 46E and 46F. The range, however, of the ±0:05 is arbitrary and the range is changeable in accordance with an interval of photographed time of a temporally adjacent image to the determined image in a manner not to let the additional search range and deleted search range overlap with each other, for example. Alternatively, the shortest time interval of the photographed time between the temporally adjacent images can be uniformly set as the range so as not to let the additional search range and deleted search range overlap with each other.

Also, the present embodiment is configured to store, as search condition information, the information of a search range specifying the photographed time of a search source image at the center value, the information of an additional search range specifying the photographed time of a determined non-extraction image at the center value and the information of a deleted search range specifying the photographed time of a determined extraction image at the center value, as shown in FIGS. 46C, 46E and 46F. An alternative configuration, however, is possible to store, in place of the aforementioned kinds of information, the link information of each of the search source image, determined non-extraction image and determined extraction image, read necessary information from the supplementary information of each of the images based on the link information, and obtain an initial range specifying the photographed time of the search source image, an additional search range specifying the photographed time of a determined non-extract image at the center value and a deleted search range specifying the photographed time of a determined extraction image at the center value.

Also, the present embodiment can be configured to set an upper limit to the number of non-extraction images (i.e., the number of additional search ranges) addable as extraction images. It can also be configured to set an upper limit to the number of extraction images (i.e., the number of deleted search ranges) addable as non-extraction images.

Figure 49A:
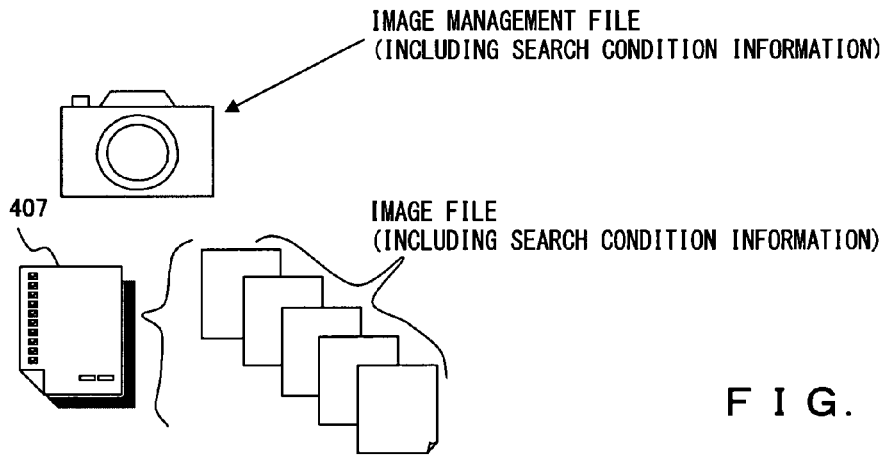
FIG. 49A is a first diagram exemplifying a storage aspect of search condition information.
Figure 49B:
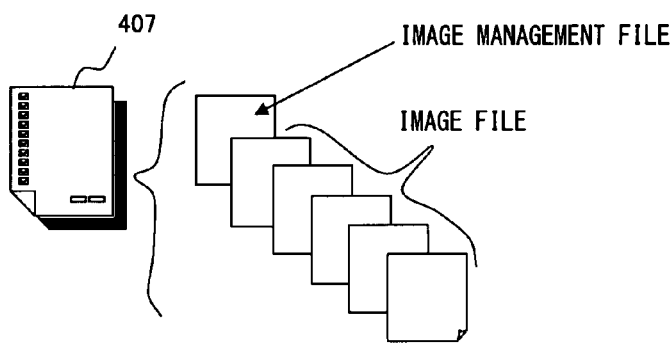
FIG. 49B is a second diagram exemplifying a storage aspect of search condition information.
Figure 49C:
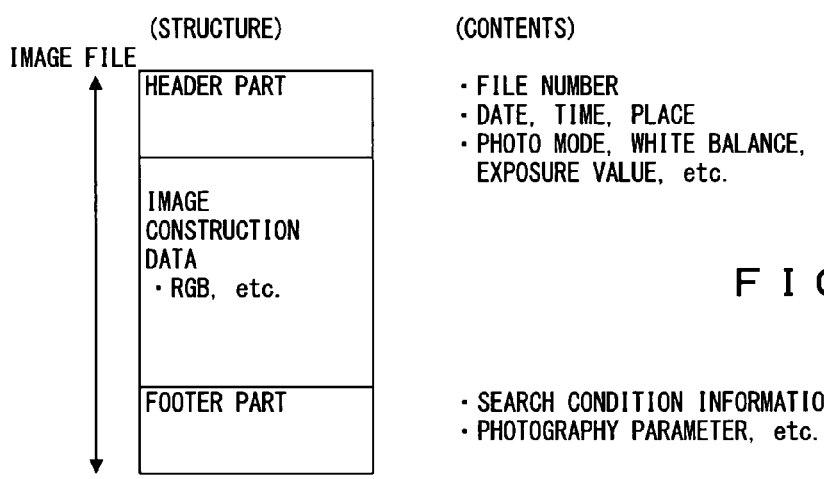
FIG. 49C is a third diagram exemplifying a storage aspect of search condition information.

Also, the present embodiment is configured to store search condition information in the built-in memory 412; the storage configuration for the search condition information, however, is arbitrary. An example configuration is possible to store the search condition information as an image management file in the built-in memory 412 as shown in FIG. 49A. Yet another configuration is possible to record the search condition information as an image management file in the detachable memory 407 as shown in FIG. 49B. Yet another configuration is possible to record the search condition information in the detachable memory 407 by including the search condition information in the supplementary information with an image file as shown in FIG. 49C.

<Fifth Embodiment>

A camera according to a fifth preferred embodiment of the present invention is one capable of searching a desired image simply and easily, and particularly the one capable of extracting a desired photo image simply from among the recorded photo images by a simple and comprehensible method.

FIG. 50 is a diagram exemplifying a configuration of a digital camera that is a camera according to the present embodiment.

Referring to FIG. 50, the digital camera comprises a photo lens 501 for imaging an object image onto an imaging element 507 (i.e., CCD, CMOS, et cetera). The photo lens 501 comprises a focus lens system 502a, an aperture 503, a shutter 504 and a variable magnification system 502b for varying a focus distance. The photo image of an object which is photoelectrically converted and read by the imaging element 507 is extracted by an image extraction unit 508 and subjected to a necessary image process by an image process unit 509, followed by being stored in internal memory (i.e., an internal storage unit) 511, such as flash memory, or in external memory (i.e., an external storage unit) 512, such as a memory card (e.g., xD picture card (Registered Trademark)), by a control of a storage control unit 510. In parallel with the storage process, the object image is displayed in the display screen of a display unit (e.g., TFT) 514.

A focal point detection unit 515 detects a focal point based on the photo image obtained by a photoelectrical conversion applied by the imaging element 507 and, based on the obtained result, a lens drive unit 516 drives the focus lens system 502a to shift in the optical axis direction so as to image the object image onto the imaging element 507 in a focused state. Then, information of object distance is calculated on the basis of the driven and shifted lens position.

A light measurement unit 517 measures a brightness of the object based on the photo image of the object which has been photo-electrically converted and read by the imaging element 507, an aperture drive unit 518 drives an aperture 503 in accordance with the output of the light measurement unit 517 corresponding to the measured brightness, and an imaging element sensitivity setup unit 519 changes or sets the sensitivity of the imaging element 507. Note that the configuration includes a capability of driving the aperture 503 based on the output of an aperture value setup unit 520 setting an aperture value in accordance with a camera operation of the user (i.e., the photographer), and of setting to change the sensitivity of imaging element 507.

A strobe unit 521 stores electric charge in a strobe flash-use capacitor (not shown in a drawing herein) and discharge the charge stored in the strobe flash-use capacitor to a strobe flash unit (e.g., a xenon lamp) 522 at the photographing timing, thereby making it perform a strobe flash.

The shutter 504 is normally open to allow a continuous display of the images of objects on the display unit 514 to enable the displaying unit 514 to play a role of a finder. As the user operates a release switch 523 to start a photographing, the shutter 504 is closed, followed by extracting the image of an object, storing and displaying the image in accordance with the above described process. The reason for closing the shutter is to prevent the object image on the imaging element 507 from being changed as a result of the object or camera moving in the midst of extracting the image. Note that the opening and closing of the shutter 504 is performed by the shutter drive unit 524. The configuration also includes a capability of the shutter drive unit 524 driving the shutter 504 in accordance with the output of a shutter speed setup unit 525 setting a shutter speed responding to a camera operation of the user, thereby opening and closing the shutter 504 at a desired shutter speed.

A zoom switch 526 is constituted by a zoom down switch 526a and by a zoom up switch 526b. An operation of the zoom switch 526 by the user in the photo mode makes a zoom drive unit 527 drive the variable magnification system 502b to shift in the optical axis direction based on the output of the zoom switch 526, thereby changing the focal distance of the focus lens system 502a. The user operating the zoom switch 526 in the replay mode enlarges or reduces the replay image, or changes the replay form between the index replay and single frame replay based on the output of the zoom switch 526.

A mode setup unit 528 sets an operation mode in accordance with the camera operation of the user. The settable operation mode includes various modes such as photo mode and replay mode.

A switch group 529 is a group of switches, including switches for turning on/off in accordance with the user's button operation, for receiving various instructions from the user. The buttons include a power button, a menu button, a favorites button, an Up/Down/Left/Right button, or an OK button, which are described later.

An external device control unit 530 performs a control for communicating with an external device (e.g., a personal computer (PC)) 532.

A camera control unit 531 is constituted by a CPU 531a, ROM 531b, and SDRAM 531c. The CPU 531a, being connected to the respective units by way of a bus line 533, controls the entirety of the digital camera based on a control program stored in the ROM 531b. And the CPU 531a also controls an execution of each switch 523, 526, 529, for example, function switch key implemented by a touch panel et cetera, displayed in the display unit 514, based on a mode setup signal by the mode setup unit 528, based on a shutter speed setup signal by the shutter speed setup unit 525, and based on an aperture value setup signal by the aperture value setup unit 520. SDRAM 531c, employing programmable ROM, Flash ROM or such, is used as a work area for temporarily storing image data. ROM 531b is for storing the control program and a program for carrying out other various functions of the digital camera. The ROM 531b additionally stores various kinds of data necessary for executing the program and a favorites file (which is described later).

FIG. 51 is a rear view diagram of a digital camera according to the present embodiment.

Referring to FIG. 51, a TFT 541 is a display screen of the display unit 514. A shutter button 542 is a button for instructing photography. When the shutter button 542 is pressed, a release switch 523 is turned on.

Zoom buttons 543 (i.e., 543a and 543b) are buttons for instructing a zooming to a wide side (a wide angle side) or telephoto side. A pressing of the zoom button 543a turns on the zoom switch 526a, performing a zooming to the wide side. A pressing of the zoom button 543b turns on the zoom switch 526b, performing a zooming to the telephoto side. The zoom buttons 543 (i.e., 543a and 543b) also have the functions of enlarging or reducing the replay image, or changing the display form between the index replay and single frame replay.

The menu button 544 is one for instructing a display of various menus in the TFT 541, or a cancellation thereof. The favorites button 545 is one for instructing a start of a search process for an image, which is described in detail later. The Up/Down/Left/Right button 546 (i.e., Up button 546a, Down button 546b, Left button 546c and Right button 546d) is a button for instructing to move a cursor (including a cursor frame) displayed in the TFT 541 and for a frame advance of images displayed in the TFT 541. The OK button 547 is one for instructing to determine an item or image displayed in the TFT 541. A pressing of the OK button 547 makes it possible to specify a category and a partial image used for an image search which is described later.

Note that the present embodiment is configured to enable a setup of various modes such as photo mode and replay mode by operating the menu button 544, Up/Down/Left/Right button 546 and OK button 547; an alternative configuration, however, is possible to equip the back of the digital camera with a mode dial for example enabling a setup of various operation modes, and set an operation mode based on the dial operation.

Meanwhile, the present embodiment comprises a plurality of modes as photo modes, such as auto mode capable of photographing by the camera automatically set the photographic conditions, and various modes, such as portrait mode, self portrait mode, sleeping face mode, landscape mode, night scene mode, sunset mode, landscape & person mode, night scene & person mode and macro mode, in which the camera automatically sets the appropriate photographic conditions according to the photographing scene. These modes can be set by operating the menu button 544, Up/Down/Left/Right button 546 and OK button 547, according to the present embodiment.

The next is a description of an operation of the digital camera according to the present embodiment. Note that the present operation is implemented by the CPU 531a reading, and executing, the program stored in the ROM 531a as noted above.

FIG. 52 is a flow chart showing an overall operation of a digital camera according to the present embodiment.

As shown in FIG. 52, upon detecting a power-on operation (i.e., a pressing of a power button (not shown in a drawing herein)) by the user when the digital camera according to the present embodiment is in a power off state (step 501; simply noted as "S501" hereinafter), the camera becomes the power-on state (S502), performs an initialization process in a photo mode by setting the operation mode to the photo mode (S503) and becomes a photography standby state (S504). Incidentally, in the initialization process in the photo mode in the S503, a reading process necessary for photographing is performed, such as moving the focus lens system 502a and variable magnification system 502b to a position enabling photography.

Then, an operation key input is detected (S505). First, judged is whether or not the operation input has been a power off operation input (i.e., a pressing of a power button (not shown herein)) (S506) and if the judgment result is "yes", the camera becomes a power off state (S507) and the present flow ends.

If the judgment result of S506 is "no", then judged is whether or not the operation input detected in the S505 has been a release operation (i.e., the shutter button 542 is pressed (i.e., the release switch 523 is turned on)) (S508) and, if the judgment result is "yes", a photo operation is performed (S509). Note that an image photographed in the photo operation is recorded as an image file in the internal memory 511 or external memory 512. The image file includes not only image data expressing a photo image but also the supplementary information thereof. The supplementary information includes information such as photo date and photo condition at the time of photographing. The information of the photo condition includes information such as a photo mode (i.e., the auto mode described above, portrait mode, landscape mode, et cetera) at the time of photographing, an application or not of a flash emission and the kind thereof, a usage or not of a self-timer, an object distance (i.e., long distance, middle/short distance, macro area), shutter speed and exposure value. Note that the object distance is obtained by the focal point detection unit 515.

Then, upon completion of the photo operation in the S509, the process shifts back to S504.

If the judgment result of S508 is "no", then judged is whether or not the operation input detected in the S505 has been a zooming operation (i.e., the zoom button 543 is pressed (i.e., the zoom switch 526 is turned on)) (S510) and, if the judgment result is "yes", a zoom operation is performed (S511), followed by returning to the S504.

If the judgment result of S510 is "no", then judged is whether or not the operation input detected in the S505 has been a menu operation (i.e., the menu button 544 is pressed) other than the operation for setting a replay mode (S512) and, if the judgment result is "yes", the corresponding setup operation is performed (S513), followed by the process shifting back to S504.

If the judgment result of S512 is "no", then judged is whether or not the operation input detected in the S505 has been a menu operation (i.e., the menu button 544 is pressed) for setting a replay mode (S514) and the process shifts back to S504.

If the judgment result of S514 is "yes", the operation mode is changed from the photo mode to the replay mode (S515), an initialization process is performed in the replay mode (S516) and the state becomes the single frame display (S517). Note that the initialization process in the replay mode in the S516 performs a readying operation required for replay. Also, in the single frame replay state of the S517, one photo image (e.g., a photo image photographed most recently) recorded in the internal memory 511 or external memory 512 is read and displayed in the TFT 541.

Then an operation key input is detected (S518). First, judged is whether or not the operation input has been a power off operation (i.e., a power button (not shown in a drawing herein) is pressed) (S519) and, if the judgment result is "yes", the camera becomes the power off state (S520) and the present flow ends.

If the judgment result of S519 is "no", then judged is whether or not the operation input detected in the S518 has been an Up/Down/Left/Right button operation (i.e., the Up/Down/Left/Right button 546 is pressed) (S521) and, if the judgment result is "yes", a frame forward or reverse operation is performed in accordance with the operation of pressing the button (S522). The frame forward or reverse operation makes it possible to read a photo image recorded in the internal memory 511 or external memory 512 in accordance with the pressing of the Up/Down/Left/Right button 546 and display the image in the TFT 541. This operation makes it possible to read the photo images recorded in the internal memory 511 or external memory 512 frame by frame and display it in the TFT 541 in accordance with the pressing of the Left and Right buttons 546c and 546d in the single frame replay state as an example. Or, it is possible to read photo images recorded in the internal memory 511 or external memory 512 for each prescribed number of frames and display in the TFT 541 in accordance with the pressing of the Up and Down buttons 546a and 546b in the index replay state. Also enabled is a display of the cursor for one of the displayed plural photo images and a movement of the cursor in accordance with the pressing of the Left and Right buttons 546c and 546d in the index replay state.

If the judgment result of S521 is "no", then judged is whether or not the operation input detected in the S518 has been a telephoto operation (i.e., the zoom button 543b is pressed (i.e., the zoom switch 526b is turned on)) (S523) and, if the judgment result is "yes", the photo image displayed in the single frame replay in the TFT 541 is enlarged and replayed in the single frame form (S524), and the process shifts back to S518. In the index replay state, however, the replay form is changed from the index replay to a single frame form (S524) and the process shifts back to S518. If the replay form is changed to the single frame replay, it becomes the single frame replay state.

If the judgment result of S523 is "no", then judged is whether or not the operation input detected in the S518 has been a wide angle operation (i.e., the zoom button 543a is pressed (i.e., the zoom switch 526a is turned on)) (S525) and, if the judgment result is "yes", the photo image enlarged and displayed in the TFT 541 is reduced and displayed in the single frame (S526), and the process shifts back to S518. If it is already displayed in the single frame form in the common size instead of being enlarged, however, the replay form is changed from the single frame replay to the index replay form (S526) and the process shifts back to S518. If the replay form is changed to the index replay, it becomes the index replay state.

If the judgment result of S525 is "no", then judged is whether or not the operation input detected in the S518 has been an erase operation (i.e., an erase button (not shown in a drawing herein) is pressed) (S527) and, if the judgment result is "yes", the photo image (i.e., image file) replayed in the single frame replay in the TFT 541 is erased from the internal memory 511 or external memory 512 (S528), followed by the process shifting back to S517. In the index replay state, however, the photo image (i.e., image file) displayed with the cursor is erased from the internal memory 511 or external memory 512 (S528) and the process shifts back to S517.

If the judgment result of S527 is "no", then judged is whether or not the operation input detected in the S518 has been a menu operation (i.e., the menu button 544 is pressed) (S529) and, if the judgment result is "yes", the corresponding operation is performed (S530), followed by the process shifting back to S517.

If the judgment result of S529 is "no", then judged is whether or not the operation input detected in the S518 has been a favorites operation (i.e., the favorites button 545 is pressed) (S531) and, if the judgment result is "yes", a favorites replay process is performed (S532). This process is enabled to search, and display, a photo image possessing a partial image which is the same as, or similar to, that of the photo image from the internal memory 511 or/and external memory 512 based on the replayed photo image, the detail of which contents is described later by referring to FIG. 53. Upon completion of the favorites replay process, the process shifts back to S518.

If the judgment result of S531 is "no", then judged is whether or not the operation input detected in the S518 has been a menu operation (i.e., the menu button 544 is pressed) for setting a photo mode (S533) and, if the judgment result is "no", the process shifts back to S511.

If the judgment result of S533 is "yes", the operation mode is changed from the replay mode to the photo mode (S534) and the process shifts back to S3.

Figure 53:
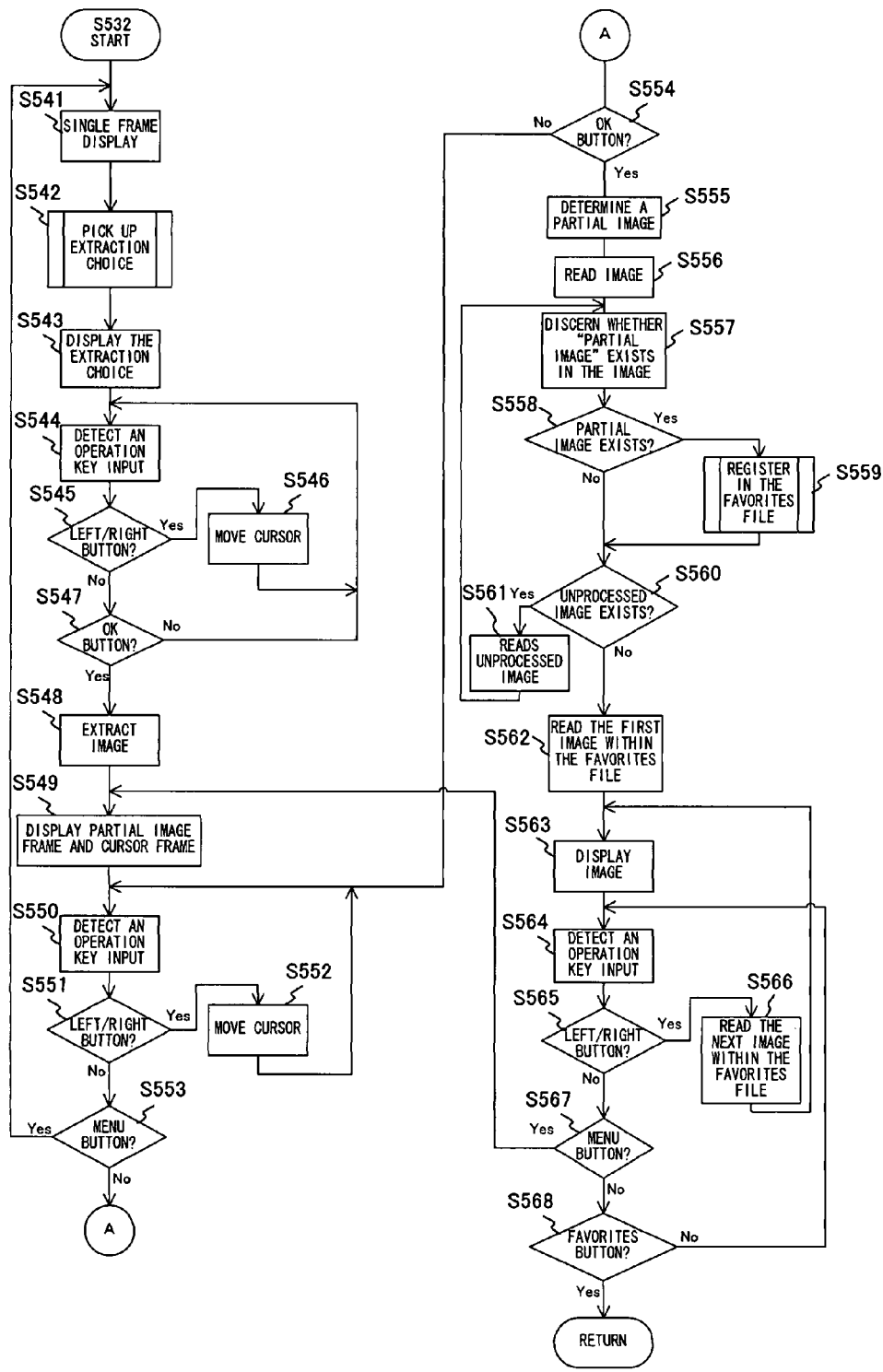
FIG. 53 is a flow chart showing contents of a favorite image replay process (S532) in details.

FIG. 53 is a flow chart showing contents of the favorites replay process (S532) in details.

As shown in FIG. 53, if the replay state prior to entering this process has been the single frame replay state, first, the photo image having been replayed in the single frame relay is displayed in the TFT in the single frame replay form, while if it has been the index replay state, the photo image displayed with the cursor is displayed in the TFT 541 in the single frame replay form (S541). Note that the photo image displayed in the single frame form in this event constitutes a search source image.

Then, a category corresponding to a partial image usable at the time of an image search is picked up (i.e., extracted) as an extraction choice from the photo image displayed in the single frame form (S542). Note that the categories possible to pick up is either one or more of the "face", "flower", "ridge line" or "horizon", the detail contents of which is described later by referring to FIG. 54. If there is no category to be picked up as an extraction choice, however, the favorites replay process is ended and the process returns.

If an extraction choice is picked up in the S542, the picked-up extraction choice is displayed in the TFT 541 together with the photo image displayed in the single frame form and also the cursor is displayed for one of the picked-up extraction choice (S543). The cursor in this event is one displayed in the form of the frame indicated by the component sign 56 shown in FIG. 55.

Then, if an operation input on the camera operated by the user (S544), first judged is whether or not the button input is a pressing of the Left or Right button (i.e., the Left button 546c or Right button 546d) (S545) and, if the judgment result is "yes", the displayed cursor is moved to another extraction choice in accordance with the button operation (S546) and the process shifts back to S544. This enables the user to freely select a category corresponding to the partial image to be used at the time of an image search. If there is only one extraction choice picked up in the S542, the process skips the S546 and returns to the S544.

If the judgment result of S545 is "no", then judged is whether or not the operation input detected in the S544 has been a pressing of the OK button 547 (S547) and, if the judgment result is "no", the process shifts back to S544.

If the judgment result of S547 is "yes", the extraction choice displayed with the cursor is determined to be a category to be used at the time of an image search and all the partial images corresponding to the category are extracted from the photo image displayed in the single frame form (S548). As an example, if the category of "face" is determined to be a category to be used at the time of an image search, the partial images recognizable as a face are extracted. Note that if the judgment result of S547 is "yes" (i.e., the OK button is pressed), it means that a category to be used at an image search has been specified.

Then, a partial image frame(s) is displayed for a part corresponding to the extracted image in the photo image displayed in the single frame form and also a cursor frame is displayed for one of the partial image frames (S549). This results in displaying the extracted partial image and other parts identifiably in the photo image.

Then, if an operation input operated by the user is detected (S550), first judged is whether or not the button operation is a pressing of the Left or Right button (i.e., the Left button 546c or Right button 546d) (S551) and, if the judgment result is "yes", the displayed cursor frame is moved to another partial image frame in accordance with the button operation (S552) and the process shifts back to S550. This enables the user to select freely a partial image to be used at an image search. If the partial image extracted in the S548 is only one, the S552 is skipped and the process shifts back to S550.

If the judgment result of S551 is "no", then judged is whether or not the operation input detected in the S550 has been a pressing of the menu button 544 (S553) and, if the judgment result is "yes", the process shifts back to S541. The returning of the process to the S541 cancels the category determined for the partial image to be used at an image search, enabling the user to re-specify the category.

If the judgment result of S553 is "no", then judged is whether or not the operation input detected in the S547 has been a pressing of the OK button 547 (S554) and, if the judgment result is "no", the process shifts back to S550.

If the judgment result of S554 is "yes", the partial image within the partial image frame displayed with the cursor frame is determined to be a partial image to be used at the time of an image search (S555). Note that if the judgment result of S555 is "yes" (i.e. the OK button is pressed) as noted above, it results in specifying a partial image to be used at the time of an image search.

Then, one photo image is read from them recorded in the internal memory 511 or external memory 512 (S556), and whether or not there is a partial image, in the readout photo image, which is the same as, or similar to, the partial image determined in the S555 is discerned (S557).

Then, judged is whether or not there is a partial image, in the readout photo image, which is the same as, or similar to, the partial image determined in the S555 based on the discernment result (S558) and, if the judgment result is "yes", the link information of the photo image for which the judgment is made is registered in the favorites file stored in the ROM 531b (S559). If, however, a favorites file is not stored in the ROM 531b in this event, a favorites file is created anew, with the link information being registered therein, and stored in the ROM 531b.

If the judgment result of S558 is "no", or after the completion of the S559, then judged is whether or not an unprocessed photo image to which the judgment process of the S558 is not applied exists among the photo images recorded in the internal memory 511 and external memory 512 (S560) and, if the judgment result is "yes", one of the unprocessed photo image is read (S561), followed by the process shifting back to S557.

As such, the performing of the processes of the S555 through S561 extracts all the photo images possessing a partial image which is the same as, or similar to, the partial image determined in the S555 from among the photo images recorded in the internal memory 511 and external memory 512 and registers the link information of the extracted images in the favorites file.

Then, if the judgment result of S560 is "no", one photo image corresponding to the link information registered initially in the favorites file is read from the internal memory 511 or external memory 512 (S562) and displayed in the TFT 541 (S563). Note that a partial image frame is displayed for the partial image which is the same as, of similar to the partial image determined in the S555 in this event. This results in displaying the partial image and other parts identifiably.

Then if an operation input of the user is detected (S564), first judged is whether or not the button operation is a pressing of the Left/Right button (i.e., the Left button 546c or Right button 546d) (S565) and, if the judgment result is "yes", one photo image corresponding to the link information which is link information registered in the favorites file and which is registered before or after the link information of the displayed photo image is read from the internal memory 511 or external memory 512 in accordance with the button operation (S566), followed by the process shifting back to S563.

If the judgment result of S565 is "no", then judged is whether or not the operation input detected in the S564 has been a pressing of the menu button 544 (S567) and, if the judgment result is "yes", the process shifts back to S549. The process returning thusly to the S549 cancels the partial image determined to be the one to be used at an image search, enabling the user to re-specify the partial image.

If the judgment result of S567 is "no", then judged is whether or not the operation input detected in the S564 has been a pressing of the favorites button 545 (S568) and, if the judgment result is "no", the process shifts back to S564, while if it is "yes" the process returns and the favorites replay process ends.

Figure 54:
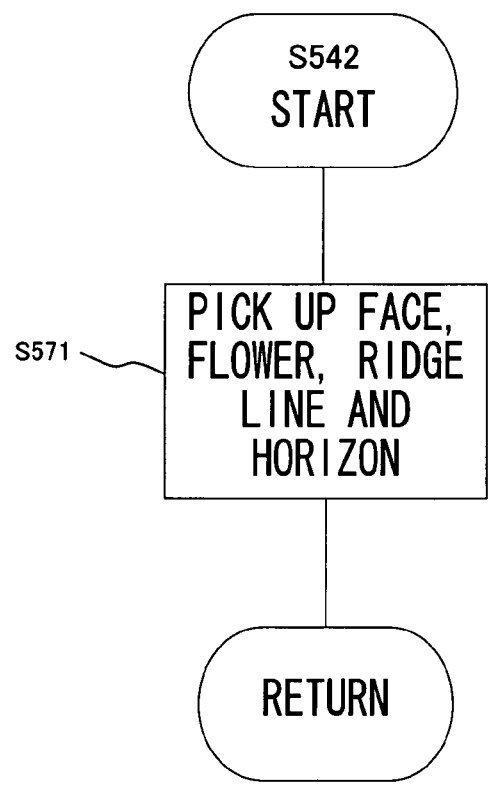
FIG. 54 is a flow chart showing contents of the process for picking up (S542) extraction choices.

FIG. 54 is a flow chart showing contents of the process for picking up (S542) the extraction choices.

As shown in FIG. 54, this process detects a partial image corresponding to each of the categories, i.e., "face", "flower", "ridge line" and "horizon" from the photo image displayed in the single frame form in the S541, and picks up, as an extraction choice, a category corresponding to the partial image actually detected as a result of the detection (S571), followed by the process returning.

Incidentally, when detecting a partial image corresponding to the "face" for example from a photo image, a partial image recognizable as face is detected from the photo image. In this step, there is no need to detect all the faces in the screen, but a "face" is picked up as one partial image is detected, thereby processing it in a short time, which is the same for other individual categories. In this event, the detection uses a known search method such as the pattern matching method, the semantic association image search method, et cetera.

Figure 55:
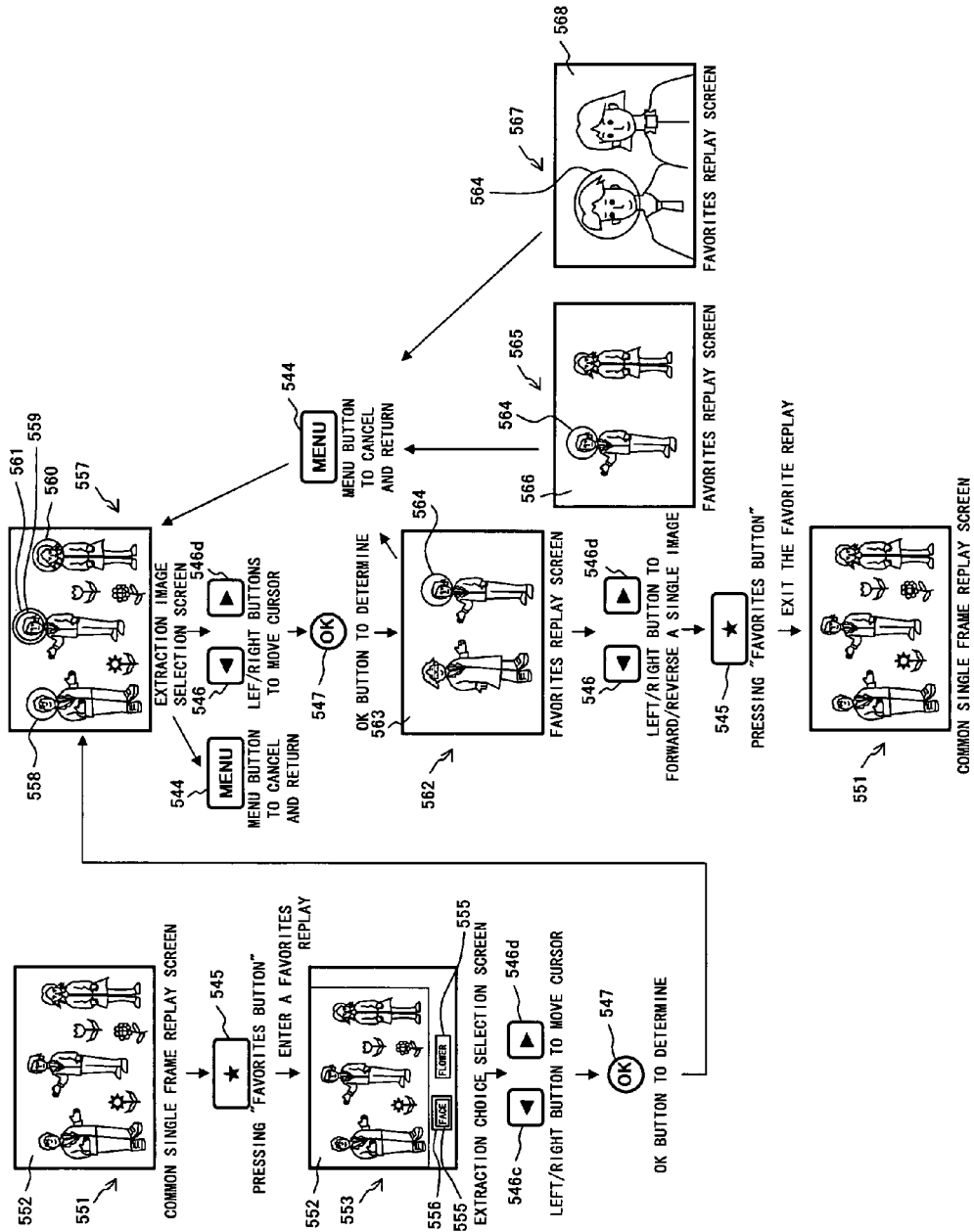
FIG. 55 is a diagram exemplifying an image screen transition of a TFT in accordance with a button operation when a favorite image replay process (S532) is carried out.

FIG. 55 is a diagram exemplifying an image screen transition of the TFT 541 in accordance with a button operation when the favorites replay process (of S532) is performed.

Referring to FIG. 55, a pressing of the favorites button 545 when the photo image 552 is displayed in the single frame replay starts executing a favorites replay process as shown in the display screen 551.

When an execution of the favorites replay process is started, a partial image corresponding to each of the categories, i.e., the "face", "flower", "ridge line" and "horizon", is detected from the photo image 552 already displayed in the display screen 551. This example shows the case of detecting partial images corresponding to the categories of the "face" and "flower" and picking up the categories of the "face" and "flower" as the extraction choices. As shown in the display screen 553, an item 554 indicating the "face category (simply noted as '"face" 554' hereinafter) and an item 555 indicating the "flower" category (simply noted as "flower" 555 hereinafter), which are picked up as extraction choices, are displayed together with the photo image 552 and also a cursor 556 is displayed for the "face" 554.

A pressing of the Left button 546c or Right button 546d in the state of the display screen 553 moves the cursor 556 to another extraction choice. As an example, the display position of the cursor 556 moves from the "face" 554 to "flower" 555, or from the "flower" 555 to "face" 554. And a pressing of the OK button 547 determines the extraction choice displayed with the cursor 556 as the category of a partial image to be used at an image search.

Assuming that the "face" 554 is determined, a partial image(s) corresponding to the "face" category, that is, the partial image(s) recognizable as face, is extracted from the photo image 552. And partial image frames 558, 559 and 560 are displayed for the parts corresponding to the extracted partial images and also a cursor frame 561 is displayed for one partial image frame 559 of them in the photo image 552 displayed in the single frame form as shown in the display screen 557.

A pressing of the menu button 544 in the state of the display screen 557 reverts back to the state of the display screen 553, enabling the user to re-specify an extraction choice. And a pressing of the Left button 546*c* or Right button 546*d* in the state moves the cursor 561 to another partial image frame. As an example, the display position of the cursor frame 561 moves from the partial image frame 559 to the partial image frame 558 or 560. And a pressing of the OK button 547 in the state determines a partial image within the partial image frame displayed with the cursor 561 as a partial image to be used at an image search.

Assuming that the partial image within the partial image frame 559 is determined for example, all photo images possessing a partial image which is the same as, or similar to, the partial image within the partial image frame 559 are extracted from the photo images recorded in the internal memory 511 and external memory 512 and pieces of the link information of the respective extracted photo images are registered in the favorites file. And a photo image 563 corresponding to the link information initially registered in the favorites file is read, and displayed, from the internal memory 511 or external memory 512 as shown in the display screen 562. In this event, a partial image frame 564 is displayed for a partial image which is the same as, or similar to, the partial image within the partial image frame 559, in the photo image 563.

A pressing of the Left button 546*c* or Right button 546*d* in the state of the display screen 562 reads, and displays, a photo image corresponding to other link information registered in the favorites file from the internal memory 511 or external memory 512. As an example, displayed are the photo image 566 shown in the display screen 565 and the photo image 568 shown in the display screen 567. In this event, the partial image frame 564 is displayed for a partial image which is the same as, or similar to, the partial image within the partial image frame 559 in a similar manner as the display screen 562.

As such, the pressing of the menu button 544 when a photo image (e.g., the 563, 566 or 568) corresponding to the link information registered in the favorites file reverts back to the state of the display screen 557, enabling the user to re-specify a partial image to be used at the time of an image search. And the pressing of the favorites button 545 ends the favorites replay process and the single frame replay state in the replay mode returns.

As described above, the digital camera according to the present embodiment is configured in a manner that the user only specifies a category to be used for a search from among the categories presented by the camera based on the replayed photo image and then a partial image to be used for the search from among the partial images in the photo image presented by the camera in accordance with the specified category, thereby making it possible to search, and display, a photo image possessing a partial image which is the same as, or similar to, the specified partial image from the internal memory 511 or/and external memory 512. Therefore the configuration enables the user to find out a desired photo image(s) based on the replayed photo image. It also enables the user to find out a desired image(s) just by specifying the category and partial image which are present by the camera, providing a comprehensible operation.

Meanwhile, a category presented by the camera is one corresponding to the partial image actually detected from the replayed photo image and therefore a problem, such as the corresponding partial image is not detected and consequently the search cannot be carried out despite that the user has specified a category, never occurs.

Therefore, it is possible to extract, and display, a desired photo image from among the recorded photo images based on the replayed photo image by using a simple and comprehensible method.

Note that, the process performed in the S542 shown in FIG. 53 for picking up an extraction choice can also be alternatively configured to process for picking up an extraction choice based on the information included in the supplementary information of the photo image used as a search source image in the operation of the digital camera according to the present embodiment, as an example other than the process shown in FIG. 54.

FIGS. 56A and 56B are diagrams exemplifying a correlation of a photography condition with an extracted selection choice when configuring to pick up an extraction choice based on the information of the photography condition.

As shown in FIG. 56A, if a photo mode included in the photo condition is other than the auto mode, an extraction choice is picked up in accordance with the photo mode other than the auto mode.

Here, the configuration is in a manner to select the "face" category as an extraction choice because the cases of portrait mode, self-portrait mode and sleeping face mode are highly possible to include a face in the photo image.

The cases of landscape mode, nightscape mode and sunset mode are highly possible to include a ridge line or horizon in the photo image and therefore the configuration is to select "ridge line" and "horizon" categories.

The cases of landscape & person mode and nightscape & person mode are highly possible to include a face, ridge line or horizon in the photo image and therefore the configuration is to select "face", "ridge line" and "horizon" categories.

The macro mode is highly possible to include a flower and therefore the configuration is to select "flower" category.

In the meantime, if a photo mode included in the information of a photo condition is the auto mode, an extraction choice is picked up on the basis of the pieces of information included in that of the photo conditions, such as the presence of flashing with a red-eye reduction flash or without, the self timer being turned on or not, or the object distance being long, middle or short, or macro area, as shown in FIG. 56B.

Here, the case of the presence of flashing with a red-eye reduction flash is highly possible to include a face in the photo image, and therefore the "face" category is selected as an extraction choice.

Also, the case of turning on the self timer is highly possible to include a face in the photo image, and therefore the "face" category is selected as an extraction choice.

The case of an object distance being a long distance is highly possible to include a ridge line or horizon in the photo image, and therefore the "ridge line" and "horizon" categories are selected as extraction choices. The case of an object distance being a middle or short distance is highly possible to include a face, ridge line or horizon in the photo image, and therefore the "face", "ridge line" and "horizon" categories are selected as extraction choices. The case of an object distance being a macro area is highly possible to include a flower in the photo image, and therefore the "flower" category is selected as extraction choice.

In the case of picking up an extraction choice when the photo mode is the auto mode, a priority order is given to the photo condition (e.g., a presence or absence of a flash emission, a turning on or off of the self timer and an object distance) and an extraction choice is picked up in accordance with the priority order, as described later by referring to FIG. 56C.

FIG. 56C is a flow chart showing a process so as to pick up an extraction choice based on the information of the photography condition as described above.

As shown in FIG. 56C, this process first reads the supplementary information of the photo image (i.e., the photo image displayed in the single frame form in S541 of FIG. 53) constituting a search source image and judges whether or not the photo mode at the time of photographing is the auto mode based on the supplementary information (S581).

If the judgment result of S581 is "no", then judged is whether or not the photo mode at the time of photographing is a portrait mode, self portrait mode or sleeping face mode based on the supplementary information (S582) and, if the judgment result is "yes", the "face" category is picked up as extraction choice (S583), followed by the process returning.

If the judgment result of S582 is "no", then judged is whether or not the photo mode at the time of photographing is a landscape mode, nightscape mode or sunset mode based on the supplementary information (S584) and, if the judgment result is "yes", the "ridge line" and "horizon" categories are picked up as extraction choices (S585), followed by the process returning.

If the judgment result of S584 is "no", then judged is whether or not the photo mode at the time of photographing is a landscape mode & person mode or nightscape & person mode based on the supplementary information (S586) and, if the judgment result is "yes", then the "face", "ridge line" and "horizon" categories are picked up as extraction choices (S587), followed by the process returning.

If the judgment result of S586 is "no", then judged is whether or not the photo mode at the time of photographing is the macro mode based on the supplementary information (S588) and, if the judgment result is "yes", the "flower" category is picked up as extraction choice (S589), followed by the process returning.

If the judgment result of S588 is "no", a process similar to that of the S571 shown in FIG. 54 is performed (S590) and the process returns.

Contrarily, if the judgment result of S581 is "yes", then judged is whether or not a red-eye reduction flash has been used at the time of photographing based on the supplementary information (S591) and, if the judgment result is "yes", the "face" category is picked up as extraction choice (S592), followed by the process returning.

If the judgment result of S591 is "no", then judged is whether or not the self timer has been turned on at the time of photographing based on the supplementary information (S593) and, if the judgment result is "yes", the "face" category is picked up as extraction choice (S592), followed by the process returning.

If the judgment result of S593 is "no", then judged is whether or not the object distance at the time of photographing has been a long distance based on the supplementary information (S594) and, if the judgment result is "yes", the "ridge line" and "horizon" categories are picked up as extraction choices (S595), followed by the process returning.

If the judgment result of S594 is "no", then judged is whether or not the object distance at the time of photographing has been a middle or short distance based on the supplementary information (S596) and, if the judgment result is "yes", then the "face", "ridge line" and "horizon" categories are picked up as extraction choices (S597), followed by the process returning.

If the judgment result of S596 is "no", then judged is whether or not the object distance at the time of photographing has been the macro area based on the supplementary information (S598) and, if the judgment result is "yes", the "flower" category is picked up as extraction choice (S599), followed by the process returning.

If the judgment result of S598 is "no", a process similar to that of the S571 shown in FIG. 54 is performed (S600) and the process returns.

Such a process makes it possible to pick up an extraction choice based on the information of a photo condition included in the supplementary information of a photo image constituting a search source image.

Meanwhile, the process performed in the S542 shown in FIG. 53 for picking up an extraction choice is configured to pick up all categories of the partial image that have been possible to detect in the operation of the digital camera according to the present embodiment as described by referring to FIG. 54; an alternative configuration example, however, is possible to give a priority to each category, detect a partial image corresponding to individual category in the descending order of the priority and determine an extraction choice to be picked up at the time of the partial images having been detected.

FIG. 57 is a flow chart showing a configuration of the process for picking up an extraction choice as noted above.

As shown in FIG. 57, this process first detects a partial image corresponding to the "face" category from the photo image constituting a search source image (i.e., the photo image displayed in the single frame form in S541 of FIG. 53), judges whether or not it is detected (S611) and, if the judgment result is "yes", determines, and picks up, the "face" category as extraction choice (S612) and returns the process.

If the judgment result of S611 is "no", a partial image corresponding to the "ridge" category, whether or not it is detected is judged (S613) and, if the judgment result is "yes", then the "ridge line" and "horizon" categories are determined, and picked up, as extraction choices (S614), followed by the process returning.

If the judgment result of S613 is "no", a partial image corresponding to the "horizon" category is detected from the photo images, then judged is whether or not it is detected (S615) and, if the judgment result is "yes", then the "ridge line" and "horizon" categories are determined, and picked up, as extraction choices (S616), followed by the process returning.

If the judgment result of S615 is "no", a partial image corresponding to the "flower" category is detected, then judged is whether or not it is detected (S617) and, if the judgment result is "yes", then the "flower" category is determined, and picked up, as extraction choice (S618), followed by the process returning.

If the judgment result of S617 is "no", the process returns as is.

Such a process makes it possible to assign a priority order to categories, detect a partial image corresponding to each of the categories sequentially by starting from the one in higher priority and determine an extraction choice to be picked up when the detection of partial images are complete.

Note that the processes of the S548 and S549 shown in FIG. 53 are configured such that, when a partial image corresponding to the category selected and determined by an operation input of the user is extracted from the photo images, partial image frames are displayed for the parts corresponding to the extracted partial image and also a cursor frame is displayed for one of the partial image frames as shown in the display screen 557 of FIG. 55, in the operation of the digital camera according to the present embodiment; an alternative configuration may modify the process as noted below for example. That is, when partial images corresponding to the category selected, and determined, by the operation input of the user are extracted, the extracted partial images are resized to a prescribed size, the resized partial images are displayed by lining up with the photo image displayed in the single frame form and a cursor frame is displayed for one of the resized partial images.

Figure 58:
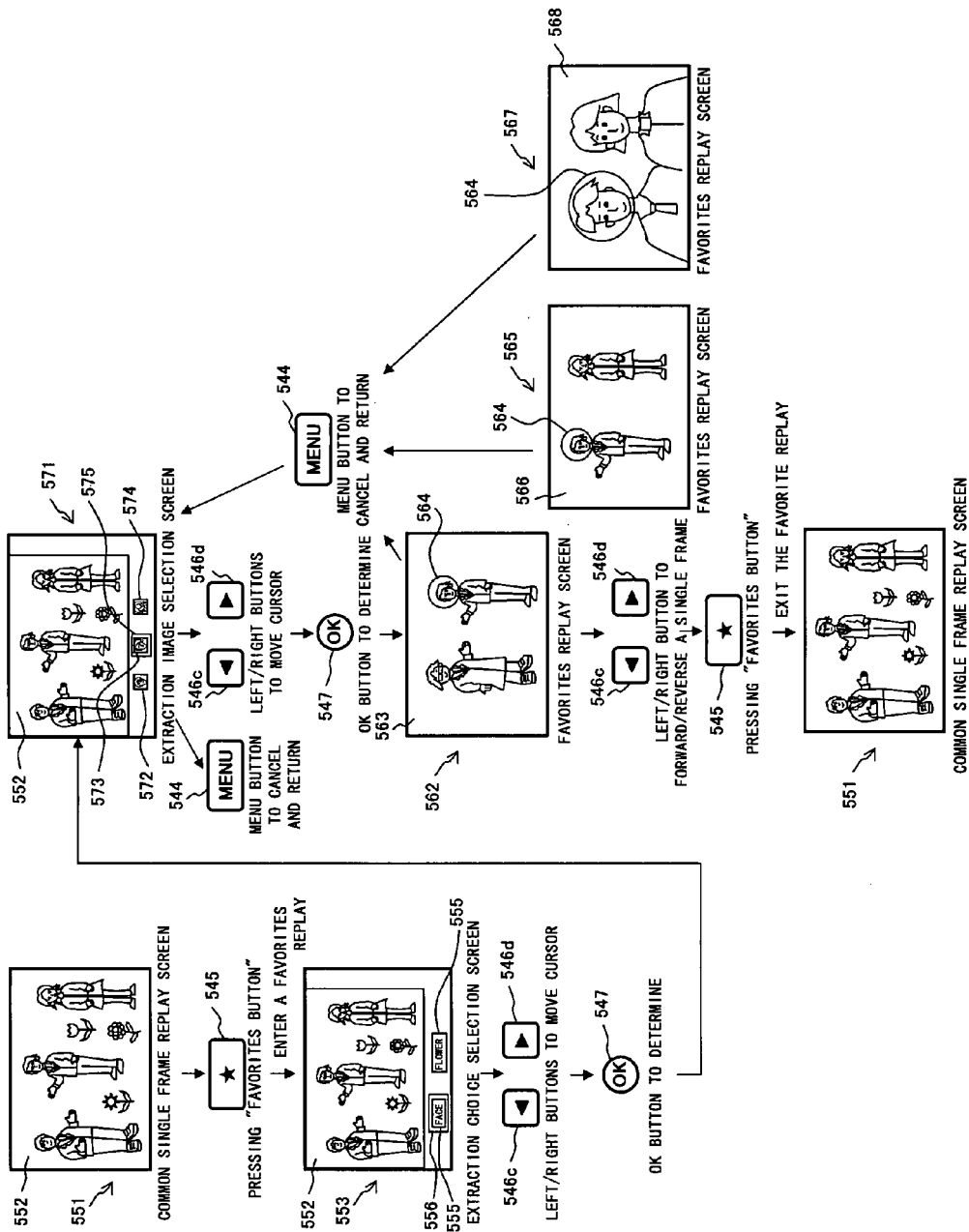
FIG. 58 is a diagram exemplifying an image screen transition of a TFT in accordance with button operations when a favorites replay process is carried out according to a modified embodiment.

FIG. 58 is a diagram exemplifying an image screen transition of the TFT 541 in accordance with button operations when a favorites replay process is carried out in the case of modifying as noted above. Note that FIG. 58 is the same as FIG. 55 except where a display screen 571 has replaced the display screen 557 shown in FIG. 55.

As shown in FIG. 58, a selection and determination of a "face" category for example by a button operation of the user in the state of the display screen 553 extracts a partial image(s) corresponding to the "face" category from the photo image 552 displayed in the single frame display and resizes it to a predetermined size. And the resized partial images 572, 573 and 574 are displayed by lining up with the photo image 552 displayed in the single frame form and also a cursor frame 575 is displayed for the partial image 573 as shown in the display screen 571.

Other screen transitions are the same as that of FIG. 55 and therefore the description is omitted here.

Such a process makes it possible to display the partial images to be presented to the user by lining up with the photo image displayed in the single frame form.

Note that the favorites replay process shown in FIG. 53 is configured to display, in the single frame form in the TFT 541, the photo images corresponding to the link information registered in the favorites file in the operation of the digital camera according to the present embodiment; it is, however, also possible to display them for every prescribed number of frames for example in the index display form in the TFT 541.

FIGS. 59A and 59B exemplify a screen image when displaying photo images in the index form in accordance with the link information registered in the favorites file.

The example shown in FIG. 59A exemplifies a screen image when displaying the photo images 563, 566 and 568 which are shown in FIG. 55 in the index form, further exemplifying the case of displaying partial image frames for the same or similar partial image in the respective images as in the case of the photo images 563, 566 and 568 shown in FIG. 55. The example shown in FIG. 59B exemplifies the screen image configured to not display the partial image frame.

Such a display in the index display form enables the user to look at the searched images in a set of plural images.

Also, the favorites replay process can be configured to change over the display forms between the index form and single frame form in accordance with a camera operation of the user when displaying photo images corresponding to the link information registered in the favorites file.

In the meantime, a camera according to the present embodiment may also be another portable apparatus capable of photographing an image and replaying it, such as a portable phone equipped with a camera and a PDA equipped therewith, in lieu of being limited to a digital camera.

While the embodiments 1 through 5 have so far been described; the camera according to the individual embodiment, however, may be configured to add a partial comprisal of the camera according to another embodiment, or further perform a part of the process performed in the camera according to another embodiment.

While the present invention has been described in detail; the present invention, however, may of course be improved and/or modified within the scope thereof, in lieu of being limited to the embodiments described above.

As such, the present invention enables the search of a desired image simply and easily.

What is claimed is:

1. A camera comprising:
an imaging unit for imaging an object image;
a first storage unit for storing a plurality of still pictures and a plurality of motion pictures, as images, and information other than the images;
a display unit for displaying one or more images or an image output from the imaging unit;
a search source specification unit for specifying a search source image;
a characteristic specification unit for specifying one or more parts of the search source image, as a characteristic of an image;
a search condition specification unit for specifying a search condition by making the one or more parts of the search source image specified by the characteristic specification unit as the search condition;
a characteristic extraction unit for extracting the characteristic of the image according to the search condition specified by the search condition specification unit;
a search unit for searching an image similar to the search source image specified by the search source specification unit and in accordance with the search condition specified by the search condition specification unit;
a touch panel; and
a touch panel input detection unit for detecting a position on the touch panel where a tracing or enclosing operation is performed,
wherein the search condition specification unit specifies an image portion that corresponds to a location or range according to the position detected by the touch panel input detection unit on the touch panel where a tracing or enclosing operation is performed,
wherein the search source specification unit specifies one search source image from one or more search source images displayed on the display unit, and
wherein the search condition specification unit specifies a part whose shape is to be recognized by the camera from the search source image specified by the search source specification unit as the touch panel input detection unit detects a position on the touch panel where a contour of the part is traced or enclosed.

2. The camera according to claim 1, wherein the characteristic specification unit encloses the one or more parts of the search source image, thereby specifying the characteristic part used for the search.

3. The camera according to claim 1, wherein the characteristic specification unit traces a shape of the one or more parts of the search source image, thereby specifying the characteristic part used for the search.

4. The camera according to claim 1, wherein the characteristic specification unit makes, as the characteristic part, a range of approximately the same color as a portion of the search source image specified by a user.

5. A camera comprising:
an imaging unit for imaging an object image;
a first storage unit for storing a plurality of still pictures and a plurality of motion pictures, as images, and information other than the images;
a display unit for displaying one or more images or an image output from the imaging unit;
a search source specification unit for specifying a search source image;
a characteristic specification unit for specifying one or more portions of the search source image, as a characteristic part of an image;

a search condition specification unit for specifying the characteristic part of the image as a search condition;

a search unit for searching an image similar to the search source image specified by the search source specification unit and in accordance with the search condition specified by the search condition specification unit;

a touch panel; and a touch panel input detection unit for detecting a position on the touch panel where a tracing or enclosing operation is performed, wherein the search condition specification unit specifies an image portion that corresponds to a location or range according to the position detected by the touch panel input detection unit on the touch panel where a tracing or enclosing operation is performed, wherein the search source specification unit specifies one search source image from one or more search source images displayed on the display unit, and wherein the search condition specification unit specifies a part whose shape is to be recognized by the camera from the search source image specified by the search source specification unit as the touch panel input detection unit detects a position on the touch panel where a contour of the part is traced or enclosed.

6. The camera according to claim 5, wherein the characteristic specification unit encloses the one or more portions of the search source image, thereby specifying the characteristic part used for the search.

7. The camera according to claim 5, wherein the characteristic specification unit traces a shape of the one or more portions of the search source image, thereby specifying the characteristic part used for the search.

8. The camera according to claim 5, wherein the characteristic specification unit makes, as the characteristic part, a range of approximately the same color as a portion of the search source image specified by a user.

9. The camera according to claim 1, wherein the search condition specification unit specifies a part whose shape is to be recognized by the camera from both (1) the search source image specified by the search source specification unit, and (2) a contour of a part of the source image that is traced via the touch panel.

10. The camera according to claim 5, wherein the search condition specification unit specifies a part whose shape is to be recognized by the camera from both (1) the search source image specified by the search source specification unit, and (2) a contour of a part of the source image that is traced via the touch panel.

* * * * *